United States Patent
Ithal et al.

(10) Patent No.: US 10,938,861 B2
(45) Date of Patent: *Mar. 2, 2021

(54) CONSERVING INSPECTION BANDWIDTH OF A DATA INSPECTION AND LOSS PREVENTION APPLIANCE

(71) Applicant: Netskope, Inc., Santa Clara, CA (US)

(72) Inventors: Ravi Ithal, Los Altos, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,964

(22) Filed: Jan. 9, 2020

(65) Prior Publication Data

US 2020/0153867 A1    May 14, 2020

Related U.S. Application Data

(63) Continuation of application No. 15/958,672, filed on Apr. 20, 2018, now Pat. No. 10,805,352.

(Continued)

(51) Int. Cl.
*H04L 29/06* (2006.01)
*H04L 29/08* (2006.01)
*H04L 29/12* (2006.01)

(52) U.S. Cl.
CPC ............ *H04L 63/20* (2013.01); *H04L 63/029* (2013.01); *H04L 63/0227* (2013.01);

(Continued)

(58) Field of Classification Search
CPC ..... H04L 63/20; H04L 63/1425; H04L 67/02; H04L 63/0227; H04L 63/029;

(Continued)

(56) References Cited

U.S. PATENT DOCUMENTS 4,574,346 A    3/1986   Hartung
6,502,192 B1   12/2002  Nguyen (Continued)

OTHER PUBLICATIONS

U.S. Appl. No. 15/958,637—Preinterview First Office Action dated Mar. 2, 2020, 10 pages.

(Continued)

*Primary Examiner* — Huan V Doan
(74) *Attorney, Agent, or Firm* — Haynes Beffel & Wolfeld, LLP; Ernest J. Beffel, Jr.; Sikander Kahn

(57) ABSTRACT

The technology disclosed relates to conserving inspection bandwidth of a data inspection and loss prevention appliance (DILPA) of a network security system (NSS). The technology disclosed uses bypass lists to ensure that rich content traffic is not subjected to inspection by the DILPA. An endpoint routing client (ERC), running on a device, has a bypass list of bandwidth conservable destination identifiers for which inspection bandwidth of the DILPA is conserved by bypassing the DILPA. The identifiers specify rich content sources through domain names, URLs, web categories, and server names (e.g., server name indications (SNIs), HOST headers). ERC classifies incoming connecting access requests as loss prevention inspectable or bandwidth conservable by comparing them against entries in the bypass list. ERC tunnels loss prevention inspectable requests to the DILPA over a secure encrypted channel for inspection. ERC forwards bandwidth conservable requests to the destination web service servers, bypassing inspection by the DILPA.

25 Claims, 25 Drawing Sheets

Related U.S. Application Data

(60) Provisional application No. 62/488,703, filed on Apr. 21, 2017.

(52) U.S. Cl.
CPC .......... H04L 63/0428 (2013.01); H04L 63/10 (2013.01); H04L 63/1408 (2013.01); H04L 63/1425 (2013.01); H04L 67/02 (2013.01); H04L 69/22 (2013.01); H04L 61/1511 (2013.01); H04L 63/0823 (2013.01)

(58) Field of Classification Search
CPC . H04L 63/0428; H04L 63/1408; H04L 69/22; H04L 63/10; H04L 61/1511; H04L 63/0823
See application file for complete search history.

(56) References Cited

U.S. PATENT DOCUMENTS

| | | | |
|---|---|---|---|
| 6,687,732 B1* | 2/2004 | Bector | H04L 29/12009 709/200 |
| 7,234,168 B2 | 6/2007 | Gupta et al. | |
| 7,587,499 B1 | 9/2009 | Haghpassand | |
| 7,769,994 B2 | 8/2010 | Peles | |
| 7,908,472 B2 | 3/2011 | Freed et al. | |
| 8,363,650 B2 | 1/2013 | Rao et al. | |
| 8,640,216 B2 | 1/2014 | Anderson et al. | |
| 8,892,665 B1 | 11/2014 | Rostami-Hesarsorkh et al. | |
| 8,925,069 B2 | 12/2014 | Louboutin et al. | |
| 8,959,329 B2 | 2/2015 | Altman | |
| 9,185,088 B1 | 11/2015 | Bowen | |
| 9,197,628 B1 | 11/2015 | Hastings | |
| 9,438,506 B2 | 9/2016 | Ryland | |
| 10,291,651 B1 | 5/2019 | Chaubey | |
| 10,454,933 B2 | 10/2019 | Chenard et al. | |
| 2003/0191989 A1 | 10/2003 | O'Sullivan | |
| 2004/0128538 A1 | 7/2004 | Gmuender et al. | |
| 2006/0248045 A1 | 11/2006 | Toledano et al. | |
| 2007/0011319 A1 | 1/2007 | McClure et al. | |
| 2008/0250390 A1 | 10/2008 | Feblowitz et al. | |
| 2008/0263215 A1 | 10/2008 | Schnellbaecher | |
| 2009/0328188 A1 | 12/2009 | Raymer et al. | |
| 2010/0146260 A1 | 6/2010 | Levow et al. | |
| 2010/0169472 A1 | 7/2010 | Okamoto et al. | |
| 2010/0325287 A1 | 12/2010 | Jagadeeswaran et al. | |
| 2012/0042361 A1 | 2/2012 | Wong et al. | |
| 2013/0191627 A1 | 7/2013 | Ylonen et al. | |
| 2014/0082204 A1 | 3/2014 | Shankar et al. | |
| 2014/0115702 A1 | 4/2014 | Li et al. | |
| 2015/0113264 A1 | 4/2015 | Wang et al. | |
| 2016/0241528 A1 | 8/2016 | Kulkarni et al. | |
| 2017/0063886 A1 | 3/2017 | Muddu et al. | |
| 2017/0195427 A1* | 7/2017 | Choquette | H04L 61/2007 |
| 2017/0223054 A1 | 8/2017 | Wing | |
| 2019/0200282 A1 | 6/2019 | Sahin et al. | |
| 2020/0128022 A1 | 4/2020 | Bleikertz et al. | |

OTHER PUBLICATIONS

Heckel, "Use SSLsplit to transparently sniff TLS/SSL connections—including non-HTTP(S) protocols", Blog post Aug. 4, 2013, 28 pages.
"Data Loss Prevention and Monitoring in the Cloud" by netSkope, Inc., Nov. 2014, 18 pgs.
"Netskope Active Cloud DLP," netSkope, Inc., 2015, 4 pgs.
"Netskope Cloud Confidence Indexâ„¢," netSkope, Inc., 2015, 2 pgs.
"Repave the Cloud-Data Breach Collision Course," netSkope, Inc., 2014, 6 pgs.
"The 5 Steps to Cloud Confidence," netSkope, Inc., 2014, 11 pgs.
U.S. Appl. No. 15/958,672—Notice of Allowance dated Feb. 24, 2020, 26 pages.
U.S. Appl. No. 15/958,672—Notice of Allowance dated Jun. 9, 2020, 25 pages.
U.S. Appl. No. 15/958,637—Response to Preinterview First Office Action dated Mar. 2, 2020, filed Apr. 10, 2020, 17 pages.
U.S. Appl. No. 15/958,637—Notice of Allowance dated Jun. 17, 2020, 10 pages.
Blake-Wilson, S., et al., "RFC-3546-Standard", Network Working Group, The Internet Society, Jun. 2003, 29pgs.
Eastlake, D., "RFC-6066-Standard", Internet Engineering Task Force (IETF), Jan. 2011, 25 pages.
Wikipedia, "Traffic Server", [retrieved on Apr. 13, 2018]. Retrieved from the Internet <URL: https://en.wikipedia.org/wiki/Traffic_Server>.
Fielding, R., "Hypertext Transfer Protocol (HTTP/1.1): Message Syntax and Routing", Internet Engineering Task Force, Jun. 2014, 89 pages.
Fielding, R., "Hypertext Transfer Protocol (HTTP/1.1): Semantics and Content", Internet Engineering Task Force, Jun. 2014, 101 pages.
Wikipedia, "HTTPS", [retrieved on Apr. 17, 2018]. Retrpieved from the Internet <URL: <https://en.wikipedia.org/w/index.php?title=HTTPS&oldid=836835625>.
Wikipedia, "List of HTTP header fields", [retrieved on Apr. 17, 2018]. Retrieved from the Internet <URL: <"https://en.wikipedia.org/w/indexphp?title=List_of_HTTP_header_fields&oldid=83686420"2>.

\* cited by examiner

2000

USER 2002
- Browser: Chrome
- OS Version: High Sierra
- Host Name: Bob's MacBook Pro (2)
- OU: kkrlogistics.com/Users
- User Key: bob@netskope.com
- Device: Mac Device
- Device Classification: not configured
- IP: 10.19.149.33
- OS: High Sierra
- User: bob@netskope.com

APPLICATION 2004
- Object Type: File
- Site: education-sa
- AppSession ID: 18738588518389924330
- Category: Forums
- Referer: https://up.education-sa.com/
- URL: up.education-sa.com/index.php
- Object: Customer Data - DO NOT SHARE.docx
- CCL: unknown
- Activity: Upload
- Page: up.education-sa.com

SOURCE 2006
- Location: Mexico
- Zip: 63009
- IP: 148.223.114.147
- Region: Distrito Federal
- Timezone: America/Mexico_City
- Country: MX
- Latitude: 19.4342002869
- Longitude: -99.1386032104

DESTINATION 2016
- Location: Phoenix
- IP: 104.28.19.67
- Region: Arizona
- Country: US
- Latitude: 33.4483795166
- Longitude: -112.0740432739
- Zip: N/A

DLP 2012
- Incident ID: 2316409828192736000
- DLP File: Customer Data - DO NOT SHARE.docx
- Rule Severity: Low
- Rule Count: 5
- Parent Incident ID: 2316409828192736000
- Profile: DLP-PII
- Rule Name: DOB

SESSION 2014
- Total Events: 1

FILE 2026
- File Type: application/vnd.openxmlformats-officedocume...
- Size (Bytes): 31.58KB
- File Language: ENGLISH 2022
345 KB

FIG. 20

CONSERVING INSPECTION BANDWIDTH OF A DATA INSPECTION AND LOSS PREVENTION APPLIANCE

PRIORITY DATA

This application is a continuation of U.S. patent application Ser. No. 15/958,672, titled "REDUCING LATENCY IN SECURITY ENFORCEMENT BY A NETWORK SECURITY SYSTEM (NSS), filed Apr. 20, 2018, which claims the benefit of U.S. Provisional Patent Application No. 62/488,703, titled "REDUCING LATENCY AND ERROR IN SECURITY ENFORCEMENT BY A NETWORK SECURITY SYSTEM (NSS)", filed on Apr. 21, 2017. The provisional application is incorporated by reference as if fully set forth herein; and This application claims the benefit of U.S. patent application Ser. No. 15/958,637, titled "REDUCING ERROR IN SECURITY ENFORCEMENT BY A NETWORK SECURITY SYSTEM (NSS)", filed Apr. 20, 2018. The nonprovisional application is incorporated by reference as if fully set forth herein.

INCORPORATIONS

The following materials are incorporated by reference as if fully set forth herein:

U.S. Nonprovisional patent application Ser. No. 14/198,499, titled "SECURITY FOR NETWORK DELIVERED SERVICES", filed on Mar. 5, 2014 (now U.S. Pat. No. 9,398,102 issued on Jul. 19, 2016);

U.S. Nonprovisional patent application Ser. No. 14/835,640, titled "SYSTEMS AND METHODS OF MONITORING AND CONTROLLING ENTERPRISE INFORMATION STORED ON A CLOUD COMPUTING SERVICE (CCS)", filed on Aug. 25, 2015 (now U.S. Pat. No. 9,928,377 issued on Mar. 27, 2018);

U.S. Nonprovisional patent application Ser. No. 15/368,240, titled "SYSTEMS AND METHODS OF ENFORCING MULTI-PART POLICIES ON DATA-DEFICIENT TRANSACTIONS OF CLOUD COMPUTING SERVICES", filed on Dec. 2, 2016 ;

U.S. Nonprovisional patent application Ser. No. 15/911,034, titled "SIMULATION AND VISUALIZATION OF MALWARE SPREAD IN A CLOUD-BASED COLLABORATION ENVIRONMENT", filed on Mar. 2, 2018 ;

Data Loss Prevention and Monitoring in the Cloud" by netSkope, Inc.;

"The 5 Steps to Cloud Confidence" by netSkope, Inc.;
"Netskope Active Cloud DLP" by netSkope, Inc.;
"Repave the Cloud-Data Breach Collision Course" by netSkope, Inc.;
"Netskope Cloud Confidence Index™" by netSkope, Inc;

Wikipedia contributors, 'List of HTTP header fields', Wikipedia, The Free Encyclopedia, 17 Apr. 2018, 09:04 UTC, <https://en.wikipedia.org/w/index.php?title=List_of_HTTP_header_fields&oldid=836864202> [accessed 19 Apr. 2018];

Wikipedia contributors, 'HTTPS', Wikipedia, The Free Encyclopedia, 17 Apr. 2018, 03:27 UTC, <https://en.wikipedia.org/w/index.php?title=HTTPS&oldid=836835625> [accessed 19 Apr. 2018];

Internet Engineering Task Force, 'Hypertext Transfer Protocol (HTTP/1.1): Semantics and Content'. R. Fielding, Ed., J. Reschke, Ed. June 2014, <https://tools.ietf.org/pdf/rfc7231.pdf> [accessed 19 Apr. 2018];

Internet Engineering Task Force, 'Hypertext Transfer Protocol (HTTP/1.1): Message Syntax and Routing'. R. Fielding, Ed., J. Reschke, Ed. June 2014, <https://tools.ietforg/pdf/rfc7230.pdf> [accessed 19 Apr. 2018].

FIELD OF THE TECHNOLOGY DISCLOSED

The technology disclosed relates to reducing latency and error in security enforcement by a network security system (NSS), and in particular, relates to conserving inspection bandwidth of a data inspection and loss prevention appliance (DILPA) of the NSS.

BACKGROUND

Cloud adoption has created new security and compliance issues. Enterprises are struggling to understand the data security and compliance impact of aggressive employee and organizational adoption of web services while also trying to determine how to maintain data security and compliance as their infrastructure moves to the cloud. This has made network security systems (NSSs) critical elements of cloud security architectures.

A NSS can be an on-premise or cloud-based security policy enforcement point that is placed between web service consumers and web service providers to combine and inter-ject enterprise security policies as cloud-based resources are accessed. For example, Netskope™ (www.netskope.com) offers an exemplary NSS. NSSs deliver capabilities around four pillars of functionality: visibility, compliance, data security, and threat protection. Within the data security pillar, data loss prevention (DLP) is natively included in a NSS. This makes sense given the fact that a NSS acts as a control point between users, the web services they are accessing, and the sensitive data they are consuming and sharing. This is especially important as more than 33% of business data now resides in the cloud and it needs to be protected.

Data loss prevention (DLP) solutions provide capabilities to classify sensitive data, generally detecting sensitive data in documents and preventing unauthorized access, saving or sharing of the sensitive data. DLP solutions identify sensitive data that is mandated by central policies for protection, i.e., sensitivity classification. Identifying sensitive data entails scanning the documents to detect protected content, a process commonly referred to as the "content sensitivity scan". Content sensitivity scan is computationally intensive and time consuming because it demands content analysis techniques that effectively identify protected material. Examples of content analysis techniques include pattern-based matching algorithms (for example, for identifying Social Security numbers or credit card numbers), generating a fingerprint for an entire file for exact matching, or creating hashes for specific parts of a file for partial matching.

Due to resource-intensive DLP, NSSs can negatively impact network performance and consume significant computational resources. Also, since NSSs force all network traffic through a common inspection point, they can cause network traffic jams and introduce latency. This can result in users experiencing application slowdowns.

An opportunity arises to reduce latency and error in security enforcement by a NSS and to conserve inspection bandwidth of a data inspection and loss prevention appliance (DILPA) of the NSS. Better NSS performance, lower NSS error, improved user experience, higher response time, and increased computational efficiency may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 20 shows one implementation of metadata information logged for connection access requests, particularly bypassed connection action requests.

DETAILED DESCRIPTION

Figure 1:
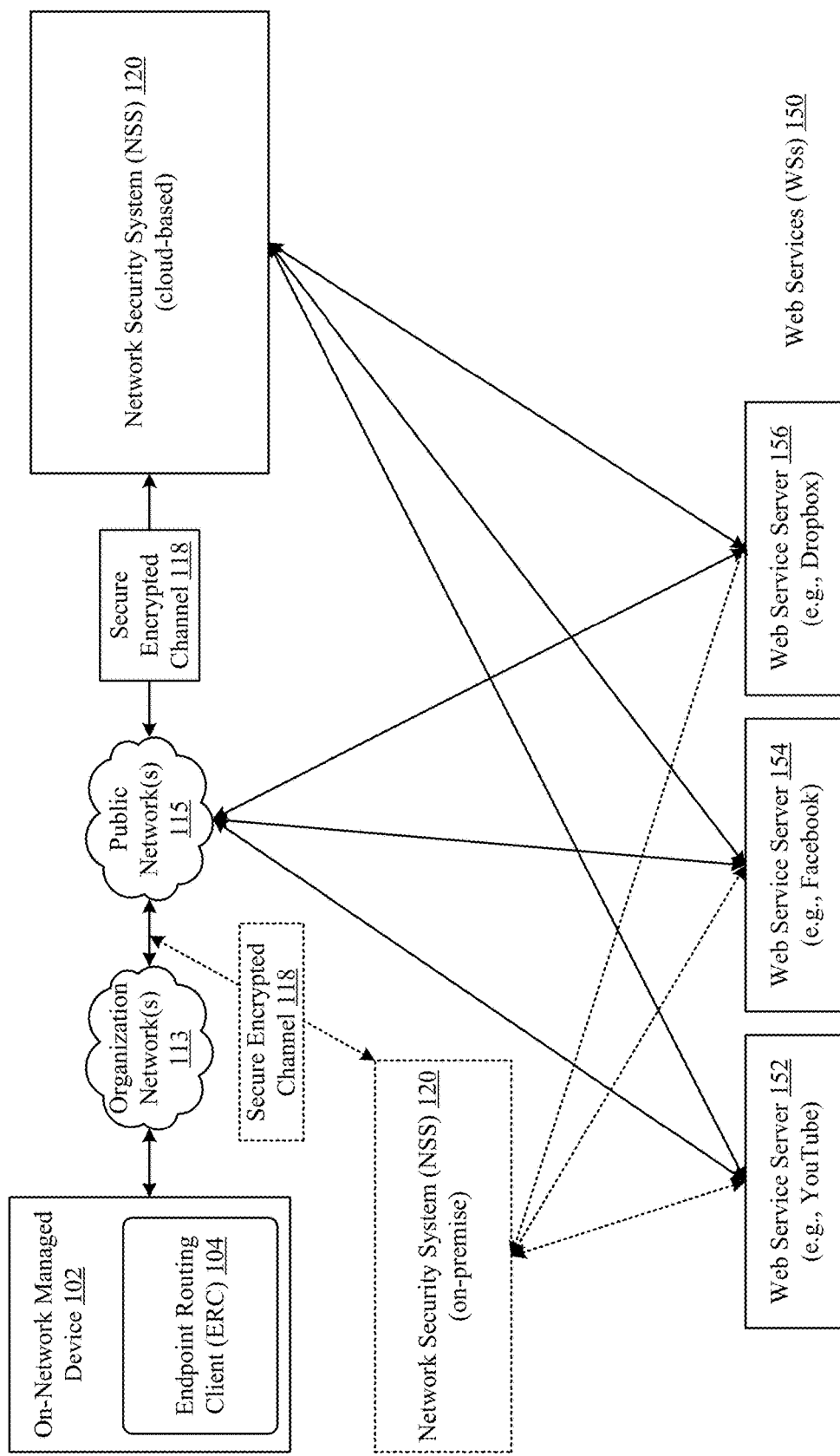
FIG. 1 illustrates a block diagram of an example environment in which an endpoint routing client (ERC), running on an on-network managed device, tunnels loss prevention inspectable connection access requests to a network security system (NSS) and routes bandwidth conservable connection access requests to web services.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Introduction

Employees now rely on web services to perform business-critical functions, and they routinely upload sensitive and regulated data to the web. A network security system (NSS), such as the one offered by Netskope™, intercepts network traffic in real-time to prevent loss of sensitive data by inspecting data en route to or from web services and data resident in the web services. NSS includes a data inspection and loss prevention appliance (DILPA) that uses a combination of deep application programming interface inspection (DAPII), deep packet inspection (DPI), and log inspection to monitor user activity and perform data loss prevention (DLP). DILPA achieves DLP by subjecting data packets to content inspection techniques like language-aware data identifier inspection, document fingerprinting, file type detection, keyword search, pattern matching, proximity search, regular expression lookup, exact data matching, metadata extraction, and language-agnostic double-byte character inspection.

In the context of this application, data loss prevention (DLP) refers to protecting exfiltration of data deemed sensitive or confidential by one or more security policies. Some examples of sensitive data are payment Card information (PCI), personally-identifiable information (PII), and electronic personal health information (ePHI)). In the context of this application, data loss prevention (DLP) also refers to endpoint security which involves protecting endpoints from cyber-attacks such as malware and ransomware and in turn preventing exfiltration of sensitive data from the endpoints.

In the context of this application, the data inspection and loss prevention appliance (DILPA) inspects data that is encoded in network packets and/or higher order encodings of the network packets such as secure sockets layer (SSL) and/or transport layer security (TLS) handshakes and Hypertext Transfer Protocol (HTTP) transactions.

Deep inspection by the DILPA, however, introduces routing and processing latencies. Latency in routing occurs because the network traffic is tunneled through an additional hop in the network, i.e., the DILPA. Latency in processing occurs because the network traffic is subjected to the different content inspection techniques discussed above. Furthermore, deep inspection imposes a substantial computational burden on the DILPA, as part of the overall network security.

The NSS includes a decrypter that facilitates inspection of HTTP and HTTPS network streams. During stream inspection, decrypter decrypts the data packets flowing in and out of the network and makes them available to the DILPA for deep inspection. After deep inspection by the DILPA is complete, decrypter re-encrypts the data packets and sends them to their intended destination. Though less than deep inspection, stream inspection also increases latency and consumes considerable amount of computational resources.

The technology disclosed relates to reducing latency in DLP by the NSS. There exists a class of rich content traffic that has high latency requirements but low DLP value. Consider the example of recreational traffic like live-streaming and on-demand videos. Each video stream can generate between 200 kbps and 1.5 mbps of network traffic. On-demand clips are measured in megabytes and gigabytes. Inspecting such high volume, rich content traffic exacerbates latency and challenges computational limitations of the NSS. This results in diminished user experience, with negligible or no DLP gains.

Client-Side, Non-Intercepting Complete Bypass

In a client-side implementation, the technology disclosed configures an endpoint routing client (ERC) running on an endpoint device with a bypass list of bandwidth conservable (BC) destination identifiers. In this context, to "bypass" a connection access request means to forward packets of the request directly to a destination web service server without at all intercepting the connection access request at the NSS, which is interposed between the endpoint device and the destination web service server as a policy enforcement intermediary. As a result, the packets are not made available to the decrypter or to the DILPA.

Bandwidth conservable destination identifiers specify rich content sources using identifiers like domain names, unified resource locators (URLs), web categories, and server names (e.g. server name indications (SNIs), HOST headers). ERC classifies incoming connecting access requests as "loss prevention inspectable (LPI)" or "bandwidth conservable" by comparing them against entries in the client-side bypass list. ERC tunnels loss prevention inspectable requests to the NSS over a secure encrypted channel for policy enforcement. ERC forwards bandwidth conservable requests to the destination web service servers, bypassing policy enforcement by the NSS and thereby avoiding resource-intensive inspection by the decrypter and the DILPA.

Server-Side, Intercepting Internal Bypass

Different than the client-side implementation, in a server-side implementation, the connection access request is intercepted by the NSS. Here, the technology disclosed uses a server-side bypass list(s) to ensure that rich content traffic is not subjected to content inspection by the NSS. When the ERC naively classifies a bandwidth conservable connection access request as loss prevention inspectable and tunnels the request to the NSS (i.e., the request is intercepted by the NSS), a network gateway (e.g., proxy gateway, generic routing encapsulation (GRE) gateway, and/or internet protocol security (IPSec) gateway) receives the request and extracts a sever name contained in the request. In HTTPS implementations, the server name is specified as server name indication (SNI). SNI is a cleartext field that specifies a hostname of the destination web service server. In HTTP implementations, the server name is specified as the HOST header. The server-side bypass list identifies bandwidth conservable server names of rich content sources. NSS compares the extracted server name to entries in the server-side bypass list and reclassifies the request as loss prevention inspectable or bandwidth conservable. If the request is reclassified as loss prevention inspectable, the network gateway forwards it to the decrypter for stream inspection, followed by deep inspection by the DILPA. If the request is reclassified as bandwidth conservable, the network gateway forwards it to the destination web service server, bypassing inspection by the decrypter and the DILPA. Since the request is intercepted by the NSS but not passed on or transferred to other processing modules of the NSS such as the decrypter and the DILPA, it is referred to as an "internal bypass".

In another server-side implementation of internal bypass, consider a scenario where the ERC misclassifies a bandwidth conservable connection access request as loss prevention inspectable and tunnels the request to the NSS. The misclassification can result from the client-side bypass list not having an entry for the bandwidth conservable request or from the bandwidth conservable request being encoded in a loss prevention inspectable connection identifier. Being unaware of the bandwidth conservable nature of the bandwidth conservable request, the NSS subjects the bandwidth conservable request to stream inspection by the decrypter and deep inspection by the DILPA. If the applicable policy allows, the NSS then forwards the bandwidth conservable request to the destination web service server.

The response from the destination web service server is received by the decrypter. decrypter inspects the packet headers in the response and determines whether the response includes data packets belonging to a bandwidth conservable content type. The determination is made by matching a content type identified by the packet headers against a server-side bypass list of bandwidth conservable content types that are not subject to deep inspection by the DILPA. If the packet headers identify a bandwidth conservable content type, the decrypter forwards the response to the endpoint device, bypassing deep inspection by the DILPA. This is also referred to as "internal bypassing".

To ensure that further incoming bandwidth conservable requests are not misclassified as loss prevention inspectable, the technology disclosed generates a so-called "supplemental bypass list" in response to the internal bypassing. The supplemental bypass list contains a bandwidth conservable connection identifier that identifies the bandwidth conservable request as bandwidth conservable. The bandwidth conservable connection identifier can be a domain name, a URL, and a server name (e.g. SNI, HOST header). The supplemental bypass list is then deployed to the ERC for subsequent client-side bypassing of further incoming requests having the same domain name or URL or containing the same server name (e.g., server name indication (SNI), HOST header) as the previously misclassified bandwidth conservable request. This is referred to as "dynamic deployment". Dynamic deployment can occur in real-time, immediately following the internal bypassing, or can be scheduled to occur periodically. In implementations, the supplemental bypass list is also maintained at the NSS for server-side bypassing.

Error Reduction

The technology disclosed also relates to reducing error in security enforcement by the NSS. It does so by preventing deep inspection by the DILPA of certain connection preserving protocols and certificate pinned applications when they are invoked on Hypertext Transfer Protocol (HTTP) and Hypertext Transfer Protocol Secure (HTTPS) channels. The NSS monitors network traffic over standard HTTP and HTTPs ports like port 80 and port 443. Typically, the DILPA is set up to handle only HTTP and HTTPS traffic and blocks all non-HTTP and non-HTTPS traffic. This approach does not work well because many of the popular web services and peer-to-peer applications like Skype™ and Kazaa™ use port 80 and port 443 to pass non-HTTP and non-HTTPs traffic. User experience suffers when such web services and applications are blocked.

To solve this problem, the technology disclosed uses the decrypter to detect non-HTTP and non-HTTPS requests over HTTP and HTTPs channels and forwards such requests to the destination web service servers, preventing connection termination and error generation by the NSS due to unsupported known protocols.

The NSS also detects requests from certificate pinned applications and directly forwards them the destination application servers without terminating or closing the connection or producing an error condition. Certificate pinned applications, such as Dropbox™ native application, Microsoft Outlook™, AirWatch™, Barclays mobile banking app™, Twitter™, and WhatsApp™, are pre-configured to only trust the destination web service servers and do not trust a certificate of the NSS. When requests from certificate pinned applications are tunneled to the NSS, the applications refuse to establish a connection with the NSS due to the lack of trust. In response, the NSS could potentially block such requests, resulting in diminished user experience.

To solve this problem, the technology disclosed uses the network gateway to extract a server name (e.g., server name indication (SNI), HOST header) contained in a request. The extracted server name is looked up in a bypass list (e.g., error bypass list) to determine whether the request was initiated by a certificate pinned application. If so, the network gateway forwards the request to the destination web service server, preserving the connection and avoiding error generation due to unsupported known protocols.

In some cases, the decrypter uses a server name (e.g., server name indication (SNI), HOST header) contained in a response to determine whether the response was sent by a certificate pinned application. If so, the decrypter forwards the response to the endpoint device, preserving the connection and avoiding error generation due to unsupported known protocols.

As used herein, the term "data loss prevention inspectable" can refer to the term "non-exempt" and the terms "bandwidth conservable" and "connection preserving" can refer to the term "exempt".

Environments

Figure 2:
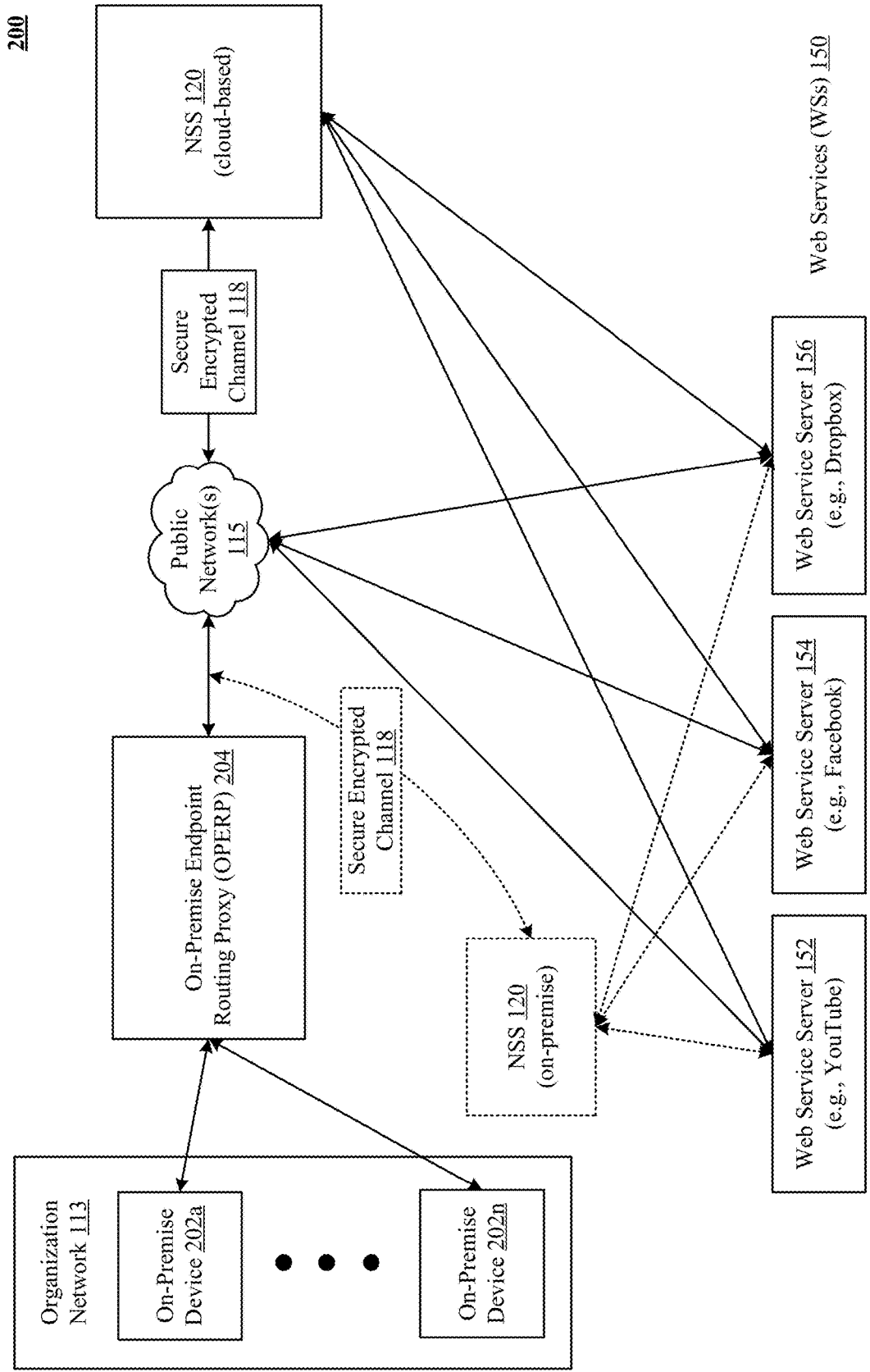
FIG. 2 shows a block diagram of an example environment in which an on-premise endpoint routing proxy (OPERP), connected to an organization network of devices, tunnels loss prevention inspectable connection access requests to a NSS and routes bandwidth conservable connection access requests to web services.
Figure 3:
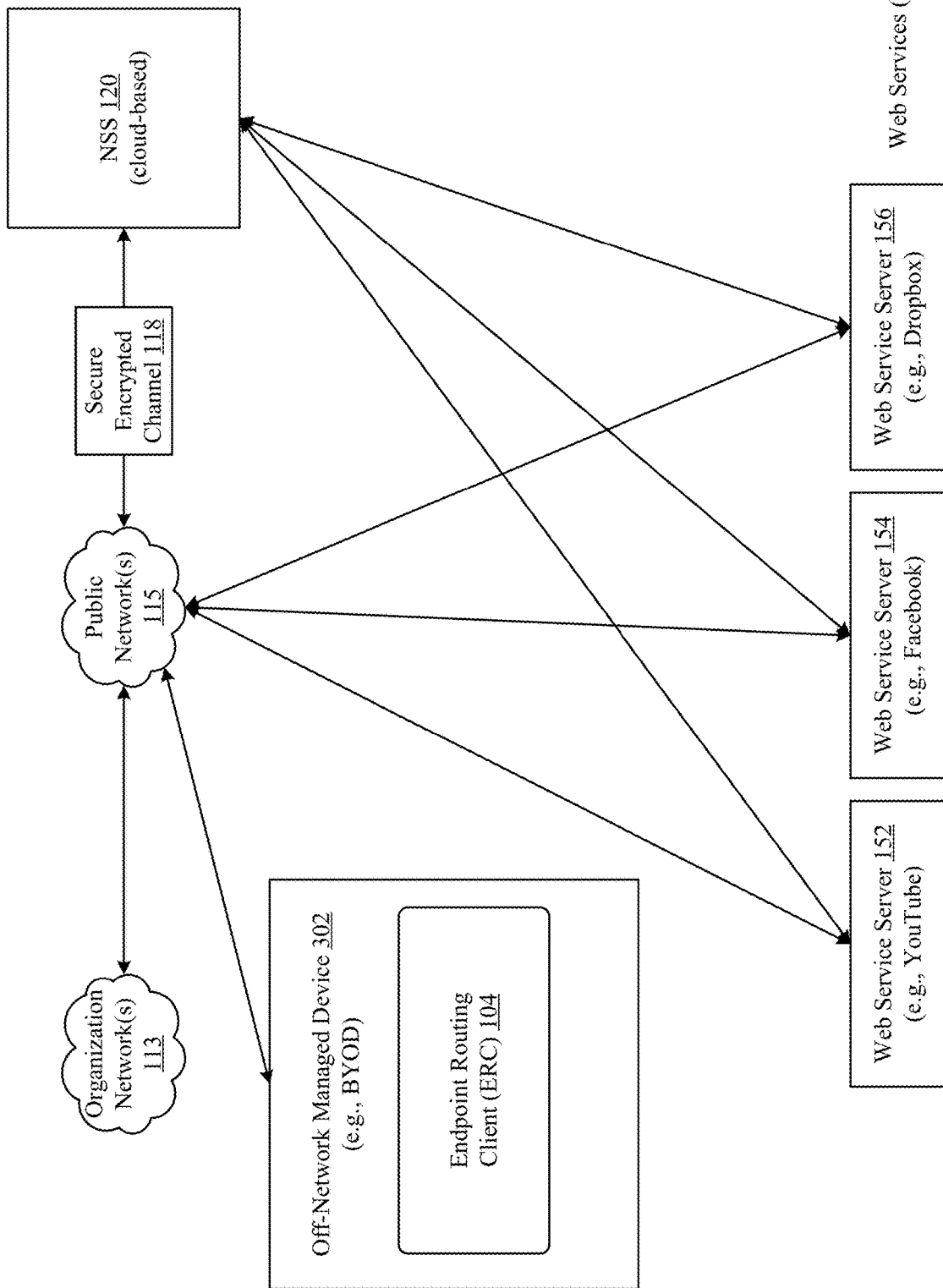
FIG. 3 depicts a block diagram of an example environment in which an ERC, running on an off-network managed device, tunnels loss prevention inspectable connection access requests to a NSS and routes bandwidth conservable connection access requests to web services.

We describe systems, methods, and articles of manufacture that reduce latency and error in security enforcement by a network security system (NSS). FIGS. 1-3 show an architectural level schematic of example environments 100, 200, and 300 in which the technology disclosed can be used. Because FIGS. 1-3 are architectural diagrams, certain details are intentionally omitted to improve clarity of the description.

The discussion of FIGS. 1-3 will be organized as follows. First, the elements of the figures will be described, followed by their interconnections. Then, the use of the elements in the system will be described in greater detail. Wherever practicable, similar or like reference characters are used in the drawings to indicate similar or like functionality.

FIG. 1 illustrates a block diagram of an example environment 100 that includes an endpoint routing client (ERC) 104 running on an on-network managed device 102. See the discussion of FIG. 5 for additional example modules of the ERC 104. Device 102 is connected to the public network(s) 115 through an organization network(s) 113. Environment 100 also includes a network security system (NSS) 120 and a secure encrypted channel 118 for communicating with the NSS 120. See the discussion of FIG. 4 for additional example modules of the NSS 120. Environment 100 also includes web services (WSs) 150 like YouTube™, Facebook™, and Dropbox™ that run on web service servers like web service server 152, web service server 154, and web service server 156.

FIG. 2 illustrates a block diagram of an example environment 200 that includes an on-premise endpoint routing proxy (OPERP) 204. See the discussion of FIG. 6 for additional example modules of the OPERP 204. OPERP 204 is connected to the organization network(s) 113 that includes on-premise devices 202a-202n. OPERP 204 is further connected to the public network(s) 115, which it uses to communicate with the NSS 120 and the web services 150.

FIG. 3 illustrates a block diagram of an example environment 300 in which the ERC 104 runs on an off-network managed device 302. Device 302 is a so-called "bring your own device" (BYOD) that is outside the purview of the organization network(s) 113 and directly connected to the public network(s) 115. Device 302 uses the public network(s) 115 to communicate with the NSS 120 and the web services 150.

The interconnection of the elements of environments 100, 200, and 300 will now be described. The public network(s) 115 couples the devices 102, 202a-202n, and 302, the NSS 120, and the web services 150, all in communication with each other (indicated by solid double-arrowed lines). The actual communication path can be point-to-point over public and/or private networks. Some items, such as ERC 104, might be delivered indirectly, e.g., via an application store (not shown). The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Devices 102, 202a-202n, and 302 can be desktop computers, laptops, tablet computers, mobile phones, or any other type of computing devices. The engines or system components of environments 100, 200, and 300 such as the OPERP 204 and the NSS 120 are implemented by software running on varying types of computing devices. Example devices are a workstation, a server, a computing cluster, a blade server, and a server farm.

Having described the elements of FIGS. 1-3 and their interconnections, elements of the figures will now be described in greater detail.

Web Services

In FIGS. 1-3, three web services are shown, however, it is understood that environments 100, 200, and 300 can include any number of web services. Web services 150 can be news websites, blogs, video streaming websites, social media websites, hosted services, cloud applications, cloud stores, cloud collaboration and messaging platforms, and/or cloud customer relationship management (CRM) platforms. They can be a network service or application, or can be web-based (e.g., accessed via a URL) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common web services today include YouTube™, Facebook™ Twitter™, Google™, LinkedIn™, Wikipedia™, Yahoo™, Baidu™, Amazon™, MSN™ Pinterest™, Taobao™, Instagram™, Tumblr™, eBay™, Hotmail™, Reddit™ IMDb™, Netflix™, PayPal™, Imgur™, Snapchat™, Yammer™, Skype™, Slack™, HipChat™ Confluence™, TeamDrive™, Taskworld™, Chatter™, Zoho™, ProsperWorks™, Google's Gmail™, Salesforce.com™, Box™, Dropbox™, Google Apps™, Amazon AWS™, Microsoft Office 365™, Workday™, Oracle on Demand™, Taleo™, Jive™, and Concur™

Web services 150 often publish their application programming interfaces (APIs) to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of web services. Implementations of the technology disclosed use different types of APIs, including web service APIs such as HTTP or HTTPs based APIs like SOAP, WSDL, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include Amazon EC2 API™, Box Content API™, Box Events API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, and aggregated-single API like CloudRail™ API.

Having described the web services 150 and their APIs, the discussion now turns to the NSS 120.

Network Security System (NSS)

Figure 4:
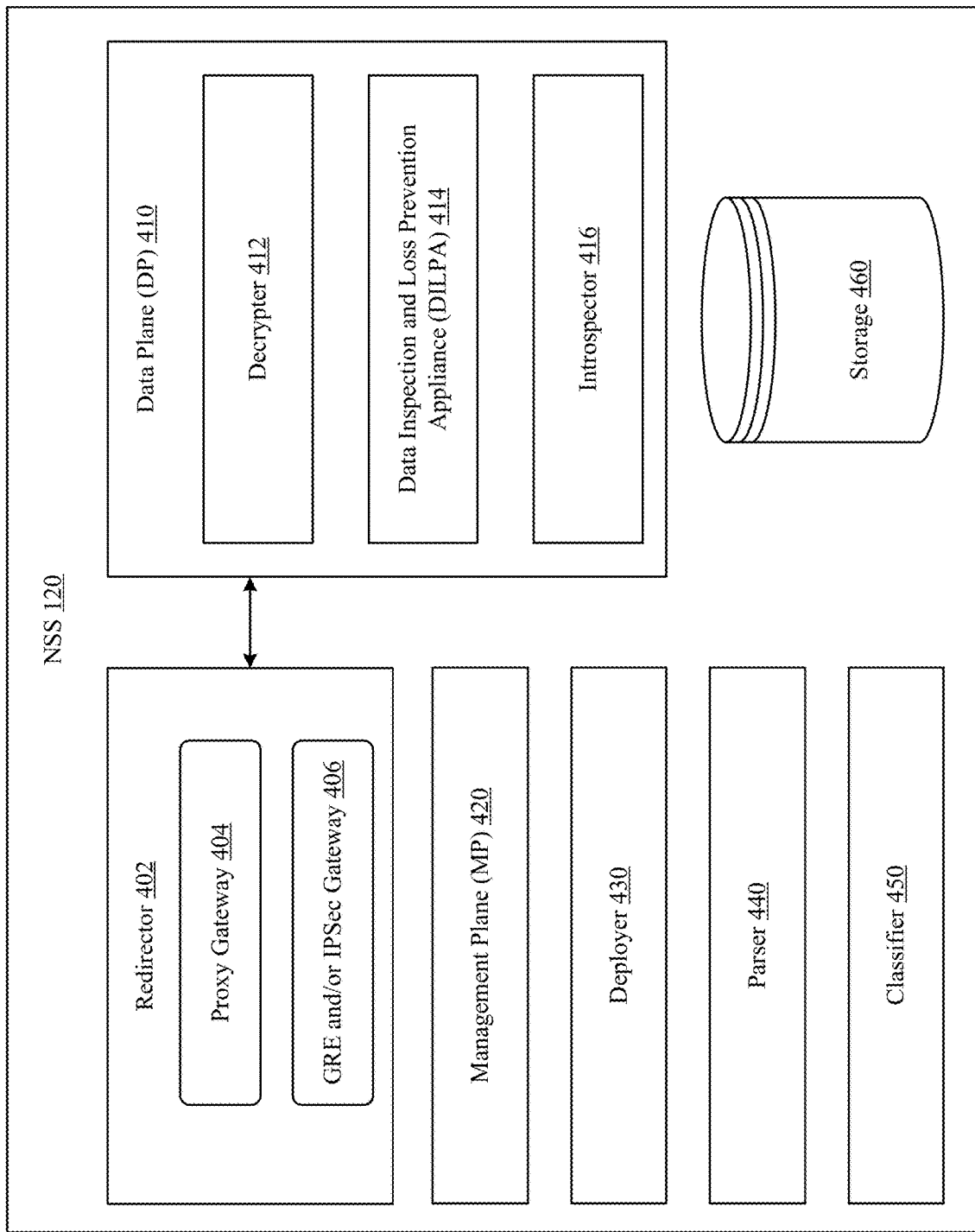
FIG. 4 is a block diagram of example NSS modules.

FIG. 4 is a block diagram of example modules 400 of the NSS 120. NSS 120 provides a variety of functionalities including providing a data plane 410, a management plane 420, and a storage 460. See the discussion of FIG. 7 for additional example modules of the storage 460. Other functionalities, e.g., a control plane (not shown), may also be provided. These functionalities collectively provide secure network access to the web services 150 by devices 102, 202a-202n, and 302. More generally, the NSS 120 provides application visibility and control functions as well as security. For further information regarding the functionalities of the NSS 120, reference can be made to, for example, commonly owned U.S. patent application Ser. Nos. 14/198, 499; 14/198,508; 14/835,640; 14/835,632; and 62/307,305; Cheng, Ithal, Narayanaswamy, and Malmskog. *Cloud Security For Dummies, Netskope Special Edition.* John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud*

Confidence" by Netskope, Inc.; "*The Netskope Reactive Platform*" by Netskope, Inc.; "*The Netskope Advantage: Three "Must-Have" Requirements for Cloud Access Security Brokers*" by Netskope, Inc.; "*The* 15 *Critical NSS Use Cases*" by Netskope, Inc.; "*Netskope Reactive Cloud DLP*" by Netskope, Inc.; "*Repave the Cloud-Data Breach Collision Course*" by Netskope, Inc.; and "*Netskope Cloud Confidence Index™*" by Netskope, Inc., which are incorporated by reference for all purposes as if fully set forth herein.

The network security system (NSS) 120 can be implemented on-premise (as indicated by dotted lines in FIGS. 1-2) or can be cloud-based (as indicated by solid lines in FIGS. 1-3).

NSS 120 also includes a redirector 402 for routing network traffic. Redirector 402 includes a proxy gateway 404 and a generic routing encapsulation (GRE) and/or internet protocol security (IPSec) gateway 406. In some implementations, proxy gateway 404 and GRE and/or IPSec gateway 406 route incoming connection access requests to the data plane 410. In other implementations, proxy gateway 404 and GRE and/or IPSec gateway 406 route incoming connection access requests to the web services 150. Proxy gateway 404 receives network traffic from managed devices like device 102 and 302 and from OPERP 204. GRE and/or IPSec gateway 406 receives network traffic from a central network device (e.g., Cisco™ or Juniper™ router) of an organization network. In implementations, one or both of the proxy gateway 404 and the GRE and/or IPSec gateway 406 are not part of the NSS 120 and instead route traffic towards or away from the NSS 120.

Data plane 410 includes a decrypter 412, a data inspection and loss prevention appliance (DILPA) 414, and an introspector 416. See the discussion of FIG. 8 for additional example modules of the DILPA 414.

Decrypter 412 de-encrypts the data packets flowing in and out of the NSS 120 and makes them available to the DILPA 414 for deep inspection. After deep inspection by the DILPA 414 is complete, decrypter 412 re-encrypts the data packets and sends them to their intended destination.

Figure 8:
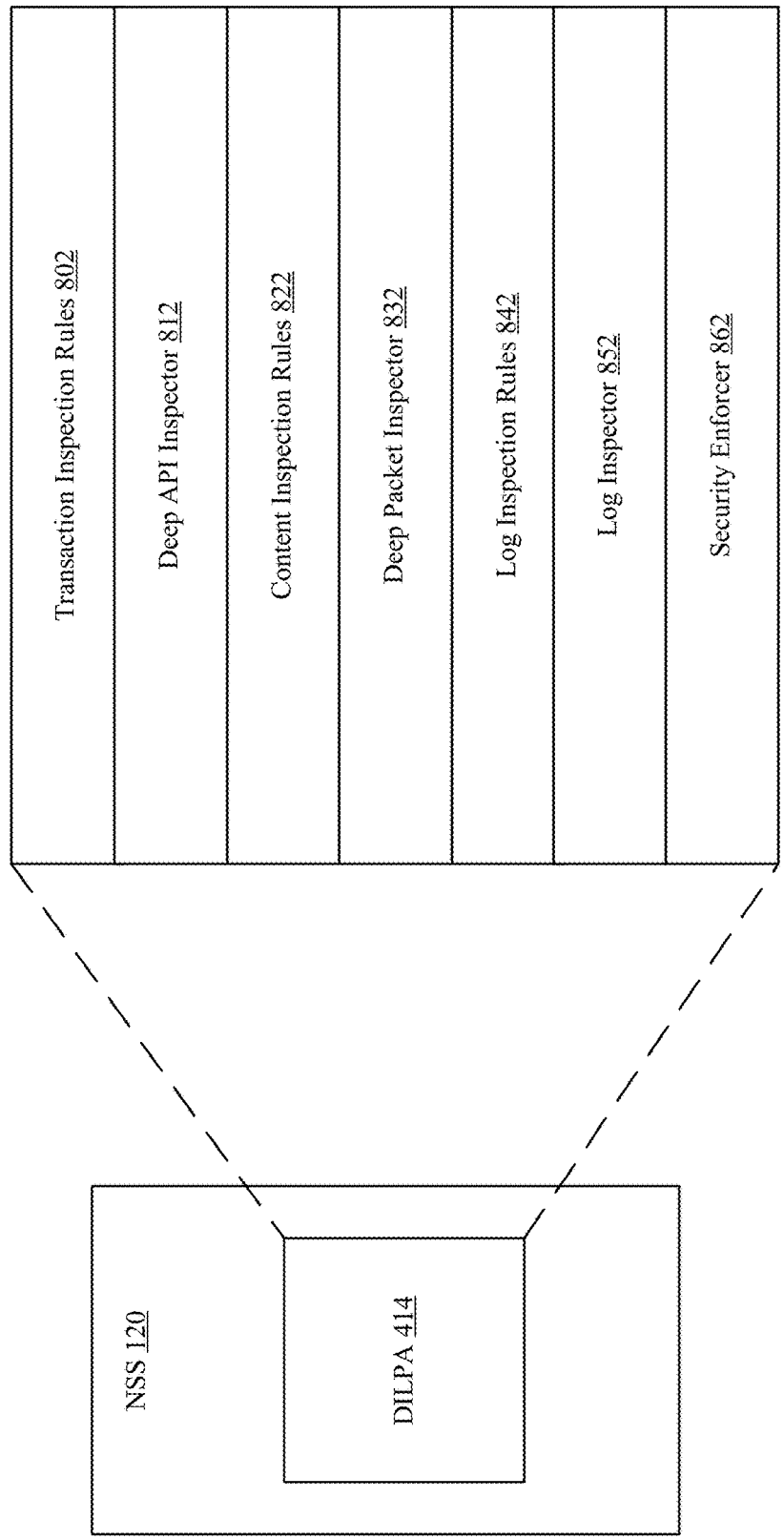
FIG. 8 is a block diagram of example sub-modules of a data inspection and loss prevention appliance (DILPA) of the NSS.

Regarding DILPA 414, FIG. 8 shows a block diagram of example sub-modules 800 of the DILPA 414. DILPA 414 is interposed between the devices 102, 202*a*-202*n*, and 302 and the web services 150. In some implementations, DILPA 414 is a cloud-based data inspection and loss prevention appliance (CBDILPA). In other implementations, DILPA 414 is an on-premise data inspection and loss prevention appliance (ONDILPA). DILPA 414 comprises transaction inspection rules 802, deep API inspector 812, content inspection rules 822, deep packet inspector 832, log inspection rules 842, log inspector 852, and security enforcer 862. DILPA 414 uses its sub-modules 800 to apply deep API inspection (DAPII), deep packet inspection (DPI), and log inspection on the network traffic traversing the public network(s) 115 to and from the web services 150.

DILPA 414 uses DAPII to detect web transactions in real-time, including calls made to the web services 150. The web transactions are decomposed to identify the activity being performed and its associated parameters. In one implementation, the web transactions are represented as JSON files, which identify a structure and format that allows the DILPA 414 to both interpret what actions a user is performing in the web service as it is happening. So, for example, DILPA 414 can detect for an organization that "Joe from Investment Banking, currently in Japan, shared his M&A directory with an investor at a hedge fund at 10 PM".

DILPA 414 uses DPI to perform data loss prevention (DLP). DILPA 414 achieves this by subjecting the data packets to content inspection techniques like language-aware data identifier inspection, document fingerprinting, file type detection, keyword search, pattern matching, proximity search, regular expression lookup, exact data matching, metadata extraction, and language-agnostic double-byte character inspection.

DILPA 414 uses log inspection to monitor user activity and detect the web services interfacing with the organization network(s) 113. DILPA 414 does so by analyzing the event logs generated by from perimeter networking infrastructure such as firewalls and secure web gateways.

DILPA 414 uses security enforcer 862 to take action on the incoming connections access requests, such as blocking sharing of a file, preventing upload of a file, preventing download of a file, quarantining files, providing coaching, seeking justification, and so on.

Introspector 416 is not proxy driven, rather it interacts directly with the web services 150 using secure APIs published by the web services 150 to control application behaviors and content residing in the web services 150. It inventories both content and users of that content. In a polling mode, introspector 416 calls the web services 150 using API connectors to crawl data resident in the web services 150 and check for changes. As an example, Box™ storage application provides an admin API called the Box Content API™ that provides visibility into an organization's accounts for all users. The introspector 416 polls this API to discover any changes made to any of the accounts. If so, the Box Events API™ is polled to discover the detailed data changes. In a callback model, the introspector 416 registers with the web services 150 via API connectors to be informed of any significant events. For example, the introspector 416 can use Microsoft Office365 Webhooks API™ to learn when a file has been shared externally. Like the DILPA 414, introspector 416 also has deep API inspection (DAPII), deep packet inspection (DPI), log inspection, and security enforcement capabilities.

One result of the inspection by the data plane 410 is generation of metadata 752 about the content, the users, and the users' interaction with the content. Metadata 752 is stored in the storage 460 and used for enforcing security policies.

The management plane 420, among other things, includes a web management interface (WMI) that can be used to configure and populate the bypass lists, the supplemental bypass lists, and the policies. The deployer 430 provides devices 102 and 302 with the appropriate ERC 104 (e.g., VPN on demand or agent) for configuration. The deployer 430 is also be responsible for providing the bypass lists, the supplemental bypass lists, and the policies to the ERC 104 and the OPERP 204, including any updates to the bypass lists, the supplemental bypass lists, and the policies. In implementations, deployer 430 is responsive to the management plane 420.

Figure 7:
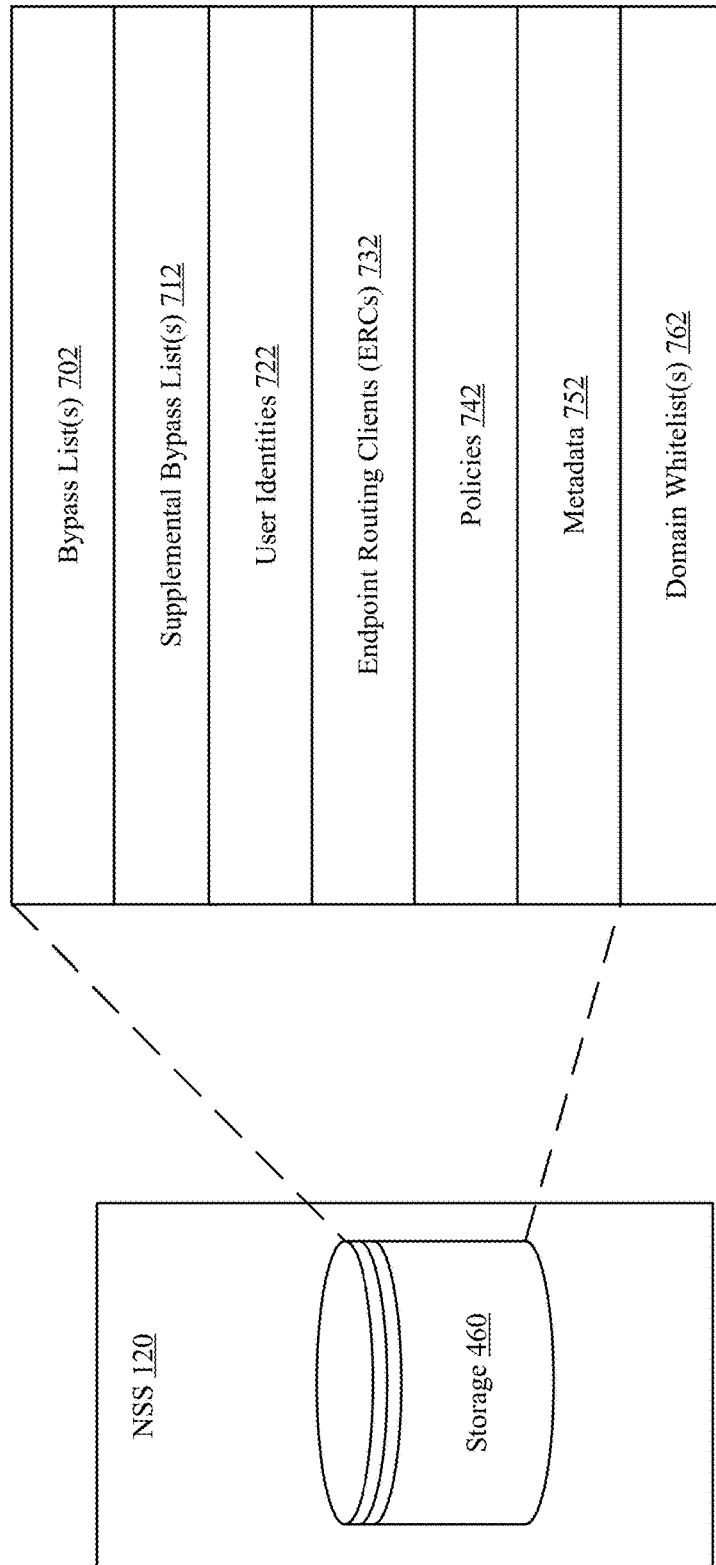
FIG. 7 illustrates a block diagram of example sub-modules of a NSS storage module.

FIG. 7 illustrates a block diagram of example sub-modules 700 of the storage 460. Storage 460 stores, among other things, a bypass list(s) 702, a supplemental bypass list(s) 712, user identities 722, endpoint routing clients (ERCs) 732, policies 742, metadata 752, and domain whitelist(s) 762.

Data plane 410 and storage 460 can include one or more computers and computer systems coupled in communication with one another. They can also be one or more virtual computing and/or storage resources. For example, data plane 410 may be one or more Amazon EC2™ instances and storage 460 may be an Amazon S3™ storage. Other computing-as-service platforms such as Force.com™ from Salesforce.com™, Rackspace™, or Heroku™ could be used rather than implementing the NSS 120 on direct physical computers or traditional virtual machines. Additionally, the data plane 410 may be distributed geographically and/or co-hosted with particular web services. Similarly, the management plane 420 may be distributed geographically. The two types of planes may be either separately hosted or co-hosted as well.

Having described the NSS 120, the discussion now turns to the bypass list(s) and the supplemental bypass list(s).

Bypass List(s) and Supplemental Bypass List(s)

The bypass list(s) and the supplemental bypass list(s) can be stored—at the ERC 104 as bypass list(s) 502 and supplemental bypass list(s) 512, at the OPERP 204 as bypass list(s) 602 and supplemental bypass list(s) 612, and at the NSS 120 as bypass list(s) 702 and supplemental bypass list(s) 712. In implementations, the bypass list(s) and the supplemental bypass list(s) are configured on a per-tenant basis. Portions of this application collectively refer to the bypass list(s) 502 and supplemental bypass list(s) 512 at the ERC 104 as client-side bypass list(s). Also, portions of this application collectively refer to the bypass list(s) 602 and supplemental bypass list(s) 612 at the OPERP 204 and the bypass list(s) 702 and supplemental bypass list(s) 712 at the NSS 120 as server-side bypass list(s).

The bypass list(s) and the supplemental bypass list(s) identify bandwidth conservable destination identifiers that are not subject to routing through the data plane 410. In implementations, they identify bandwidth conservable destination identifiers that are not subject to routing through the DILPA 414. In implementations, they identify bandwidth conservable destination identifiers for which inspection bandwidth of the DILPA 414 can be conserved by bypassing the DILPA 414. In one implementation, the bandwidth conservable destination identifiers identify rich content sources that have high latency requirements but low DLP value (e.g., Netflix™, YouTube™, Pandora™, Spotify™, Cisco WebEx™)

A sample set of bandwidth conservable destination identifiers according to one implementation includes the following:

| Destination identifiers | Example(s) |
| --- | --- |
| Domain names | www.youtube.com |
| Subdomain names | uk.youtube.com |
| Unified resource locators (URLs) | www.youtube.com/user/CNN |
| Content types | video, application, audio, image, multipart, and text |
| Content sub-types | application/json, text/html |
| Web Categories | streaming media, recreational videos, social media, Internet radio and TV, Internet telephony, peer-to-peer file sharing, educational videos, profanity, business and economy, banking, finance, advertisements, application and software download, instant messaging, message boards and forums, online brokerage and trading, pay-to-surf, personal network storage and backup, surveillance, and viral videos. |
| Server names (e.g. server name indications (SNIs), HOST headers) | www.youtube1.com |
| System services | operating system (OS) updates, security path updates, push notifications |
| Certificate pinned applications | dropboxnative.com (Dropbox ™ native application), Microsoft Outlook ™, AirWatch ™, Barclays mobile banking app ™, Twitter ™, WhatsApp ™ |
| Network location profiles | Home, public, and work |
| Source countries | India |
| Source Internet Protocol (IP) address and/or ranges and/or subnets for the source IP address | 2.3.6.7<br>4.5.6.8-4.5.6.19<br>10.0.0.0/8 |
| Destination IP address and/or ranges and/or subnets for the destination IP address | 8.4.8.1<br>2.9.6.5-8.2.1.28<br>11.1.0.0/6 |

In some implementations, the above sample set of bandwidth conservable destination identifiers are identified in so-called "performance bypass list(s)" and "performance supplemental bypass list(s)" that improve the performance of NSS 120 by reducing latency in security enforcement by the NSS 120.

The following JSON code shows one implementation of the bypass list(s) or the supplemental bypass list(s):

```
GET https://<addon_host>/config/getbypasslist
returns JSON:
{
  "names":      ["my.company.com", "*.portal.com"],
  "ips":        [
                  {"type": "ip", "value":"2.3.6.7"},
                  {"type": "range", "value":"4.5.6.8-4.5.6.19"},
                  {"type": "subnet" "10.0.0.0/8"}
                ]
}
```

The above JSON code identifies five example bandwidth conservable destination identifiers: (1) URL-based identifier (my.company.com), (2) domain name-based identifier (*.portal.com), (3) IP address-based identifier (2.3.6.7), (4) IP range-based identifier (4.5.6.8-4.5.6.19), and (5) IP-subnet identifier (10.0.0.0/8). The JSON code can be generated in response to an administrative user identifying values for the bandwidth conservable destination identifiers via a web management interface (WMI) of the management plane 420. Once generated, the JSON code can be stored at the storage 460 and/or deployed to the ERC 104 and the OPERP 204 by the deployer 430. In implementations, the different bandwidth conservable destination identifiers can be stored in respective tables, objects, or databases (e.g., web_info. web_categories database, core_data.country_codes database, network location object profile of a collection of IP addresses). The bypass list(s) and the supplemental bypass list(s) can be stored in a tenant.bypass_settings database, an exception list table, or a tenant.bypass_settings table.

The bypass list(s) and the supplemental bypass list(s) also identify bandwidth conservable protocols that are not subject to routing through the DILPA 414 when invoked on Hypertext Transfer Protocol (HTTP) and Hypertext Transfer Protocol Secure (HTTPS) channels. A sample set of bandwidth conservable protocols and corresponding examples according to one implementation includes the following:

| Protocols | Protocol Example(s) | Channel Invoked |
| --- | --- | --- |
| Non-HTTP | Skype protocol ™ | HTTP (port 80) |
| Non-HTTPS | Skype protocol ™ | HTTPS (port 443) |
| Non-HTTP | FTPS, SMTPS | HTTPS (port 443) |
| Certificate pinned applications | dropboxnative.com (Dropbox ™ native application), Microsoft Outlook ™, AirWatch ™, Barclays mobile banking app ™, Twitter ™, WhatsApp ™ | HTTPS (port 443) |
| Server name-lacking | Python script | HTTPS (port 443) |
| Bad certificate | Untrusted root, incomplete chain, unsupported cipher | HTTPS (port 443) |

In some implementations, the above sample set of bandwidth conservable protocols are identified in so-called "error bypass list(s)" and "error supplemental bypass list(s)" that reduce error in security enforcement by the NSS 120. An administrative user can identify values for bandwidth conservable protocols via a web management interface (WMI) of the management plane 420. Once identified, the bandwidth conservable protocol values can be stored at the storage 460 and/or deployed to the OPERP 204 by the deployer 430.

Having described the bypass list(s) and the supplemental bypass list(s), the discussion now turns to the parser and the classifier.

Parser and Classifier

Parsers and classifiers can be stored—at the ERC 104 as parser 542 and classifier 552, at the OPERP 204 as parser 642 and classifier 652, and at the NSS 120 as parser 440 and classifier 450. When a connection access request (CAR) is received, it is subjected to analysis by the parsers. Parsers apply feature extraction on the CARs to identify different destination identifiers included in the CARs. One example of feature extraction includes identifying lexical characteristics of strings and substrings of a URL by traversing the address structure and data elements contained in the URL. Another example of feature extraction includes using domain name system (DNS) resolution to identify IP addresses, host names, and other destination identifiers associated with a URL. Examples of destination identifiers outputted or extracted by the parsers include domain names, subdomain names, URLs, server names (e.g. server name indications (SNIs), HOST headers), source countries, source IP address, and destination IP address.

Classifiers compare the strings and substrings associated with the extracted destination identifiers to entries in the bypass list(s) and/or the supplemental bypass list(s). Classifiers can use different similarity measures to determine whether an extracted connection identifier is present in the bypass list(s) and/or the supplemental bypass list(s). Some examples of similarity measures used by the classifiers include Jaccard similarity, Euclidean distance, Cosine similarity, Levenshtein distance, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms, edit distance technique, and Soergel distance.

If an extracted connection identifier is not present in the bypass list(s) and/or the supplemental bypass list(s), then the classifiers classify the associated or corresponding connection access request as a "loss prevention inspectable connection access request". If an extracted connection identifier is present in the bypass list(s) and/or the supplemental bypass list(s), then the classifiers classify the associated or corresponding connection access request as an "bandwidth conservable connection access request".

Having described the parser and the classifier, the discussion now turns to the ERC 104.

Endpoint Routing Client (ERC)

ERC 104 tunnels loss prevention inspectable connection access requests to the NSS 120 over a secure encrypted channel 118. In contrast, the ERC 104 routes bandwidth conservable connection access requests to web services 150.

Figure 5:
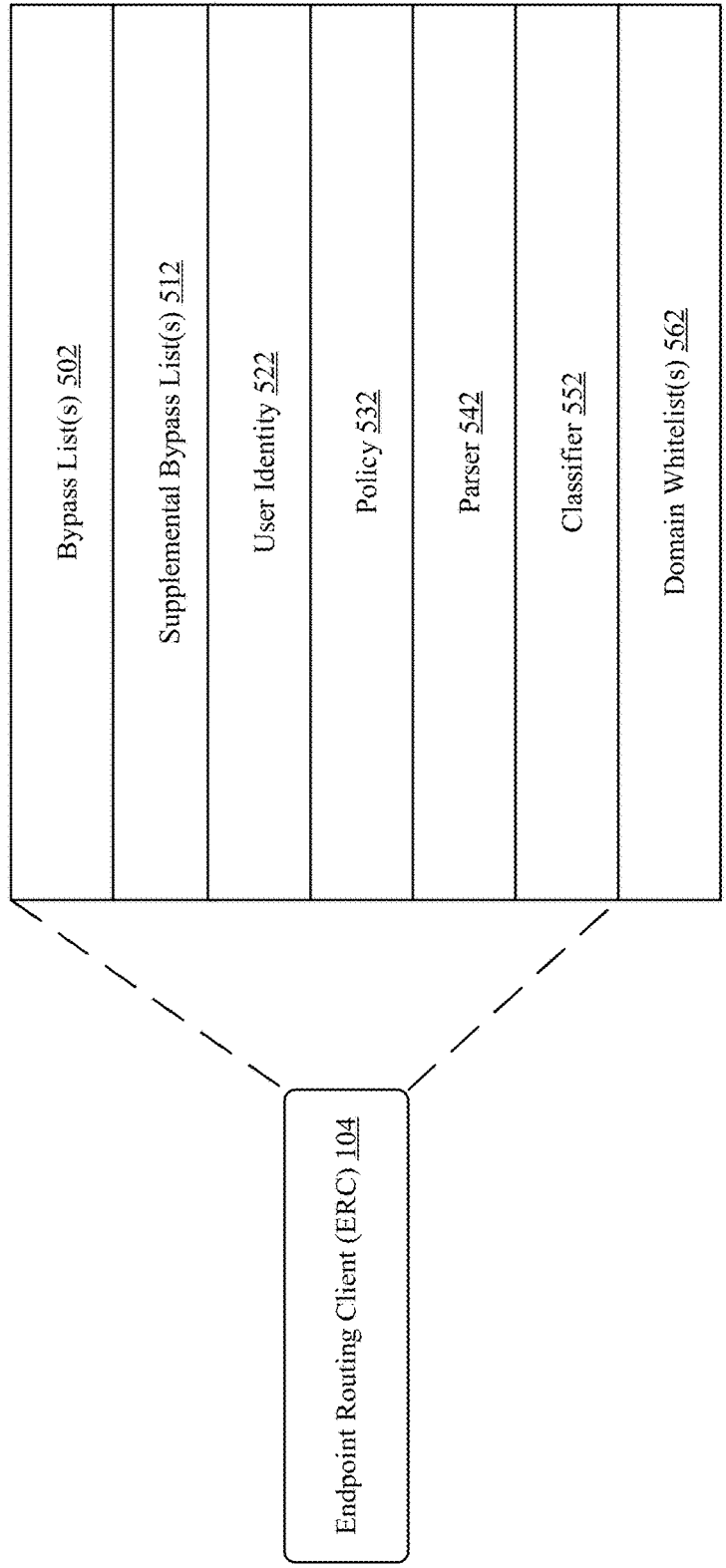
FIG. 5 shows a block diagram of example ERC modules.

FIG. 5 shows a block diagram of example ERC modules 500. A bypass list(s) 502, a supplemental bypass list(s) 512, a user identity 522, a policy 532, a parser 542, a classifier 552, and a domain whitelist(s) 562 can be provided, either embedded into the ERC 104 or as standalone items. Regarding ERC 104, depending on the type of device, it can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. ERC 104 can also be an agent that is downloaded using e-mail or silently installed using mass deployment tools like ConfigMgr™, Altris™, and Jamfr™.

User identity or user identification (e.g., user identities 522, 622, and 722), in the context of this specification refers to an indicator that is provided by the NSS 120 to the devices 102, 202a-202n, and 302. It may be in the form of a token, a unique identifier such as a universally unique identifier (UUID), a public-key certificate, or the like. In some implementations, the user identity may be linked to a specific user and a specific device; thus, the same individual may have a different user identity on their mobile phone vs. their computer. The user identity may be linked to an entry or userID corporate identity directory, but is distinct from it. In one implementation, a cryptographic certificate signed by the network security is used as the user identity. In other implementations, the user identity may be solely unique to the user and be identical across devices.

Policies (e.g., policies 532, 632, and 742) can be a machine-readable representation of flow control and logging requirements for web services. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a web service, e.g., where a corporation hosts a service and requires visiting customers to adhere to the policy for use. Of particular note is that the policies considered herein are capable of being sensitive to the semantics of a web service, which is to say a policy can differentiate between logging in to a web service from, say, editing documents on the web service. Context is important for understanding usage; for an entity, the collection of dozens or hundreds of individual policies (e.g., log bulk downloads, prohibit editing documents on the service, only allow bulk downloads for users who are in the "Vice President" group) is referred to singularly as one policy, or one policy definition. Thus, a system supporting multiple entities will generally have one policy per entity, each made up of dozens or hundreds of individual flow control and logging policies. Similarly, the policy that is transferred to individual computers may be a subset of a full corporate policy, e.g., solely a machine-readable representation of the URLs of interest, as opposed to the full policy specification for each URL describing the flow control and/or logging behaviors.

A sample set of policies according to one implementation includes the following:

- Block the upload of personally-identifiable information to cloud storage services with a CCI score of "medium" or below.
- Don't let users share content in cloud storage services rated medium or low or poor. In another implementation, web services rated medium or below can be considered non enterprise-ready and risky.
- Allow users in sales to share any public collateral while preventing them from downloading content deemed confidential from a cloud storage service to an unmanaged system.
- Alert IT if any user in investor relations shares content from a finance/accounting service with someone outside of the organization.
- Block any user located outside of the U.S. from downloading contacts from any CRM service.
- Only allow data uploads to services that have a CCI score of medium or above, and block uploads to the rest.
- Encrypt all content matching my confidential DLP profile in web services.
- Block download of any .exe file from a cloud storage service.
- Alert on the download of PII from any HR web service to a mobile device.

Having described the ERC 104, the discussion now turns to the OPERP 204.

On-Premise Endpoint Routing Proxy (OPERP)

OPERP 204 tunnels loss prevention inspectable connection access requests to the NSS 120 over a secure encrypted channel 118. In contrast, the OPERP 204 routes bandwidth conservable connection access requests to web services 150.

Figure 6:
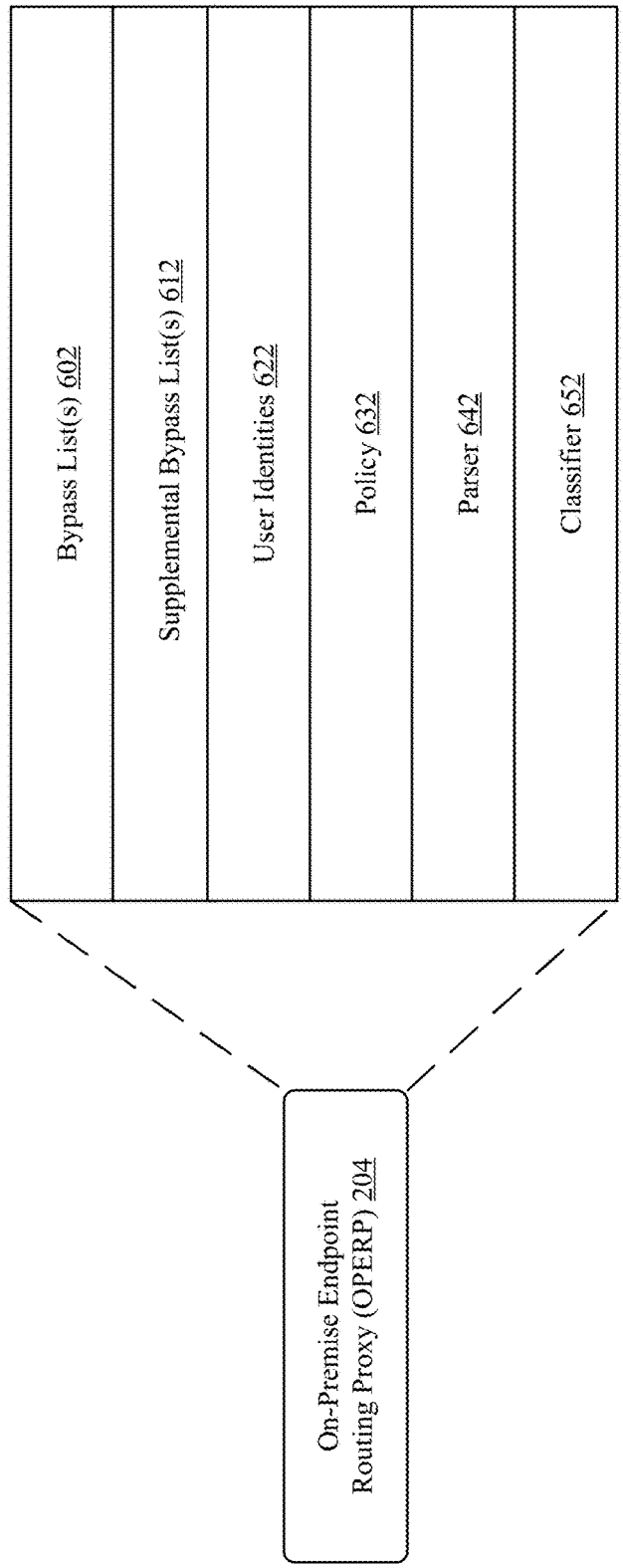
FIG. 6 depicts a block diagram of example OPERP modules.

FIG. 6 shows a block diagram of example OPERP modules 600. A bypass list(s) 602, a supplemental bypass list(s) 612, user identities 622, a policy 632, a parser 642, and a classifier 652 can be provided, either embedded into the OPERP 204 or as standalone items. Web traffic emanating from the on-premise devices 202a-202n of organization network(s) 113 is steered to the OPERP 204. In implementations, on-premise devices 202a-202n are not configured with ERC 104. OPERP 204 can take the form of a network security hardware appliance such as Netskope's Secure Cloud N1000™ and Secure Cloud N5000™.

Having described the OPERP 204, the discussion now turns to message sequence charts of FIGS. 9-18 which illustrate various aspects of the technology disclosed.

Message Sequence Charts

In the message sequence charts shown in FIGS. 9-18, multiple exchanges can be combined in some implementations. Other implementations may perform the exchanges in different orders and/or with different, fewer or additional exchanges than the ones illustrated in FIGS. 9-18. In implementations, all or some of the exchanges of FIGS. 9-18 (e.g., bypass exchanges and/or block exchanges) are logged. For convenience, the sequence charts are described with reference to the system that carries out a method. The system is not necessarily part of the method.

Performance-Based Bypass

Figure 9:
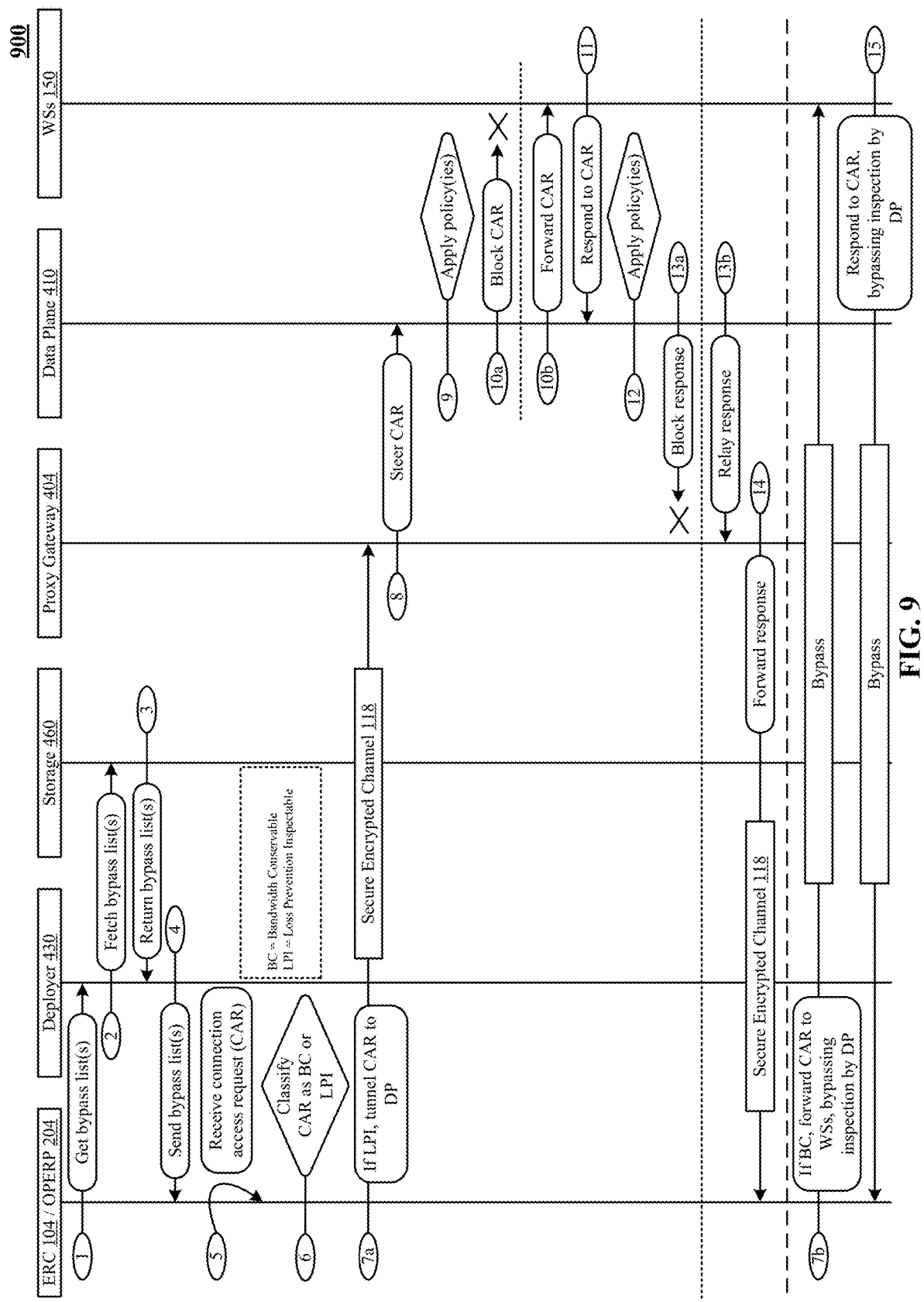
FIG. 9 illustrates a message sequence chart of reducing latency in security enforcement by a NSS using an ERC configured with a client-side bypass list.

FIG. 9 illustrates a message sequence chart 900 of reducing latency in security enforcement by NSS 120 using ERC 104 configured with a client-side bypass list. FIG. 9 shows communication paths between ERC 104, deployer 430, storage 460, proxy gateway 404, data plane 410, and web services (WSs) 150. In other implementations, in place of ERC 104, FIG. 9 can include OPERP 204 configured with a server-side bypass list. In yet other implementations, proxy gateway 404 can be replaced by GRE and/or IPSec gateway 406.

At exchange 1, ERC 104 requests the deployer 430 for bypass list(s). ERC 104 runs on the same device (e.g., device 102 or device 302) from which the CAR originated. At exchange 2, deployer 430 forwards that request to storage 460. At exchange 3, storage 460 returns the bypass list(s) to the deployer 430, which in turn forwards the bypass list(s) to ERC 104 at exchange 4.

At exchange 5, ERC 104 receives a connection access request (CAR). At exchange 6, parser 542 and classifier 552 of the ERC 104 operate on the CAR and classify it as either "loss prevention inspectable (LPI)" or "bandwidth conservable (BC)" based on comparison against entries in the bypass list(s), as discussed above. If the CAR is classified as loss prevention inspectable, then, at exchange 7a, ERC 104 tunnels it to data plane 410 over the secure encrypted channel 118. Typically, tunneling the CAR involves forwarding it to proxy gateway 404, which in turn steers the CAR to the data plane 410 at exchange 8.

After receiving the CAR, at exchange 9, data plane 410 applies one or more policies to the CAR. Based on the policy application, the CAR is either blocked at exchange 10A or forwarded to a destination web server identified by the CAR at one of the web services 150. If the CAR is sent to the destination web server at exchange 10b, data plane 410 receives a response from the destination web service at exchange 11. Data plane 410 subjects this response to policy enforcement at exchange 12 and either, at exchange 13*a*, prevents the response from being sent to the device from which the CAR originated or, at exchange 13*b*, relays the response to the device. Typically, relaying the response involves forwarding it to proxy gateway 404, which in turn steers the response to the device at exchange 14 over the secure encrypted channel 118.

In contrast, if the CAR is classified as bandwidth conservable, then, at exchange 7*b*, it is sent directly to the destination web server, bypassing inspection by the data plane 410. The bandwidth conservable classification can result because the CAR contains a bandwidth conservable domain name, a bandwidth conservable subdomain name, and/or a bandwidth conservable server name (e.g., server name indication (SNI), HOST header). The bandwidth conservable classification can also result because the CAR belongs to a bandwidth conservable web category. The bandwidth conservable classification can also result because the CAR was initiated by a certificate pinned application like Dropbox™ native application, Microsoft Outlook™, AirWatch™, Barclays mobile banking app™, Twitter™, and WhatsApp™. The bandwidth conservable classification can also result because the CAR was triggered by a system service like operating system (OS) updates, security path updates, and push notifications. The bandwidth conservable classification can also result because the CAR resolves to a bandwidth conservable network location profile, a bandwidth conservable source country code, a bandwidth conservable source IP address, a bandwidth conservable source IP address range, a bandwidth conservable source IP address subset, a bandwidth conservable destination IP address, a bandwidth conservable destination IP address range, and/or a bandwidth conservable destination IP address subset.

Furthermore, a response sent by the destination web server to the CAR at exchange 15 is not subjected to inspection by the data plane 410 and is directly sent to the device running the ERC 104.

Having described performance-based bypass, the discussion now turns to server name-based bypass.

Server Name-Based Bypass

Figure 10A:
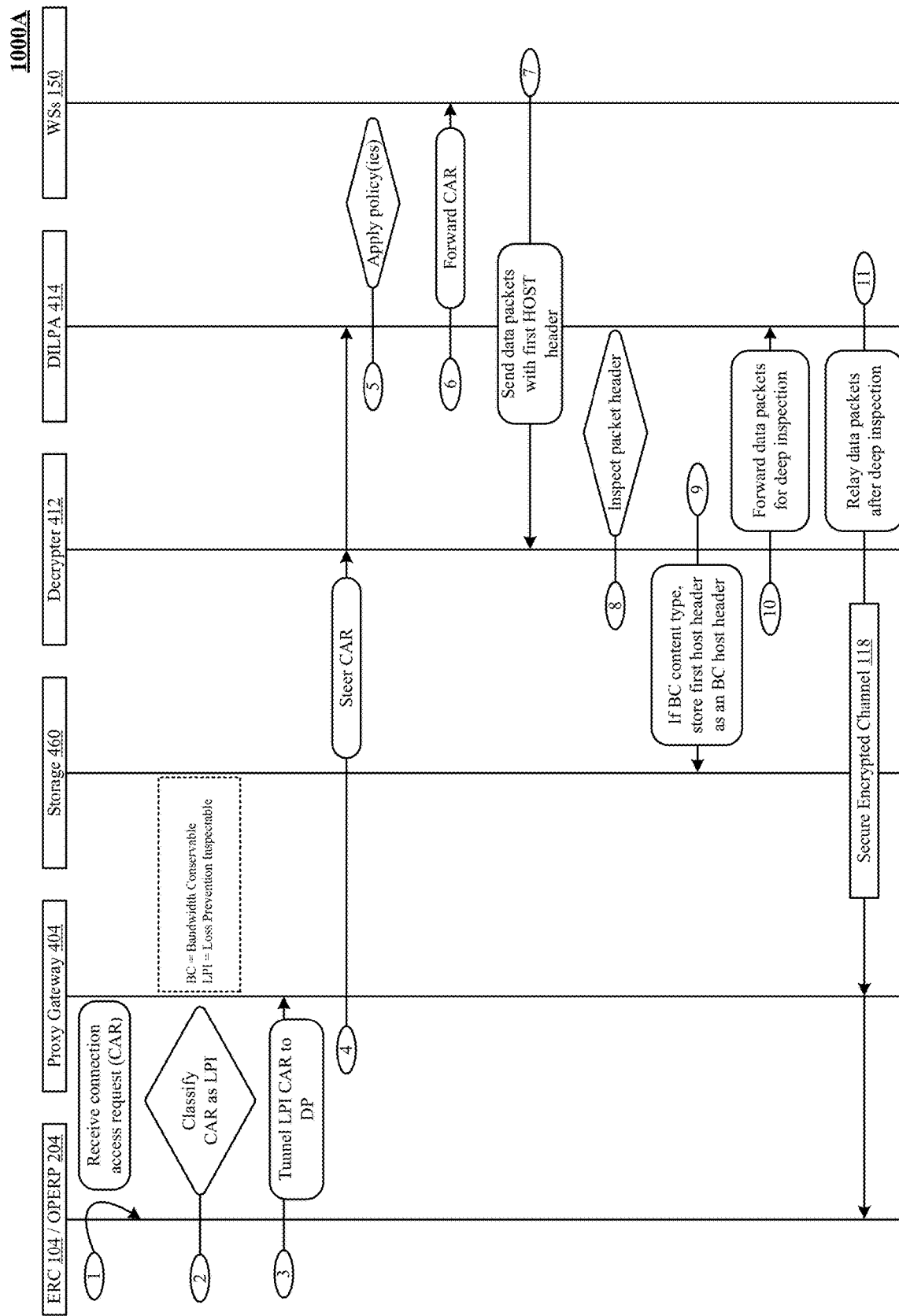
FIGS. 10A and 10B depict a message sequence chart of bypassing inspection of further incoming connection access requests containing a server name (e.g., server name indication (SNI), HOST header) that has been previously classified as bandwidth conservable.
Figure 10B:
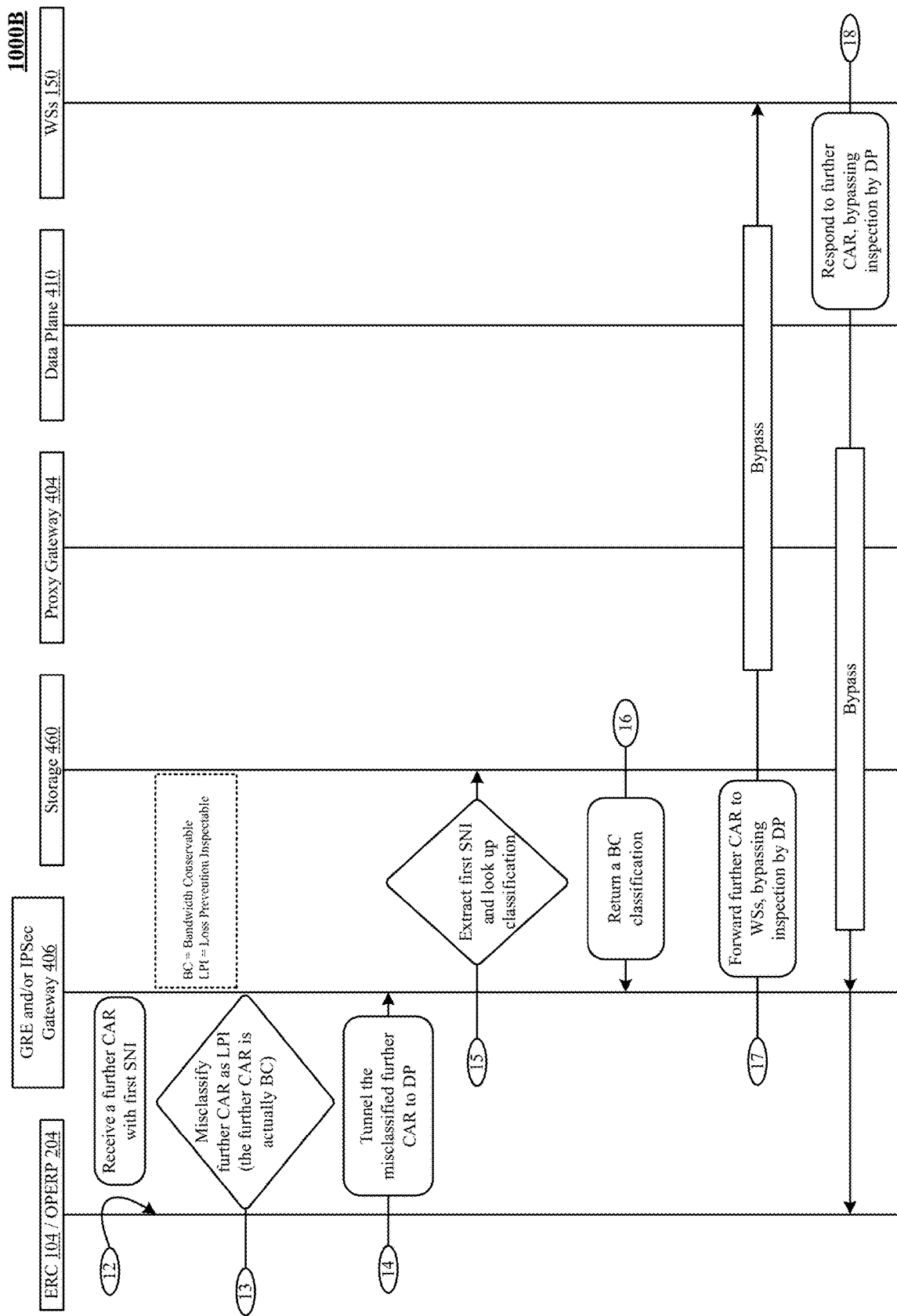

FIGS. 10A and 10B depict a message sequence chart 1000A and 1000B of bypassing inspection of further incoming connection access requests containing a server name (e.g., server name indication (SNI), HOST header) that has been previously classified as bandwidth conservable. FIGS. 10A and 10B show communication paths between ERC 104, proxy gateway 404, GRE and/or IPSec gateway 406, storage 460, SSL decrypted 412, DILPA 414, and web services (WSs) 150. In other implementations, in place of ERC 104, FIGS. 10A and 10B can include OPERP 204 configured with a server-side bypass list. In yet other implementations, proxy gateway 404 and GRE and/or IPSec gateway 406 can be used interchangeably.

Regarding SNI, SNI is a cleartext field of the SSL/TLS handshake that specifies a hostname of the destination web service server to identify the accessed websites. SNI is a clear string value from ClientHello messages that provides a convenient way to know which web service is accessed by a new connection. SNI is an SSL function that allows passing the desired web service server hostname in the initial SSL handshake message, so that the web service server can select the correct virtual host configuration to use in processing the SSL handshake. As used herein, the meaning of server name indication (SNI) conforms in relevant respects to its definition in the RFC 3546 standard published by the Internet Engineering Task Force (IETF) in June 2003 and the RFC 6066 standard published by the IETF in January 2011, including any other version updates of the RFC 3546 and RFC 6066 standards (S. Blake-Wilson, M. Nystrom, D. Hopwood, J. Mikkelsen, and T. Wright, "RFC 3546: Transport layer security (TLS) extensions," 2003. [Online]. Available: https://www.ietf.org/rfc/rfc3546.txt; D. Eastlake, "RFC 6066: The transport layer security (TLS) extensions: Extension definitions," 2011. [Online]. Available: http://tools.ietf.org/html/rfc6066, both of which are incorporated by reference herein).

At exchange 1, ERC 104 receives a connection access request (CAR). ERC 104 runs on the same device (e.g., device 102 or device 302) from which the CAR originated. At exchange 2, parser 542 and classifier 552 of the ERC 104 operate on the CAR and classify it as "loss prevention inspectable (LPI)". As a result, at exchange 3, ERC 104 tunnels the loss prevention inspectable CAR to proxy gateway 404. Proxy gateway 404, at exchange 4, steers the loss prevention inspectable CAR to DILPA 414 via decrypter 412. Decrypter 412 performs stream inspection on the loss prevention inspectable CAR.

At exchange 5, DILPA 414 uses deep inspection to apply one or more policies on the loss prevention inspectable CAR. At exchange 6, DILPA 414 forwards the loss prevention inspectable CAR to a destination web server identified by the loss prevention inspectable CAR at one of the web services 150.

At exchange 7, the destination web server sends a response to the loss prevention inspectable CAR. The response comprises data packets that are intercepted by the decrypter 412. At exchange 8, decrypter 412 performs stream inspection on the data packets and detects a first HOST header which identifies a first server name (e.g., server name indication (SNI), HOST header) associated with the destination web server.

Based on the evaluation of the first HOST header during stream inspection, at exchange 9, decrypter 412 determines whether the data packets belong to a bandwidth conservable (BC) content type. Examples of bandwidth conservable content types include video, application, audio, and image. In other implementations, stream inspection reveals whether the data packets belong to a bandwidth conservable content sub-type. One example of a bandwidth conservable content sub-type is application/j son. If the data packets belong to a bandwidth conservable content type and/or a bandwidth conservable content sub-type, then the first HOST header or the first server name (e.g., server name indication (SNI), HOST header), is stored as a "bandwidth conservable (BC) HOST header" or a "bandwidth conservable (BC) server name (e.g., server name indication (SNI), HOST header)" in storage 460. The storage can be made as an update to a bypass list(s) or as an update to a supplemental bypass list(s).

At exchange 10, DILPA 414 applies deep inspection on the data packets. At exchange 11, after deep inspection, DILPA 414 relays the data packets to the device running the ERC 104.

At exchange 12, ERC 104 receives a further incoming connection access request (CAR). At exchange 13, parser 542 and classifier 552 of the ERC 104 operate on the further incoming CAR and misclassify it as "loss prevention inspectable (LPI)". The misclassification can result from the client-side bypass list(s) not having any entry for the further incoming CAR or from the further incoming CAR being encoded in a loss prevention inspectable connection identifier. Being unaware of the bandwidth conservable (BC)

nature of the further incoming CAR, at exchange 14, ERC 104 attempts to tunnel it to the data plane 410 via the GRE and/or IPSec gateway 406. GRE and/or IPSec gateway 406, at exchange 15, extracts a server name (e.g., server name indication (SNI), HOST header) contained in the further incoming CAR and looks up its classification in the storage 460. In the case where the extracted server name (e.g., server name indication (SNI), HOST header) matches the first SNI which has been previously classified as a bandwidth conservable (BC) server name (e.g., server name indication (SNI), HOST header), storage 460 returns a bandwidth conservable (BC) classification for the further incoming CAR at exchange 16.

At exchange 17, the bandwidth conservable further incoming CAR is sent directly to the destination web server, bypassing inspection by the data plane 410. Furthermore, a response sent by the destination web server to the bandwidth conservable further incoming CAR at exchange 18 is not subjected to inspection by the data plane 410 and is directly sent to the device running the ERC 104.

Having described server name-based bypass, the discussion now turns to internal bypassing.

Internal Bypassing

Figure 11A:
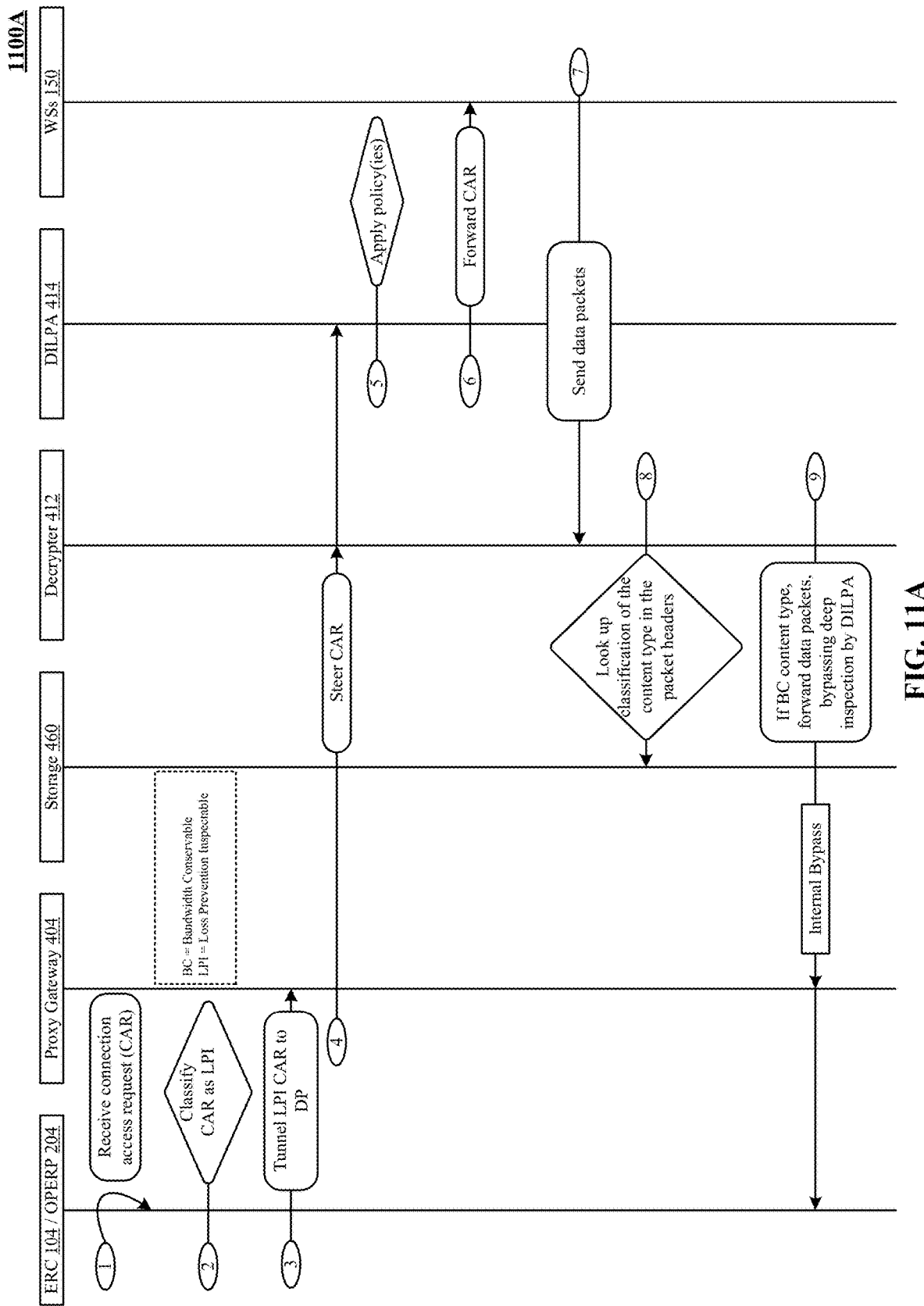
FIG. 11A shows a message sequence chart of internally bypassing deep inspection of web network responses containing bandwidth conservable content.
Figure 11B:
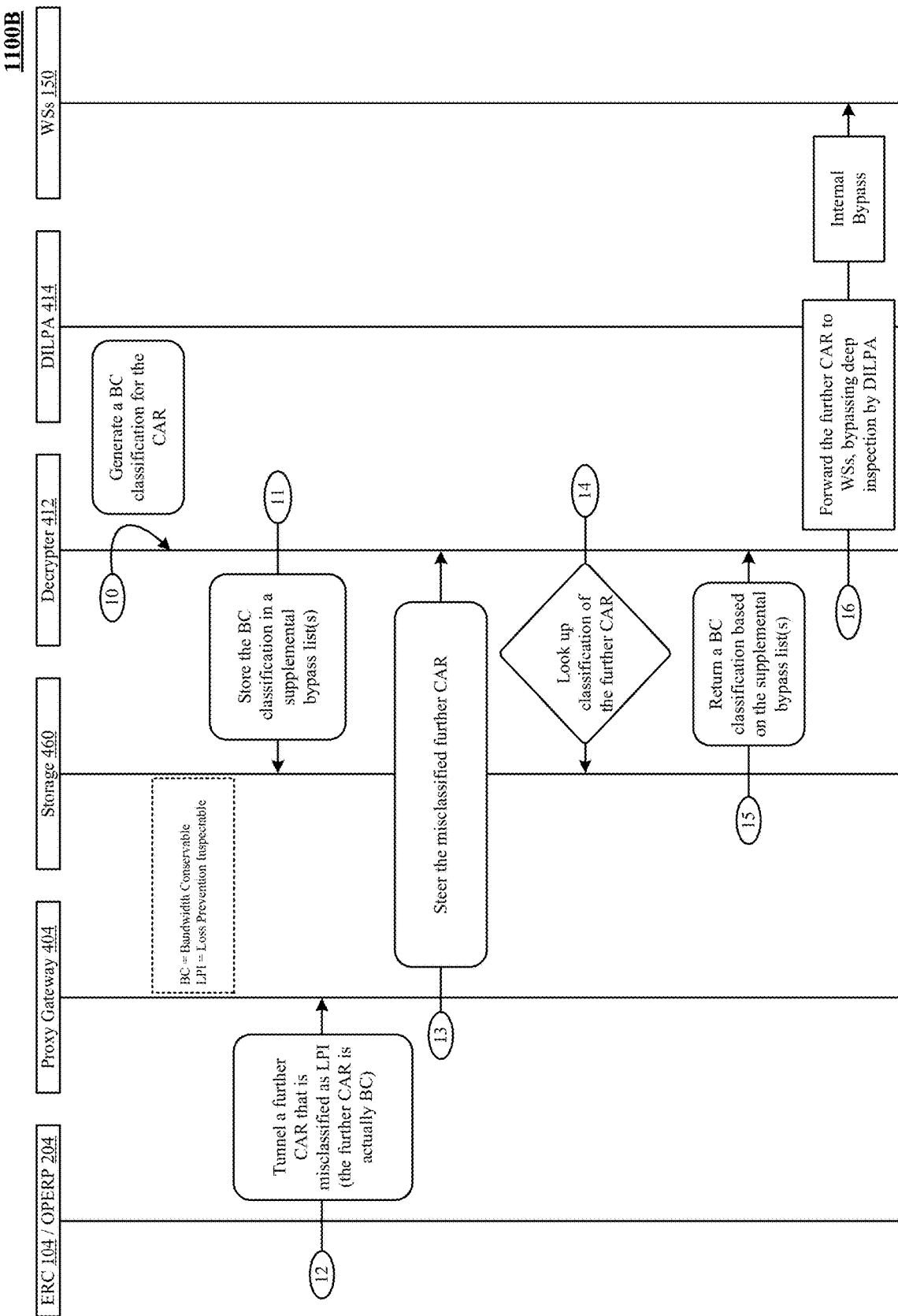
FIG. 11B illustrates a message sequence chart of internally bypassing deep inspection of a further incoming connection access request that has been previously classified as bandwidth conservable in a server-side supplemental bypass list.
Figure 11C:
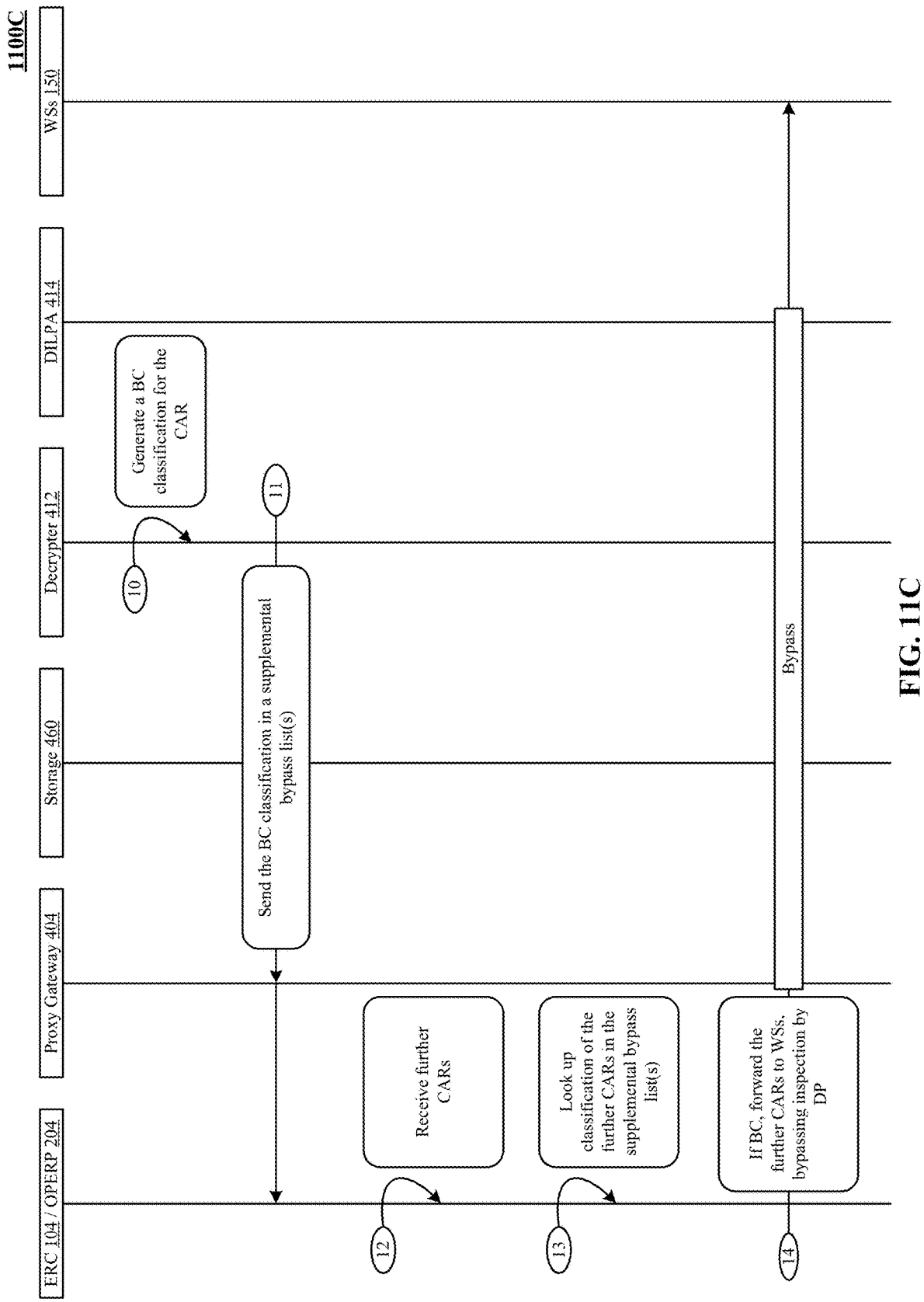
FIG. 11C shows a message sequence chart of bypassing inspection of a further incoming connection access request that has been previously classified as bandwidth conservable in a client-side supplemental bypass list.

FIG. 11A shows a message sequence chart 1100A of internally bypassing deep inspection of web network responses containing bandwidth conservable content. FIGS. 11A, 11B, and 11C show communication paths between ERC 104, proxy gateway 404, storage 460, SSL decrypted 412, DILPA 414, and web services (WSs) 150. In other implementations, in place of ERC 104, FIGS. 11A, 11B, and 11C can include OPERP 204 configured with a server-side bypass list. In yet other implementations, proxy gateway 404 can be replaced by GRE and/or IPSec gateway 406.

At exchange 1, ERC 104 receives a connection access request (CAR). ERC 104 runs on the same device (e.g., device 102 or device 302) from which the CAR originated. At exchange 2, parser 542 and classifier 552 of the ERC 104 operate on the CAR and classify it as "loss prevention inspectable (LPI)". As a result, at exchange 3, ERC 104 tunnels the loss prevention inspectable CAR to proxy gateway 404. Proxy gateway 404, at exchange 4, steers the loss prevention inspectable CAR to DILPA 414 via decrypter 412. Decrypter 412 performs stream inspection on the loss prevention inspectable CAR.

At exchange 5, DILPA 414 uses deep inspection to apply one or more policies on the loss prevention inspectable CAR. At exchange 6, DILPA 414 forwards the loss prevention inspectable CAR to a destination web server identified by the loss prevention inspectable CAR at one of the web services 150.

At exchange 7, the destination web server sends a response to the loss prevention inspectable CAR. The response comprises data packets that are intercepted by the decrypter 412. At exchange 8, decrypter 412 performs stream inspection on the data packets and determines whether the data packets belong to a bandwidth conservable (BC) content type by looking up a classification of the packet headers in the data packets. Examples of bandwidth conservable content types include video, application, audio, and image. In other implementations, stream inspection reveals whether the data packets belong to a bandwidth conservable content sub-type. One example of a bandwidth conservable content sub-type is application/json.

If the data packets belong to a bandwidth conservable content type and/or a bandwidth conservable content sub-type, then the data packets are not subjected to deep inspection by the DILPA 414 and are directly sent by the decrypter 412 to the device running the ERC 104 at messaged 9. This is referred to as "internal bypassing".

FIG. 11B illustrates a message sequence chart 1100B of internally bypassing deep inspection of a further incoming connection access request that has been previously classified as bandwidth conservable (BC) in a server-side supplemental bypass list.

Following the internal bypassing at exchange 9 in FIG. 11A, decrypter 412 generates a bandwidth conservable (BC) classification for the CAR at exchange 10. Decrypter 412 then stores the bandwidth conservable classification in storage 460 at exchange 11. The storage at exchange 11 can be made as an update to a bypass list(s) or as an update to a supplemental bypass list(s). The following code shows an example API call made to a PROVISIONER_SERVICE API to update the bypass list(s) and/or the supplemental bypass list(s):

PROVISIONER_SERVICE. "update/exceptionlist/ ".$tenantID;

The above API call can also pass an attribute "type" that indicates which bandwidth conservable connection identifier is modified. Some examples of attribute "type" are {src_netloc, dst_netloc, category, country, domain}.

At exchange 12, ERC 104 receives a further incoming connection access request (CAR). In response, parser 542 and classifier 552 of the ERC 104 operate on the further incoming CAR and misclassify it as "loss prevention inspectable (LPI)". The misclassification can result from the client-side bypass list(s) not having an entry for the further incoming CAR or from the further incoming CAR being encoded in a loss prevention inspectable connection identifier. Being unaware of the bandwidth conservable nature of the further incoming CAR, at exchange 12, ERC 104 attempts to tunnel it to the DILPA 414 via the proxy gateway 404. Proxy gateway 404, at exchange 13, steers the misclassified loss prevention inspectable CAR to decrypter 412.

At exchange 14, decrypter 412 performs stream inspection on the misclassified loss prevention inspectable CAR and looks up its classification in the storage 460. At exchange 15, if the storage 460 returns a bandwidth conservable classification for the further incoming CAR, then the further incoming CAR is not subjected to deep inspection by the DILPA 414. Instead, at exchange 16, the further incoming CAR is directly sent by the Decrypter 412 to a destination web server identified by the further incoming CAR at one of the web services 150. Furthermore, a response sent by the destination web server to the further incoming CAR is not subjected to deep inspection by the DILPA 414 and is directly sent to the device running the ERC 104. This is also referred to as "internal bypassing".

Having described internal bypassing, the discussion now turns to dynamic deployment.

Dynamic Deployment

FIG. 11C shows a message sequence chart 1100C of bypassing inspection of a further incoming connection access request that has been previously classified as bandwidth conservable in a client-side supplemental bypass list.

Following the internal bypassing at exchange 9 in FIG. 11A, decrypter 412 generates a bandwidth conservable classification for the CAR at exchange 10. Decrypter 412 then sends the bandwidth conservable classification to the ERC 104 at exchange 11. The bandwidth conservable classification can be sent as an update to a client-side bypass list(s) or as an update to a client-side supplemental bypass list(s). Exchange 11, i.e., deployment of the bandwidth conservable classification to the ERC 104 can occur in real-time, immediately following the internal bypassing at exchange 9 in FIG. 11A, or can be scheduled to occur a later time as part of a periodic update scheme.

At exchange 12, ERC 104 receives further incoming connection access requests (CARs). At exchange 13, parser 542 and classifier 552 of the ERC 104 operate on the further incoming CARs and classify them as either "loss prevention inspectable (LPI)" or "bandwidth conservable (BC)" based on comparison against entries in the updated client-side bypass list(s) and/or updated client-side supplemental bypass list(s).

If the further incoming CARs are classified as bandwidth conservable (BC) by the ERC 104, then, at exchange 14, they are sent directly to respective destination web servers identified by the further incoming CARs at the web services 150, bypassing inspection by the data plane 410. Furthermore, responses sent by the respective destination web servers to the further incoming CARs are not subjected to inspection by the data plane 410 and are directly sent to the device running the ERC 104.

Having described dynamic deployment, the discussion now turns to error-based bypass.

Error-Based Bypass

Error-based bypass reduces error in security enforcement by the NSS 120. In some implementations, error-based bypass occurs at the NSS 120. In other implementations, it occurs at the OPERP 204. The NSS 120 monitors network traffic over standard HTTP and HTTPs ports like port 80 and port 443. Typically, the NSS 120 is set up to handle only HTTP and HTTPS traffic and generates an error when it receives non-HTTP and non-HTTPS traffic.

The NSS 120 decrypts an incoming connection access request and determines conformance or non-conformance of the connection access request with semantic and content requirements of a protocol established for the monitored channel. The decryption can be performed by the decrypter 412, which could be an HTTP-based decrypter or HTTPS-based decrypter (e.g., SSL or TLS decrypter). Based on the determination, the NSS classifies the connection access request as "loss prevention inspectable" or "connection preserving".

The semantic and content requirements apply to request methods, request header fields, request payload metadata, and request payload body content of the protocol established for the monitored channel. The semantic and content requirements can be loaded onto an error bypass list and made available to the NSS 120. Additional information about the semantic and content requirements can be found in Wikipedia contributors, 'List of HTTP header fields', *Wikipedia, The Free Encyclopedia,* 17 Apr. 2018, 09:04 UTC, <https://en.wikipedia.org/w/
index.php?title=List_of_HTTP_header_fields&oldid= 836864202> [accessed 19 Apr. 2018]; Wikipedia contributors, 'HTTPS', *Wikipedia, The Free Encyclopedia,* 17 Apr. 2018, 03:27 UTC,
<https://en.wikipedia.org/w/
index.php?title=HTTPS&oldid=836835625> [accessed 19 Apr. 2018]; Internet Engineering Task Force, 'Hypertext Transfer Protocol (HTTP/1.1): Semantics and Content'. R. Fielding, Ed., J. Reschke, Ed. June 2014,
<https://tools.ietf.org/pdf/rfc7231.pdf> [accessed 19 Apr. 2018]; and Internet Engineering Task Force, 'Hypertext Transfer Protocol (HTTP/1.1): Message Syntax and Routing'. R. Fielding, Ed., J. Reschke, Ed. June 2014, <https://tools.ietf.org/pdf/rfc7230.pdf> [accessed 19 Apr. 2018], which are incorporated by reference herein in their entirety.

In some implementations, semantic and content based comparison involves keyword matching, pattern matching, string or substring matching, exact matching, and regular expression matching. That is, the header and payload of a request or response can be compared that of a standard HTTP or HTTPS header and payload of a request or response on a semantic and content basis to determine conformance or non-conformance with HTTP or HTTPS protocol.

FIGS. 12, 13, 14, 15, 16A, 16B, and 17 show communication paths between ERC 104, GRE and/or IPSec gateway 406, storage 460, SSL decrypted 412, DILPA 414, data plane 410, and web services (WSs) 150. In other implementations, in place of ERC 104, FIGS. 12, 13, 14, 15, 16A, 16B, and 17 can include OPERP 204 configured with a server-side bypass list. In yet other implementations, GRE and/or IPSec gateway 406 can be replaced by proxy gateway 404.

Figure 12:
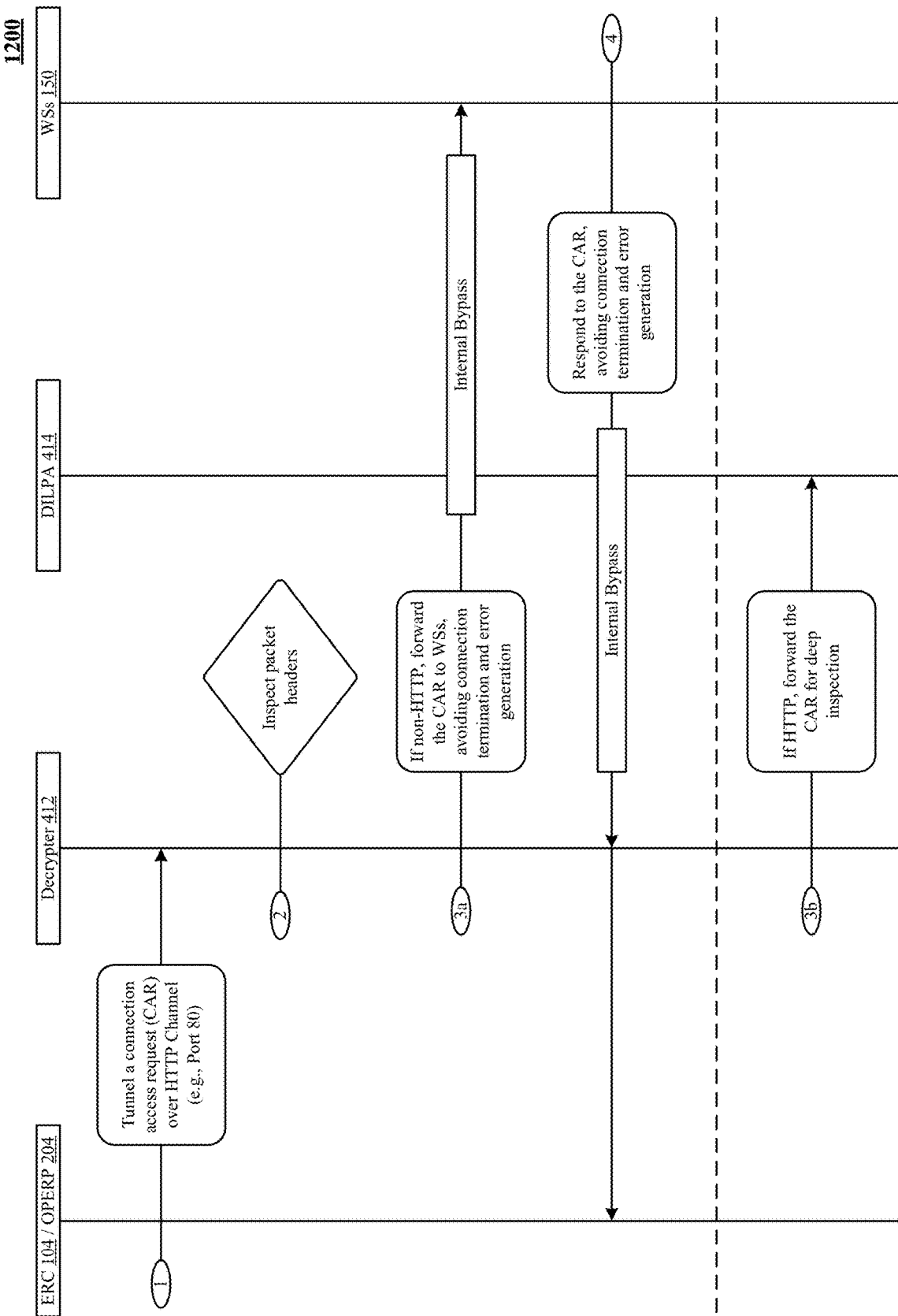
FIG. 12 is a message sequence chart of internally bypassing deep inspection of a connection access request that invokes a non-HTTP protocol on a HTTP channel.

FIG. 12 is a message sequence chart 1200 of internally bypassing deep inspection of a connection access request that invokes a non-HTTP protocol on a HTTP channel. At exchange 1, ERC 104 tunnels a connection access request (CAR) to the decrypter 412 over a HTTP channel such as port 80. ERC 104 runs on the same device (e.g., device 102 or device 302) from which the CAR originated. At exchange 2, decrypter 412 performs stream inspection on the CAR, which includes parsing packet headers of data packets included in the CAR. Stream inspection reveals whether the data packets belong to a "loss prevention inspectable" protocol or a "connection preserving" protocol. One example of a loss prevention inspectable protocol is HTTP protocol. One example of a connection preserving protocol is non-HTTP protocol such as Skype protocol™. If the data packets belong to a loss prevention inspectable protocol, the CAR is classified as a loss prevention inspectable CAR. If the data packets belong to a connection preserving protocol, the CAR is classified as a connection preserving CAR.

At exchange 3a, the connection preserving CAR is not subjected to deep inspection by the DILPA 414. As result, the connection is maintained and not terminated/closed and no error is generated. Instead, the connection preserving CAR is directly sent by the decrypter 412 to a destination web server identified by the connection preserving CAR at one of the web services 150. Furthermore, a response sent by the destination web server to the connection preserving CAR at exchange 4 is not subjected to deep inspection by the DILPA 414 and is directly sent to the device running the ERC 104. This is also referred to as "internal bypassing".

At exchange 3b, the loss prevention inspectable CAR is sent to the DILPA 414 for deep inspection.

In other implementations, instead of being bypassed, the loss prevention inspectable CAR is blocked and logged.

Figure 13:
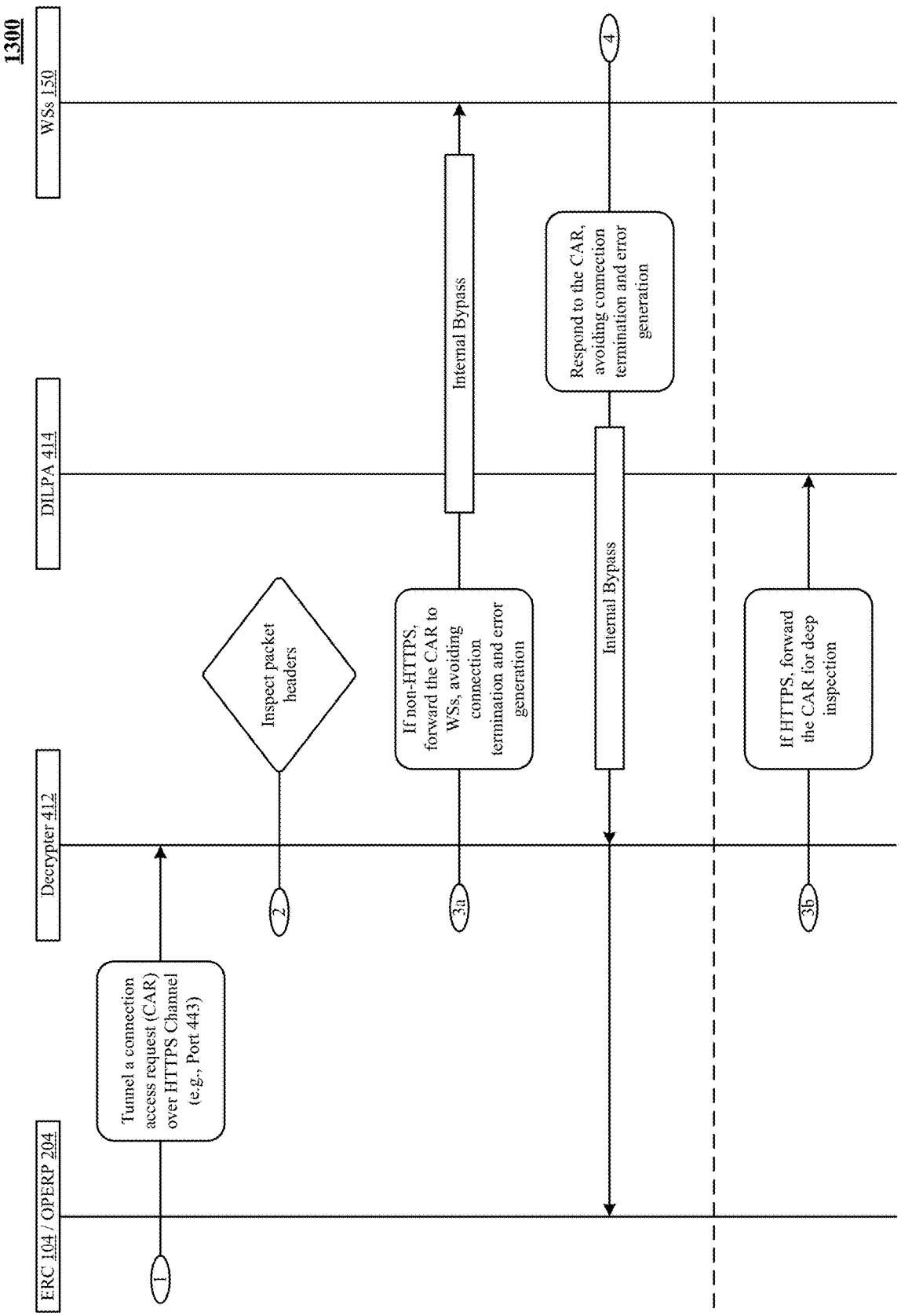
FIG. 13 depicts a message sequence chart of internally bypassing deep inspection of a connection access request that invokes a non-HTTPS protocol on a HTTPS channel.

FIG. 13 depicts a message sequence chart 1300 of internally bypassing deep inspection of a connection access request that invokes a non-HTTPS protocol on a HTTPS channel. At exchange 1, ERC 104 tunnels a connection access request (CAR) to the decrypter 412 over a HTTPS channel such as port 443. ERC 104 runs on the same device (e.g., device 102 or device 302) from which the CAR originated. At exchange 2, decrypter 412 performs stream inspection on the CAR, which includes parsing packet headers of data packets included in the CAR. Stream inspection reveals whether the data packets belong to a "loss prevention inspectable" protocol or a "connection preserving" protocol. One example of a loss prevention inspectable protocol is HTTPS protocol. One example of a connection preserving protocol is non-HTTPS protocol such as Skype protocol™. If the data packets belong to a loss prevention inspectable protocol, the CAR is classified as a loss prevention inspectable CAR. If the data packets belong to a connection preserving protocol, the CAR is classified as a connection preserving CAR.

At exchange 3a, the connection preserving CAR is not subjected to deep inspection by the DILPA 414. As result, the connection is maintained and not terminated/closed and no error is generated. Instead, the connection preserving CAR is directly sent by the decrypter 412 to a destination web server identified by the connection preserving CAR at one of the web services 150. Furthermore, a response sent by the destination web server to the connection preserving CAR at exchange 4 is not subjected to deep inspection by the DILPA 414 and is directly sent to the device running the ERC 104. This is also referred to as "internal bypassing".

At exchange 3b, the loss prevention inspectable CAR is sent to the DILPA 414 for deep inspection.

In other implementations, instead of being bypassed, the loss prevention inspectable CAR is blocked and logged.

Figure 14:
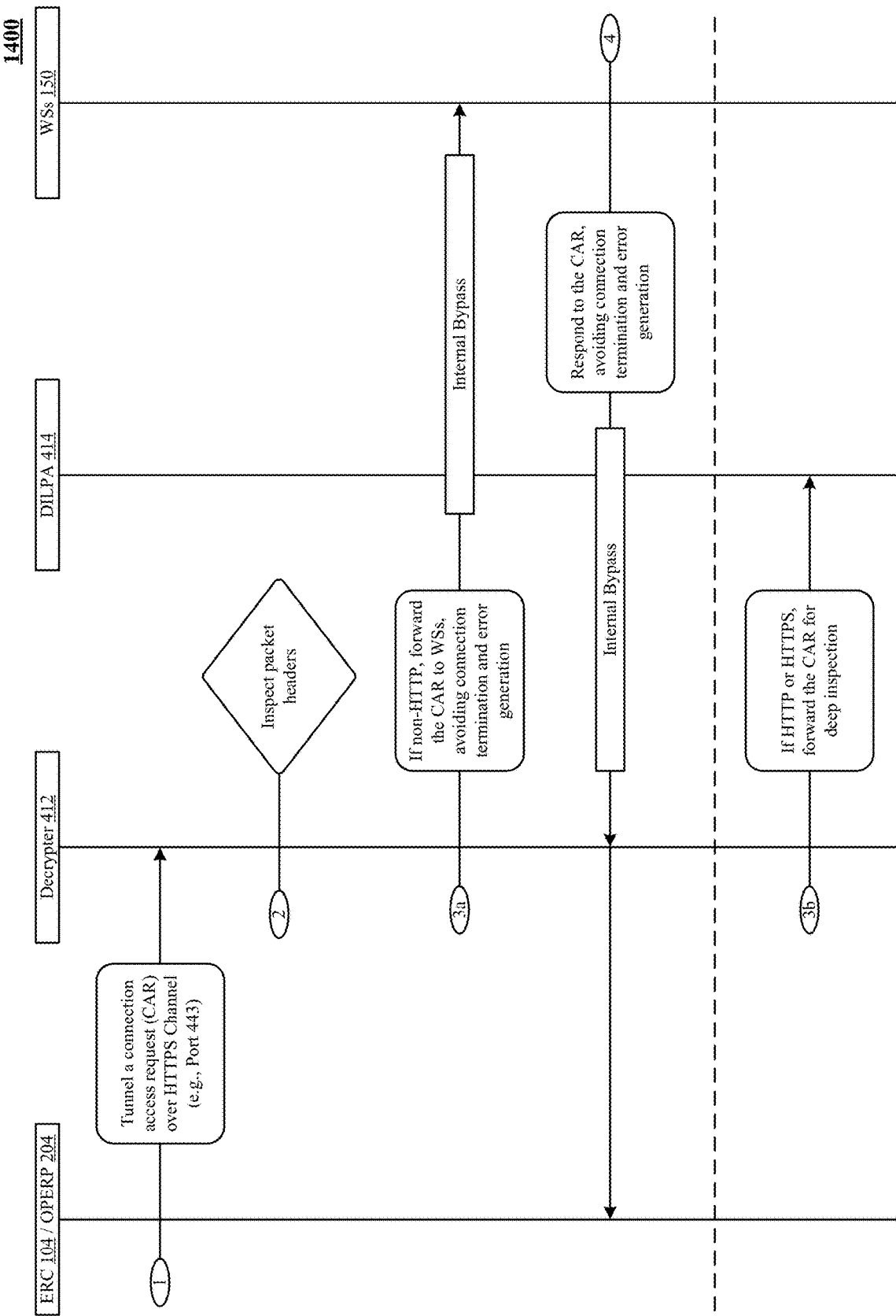
FIG. 14 shows a message sequence chart of internally bypassing deep inspection of a connection access request that invokes a non-HTTP protocol on a HTTPS channel.

FIG. 14 shows a message sequence chart 1400 of internally bypassing deep inspection of a connection access request that invokes a non-HTTP protocol on a HTTPS channel. At exchange 1, ERC 104 tunnels a connection access request (CAR) to the decrypter 412 over a HTTPS channel such as port 443. ERC 104 runs on the same device (e.g., device 102 or device 302) from which the CAR originated. At exchange 2, decrypter 412 performs stream inspection on the CAR, which includes parsing packet headers of data packets included in the CAR. Stream inspection reveals whether the data packets belong to a "loss prevention inspectable" protocol or a "connection preserving" protocol. Examples of loss prevention inspectable protocols are HTTP protocol and HTTPs protocol. Examples of connection preserving protocols are secure non-HTTP protocols such as file transfer protocol secure (FTPS) protocol and simple mail transfer protocol secure (SMTPS) protocol. If the data packets belong to a loss prevention inspectable protocol, the CAR is classified as a loss prevention inspectable CAR. If the data packets belong to a connection preserving protocol, the CAR is classified as a connection preserving CAR.

At exchange 3a, the connection preserving CAR is not subjected to deep inspection by the DILPA 414. As result, the connection is maintained and not terminated/closed and no error is generated. Instead, the connection preserving CAR is directly sent by the decrypter 412 to a destination web server identified by the connection preserving CAR at one of the web services 150. Furthermore, a response sent by the destination web server to the connection preserving CAR at exchange 4 is not subjected to deep inspection by the DILPA 414 and is directly sent to the device running the ERC 104. This is also referred to as "internal bypassing".

At exchange 3b, the loss prevention inspectable CAR is sent to the DILPA 414 for deep inspection.

In other implementations, instead of being bypassed, the loss prevention inspectable CAR is blocked and logged.

In yet other implementations, connection access requests invoked on channels other than port 80 and/or port 443 are bypassed.

Figure 15:
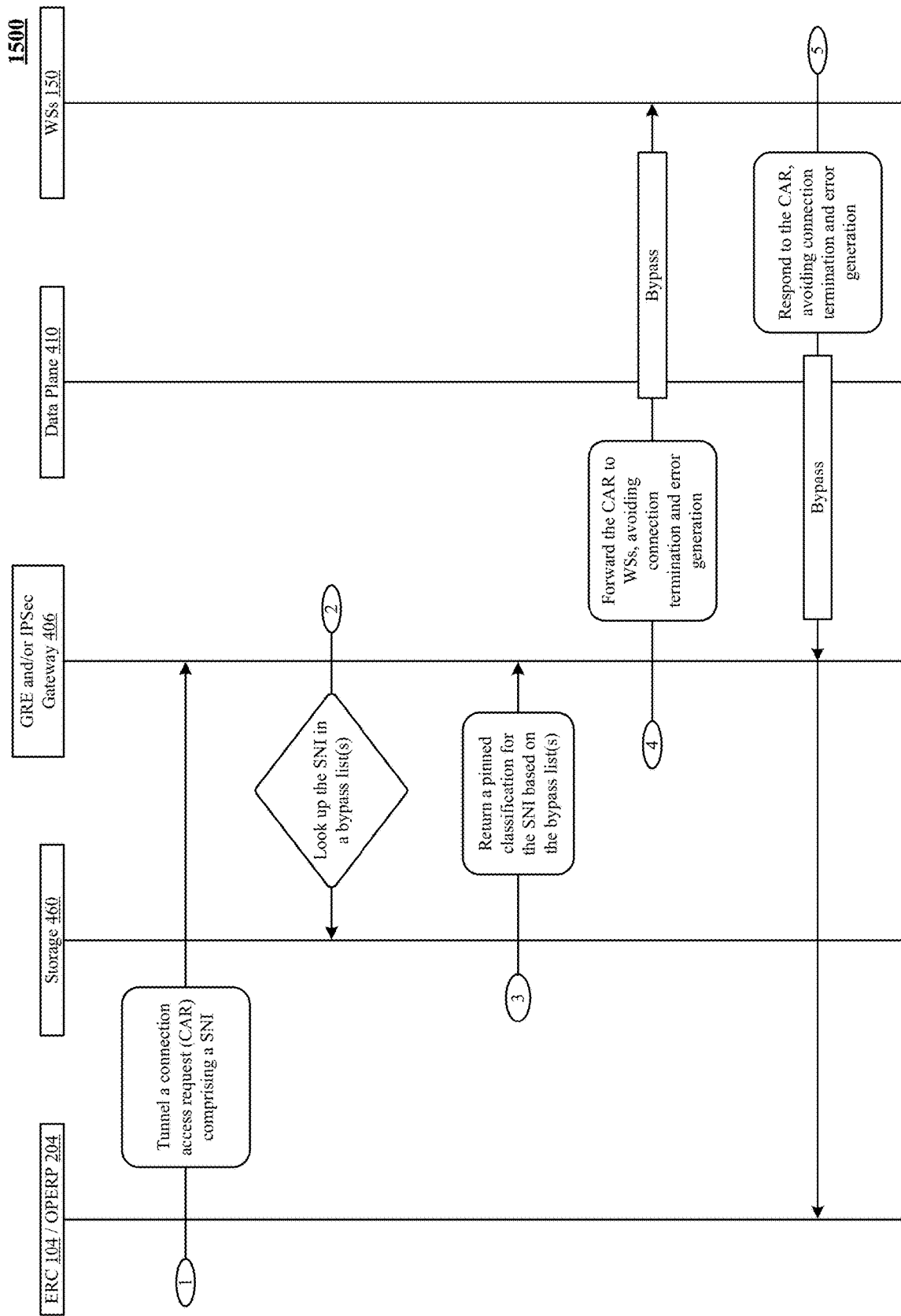
FIG. 15 illustrates a message sequence chart of bypassing inspection of a connection access request containing a server name (e.g., server name indication (SNI), HOST header) that identifies a certificate pinned application.

FIG. 15 illustrates a message sequence chart 1500 of bypassing inspection of a connection access request containing a server name (e.g., server name indication (SNI), HOST header) that identifies a certificate pinned application. At exchange 1, over a HTTPS channel such as port 443, ERC 104 attempts to tunnel a connection access request (CAR) a HTTPS channel such as port 443 to the data plane 410 via the GRE and/or IPSec gateway 406. ERC 104 runs on the same device (e.g., device 102 or device 302) from which the CAR originated. The CAR includes a server name (e.g., server name indication (SNI), HOST header) (e.g., www.youtube1.com).

At exchange 2, GRE and/or IPSec gateway 406 extracts the server name and looks up its classification in a bypass list(s) stored in the storage 460. In the case where the extracted server name (e.g., server name indication (SNI), HOST header) matches a connection preserving server name (e.g., server name indication (SNI), HOST header) that identifies a certificate pinned application, storage 460 returns a connection preserving classification for the CAR at exchange 3. Certificate pinned applications are those applications that trust only specific certificates or public keys, rather than relying on the chain of trust from a certificate authority. In implementations, the certificate pinned applications referred to herein do not trust a certificate of the NSS 120. Examples of certificate pinned applications are Dropbox™ native application, Microsoft Outlook™, AirWatch™, Barclays mobile banking app™, Twitter™, and WhatsApp™.

At exchange 4, the connection preserving CAR is sent directly to a destination web server identified by the connection preserving CAR at one of the web services 150, bypassing inspection by the data plane 410. As result, the connection is maintained and not terminated/closed and no error is generated. Furthermore, a response sent by the destination web server to the connection preserving CAR at exchange 5 is not subjected to inspection by the data plane 410 and is directly sent to the device running the ERC 104.

In other implementations, instead of being bypassed, the connection preserving CAR is blocked and logged.

Figure 16A:
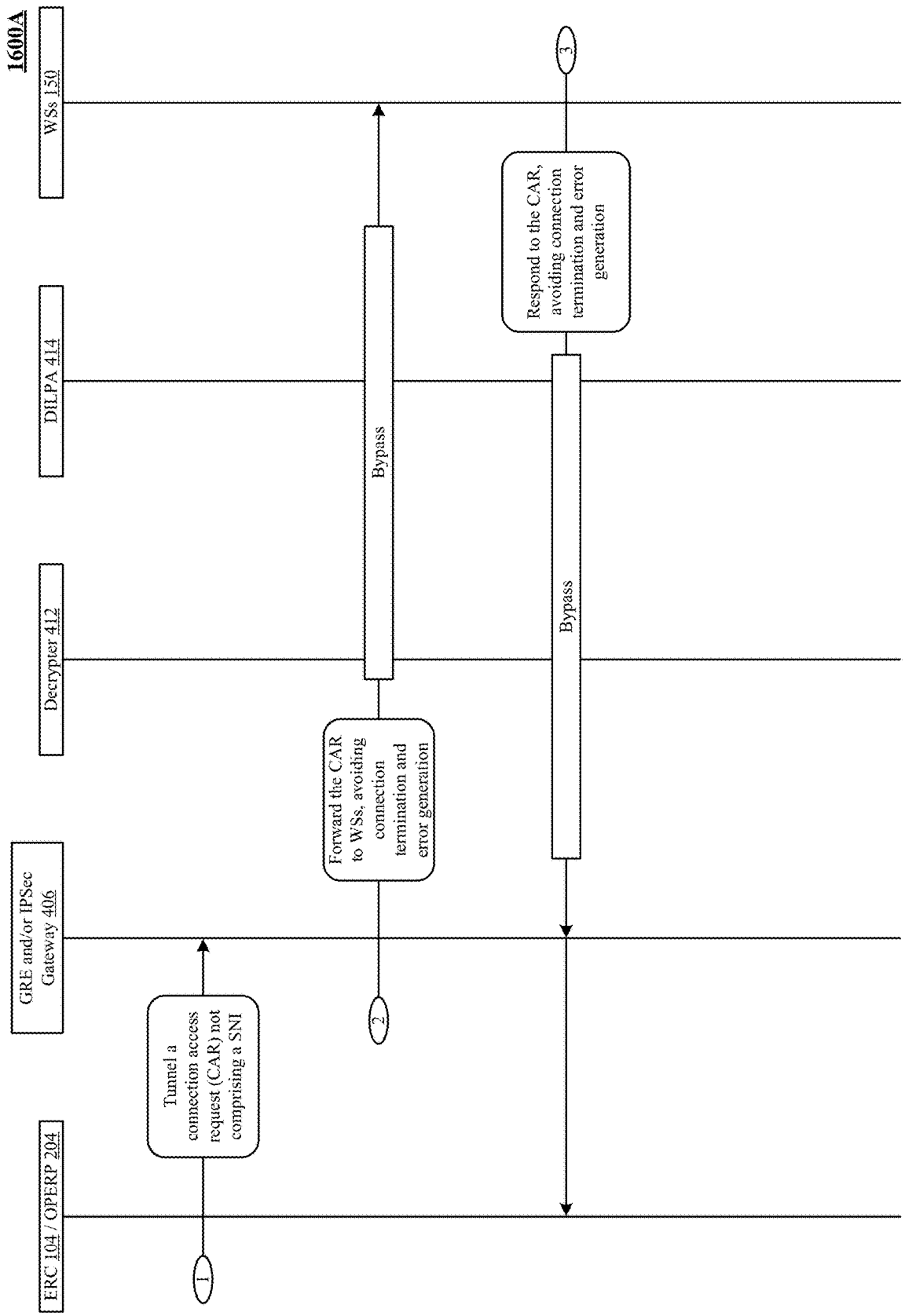
FIG. 16A is a message sequence chart of bypassing inspection of a connection access request not containing a server name (e.g., server name indication (SNI), HOST header).

FIG. 16A is a message sequence chart 1600A of bypassing inspection of a connection access request not containing a server name (e.g., server name indication (SNI), HOST header). At exchange 1, over a HTTPS channel such as port 443, ERC 104 attempts to tunnel a connection access request (CAR) to the data plane 410 via the GRE and/or IPSec gateway 406. ERC 104 runs on the same device (e.g., device 102 or device 302) from which the CAR originated. The CAR does not include a server name (e.g., Python script).

At exchange 2, GRE and/or IPSec gateway 406 detects an absence of a server name (e.g., server name indication (SNI), HOST header) in the CAR and returns a connection preserving classification for the CAR. The connection preserving CAR is sent directly to a destination web server identified by the connection preserving CAR at one of the web services 150, bypassing inspection by the data plane 410. As result, the connection is maintained and not terminated/closed and no error is generated. Furthermore, a response sent by the destination web server to the connection preserving CAR at exchange 3 is not subjected to inspection by the data plane 410 and is directly sent to the device running the ERC 104.

In other implementations, instead of being bypassed, the connection preserving CAR is blocked and logged.

Figure 16B:
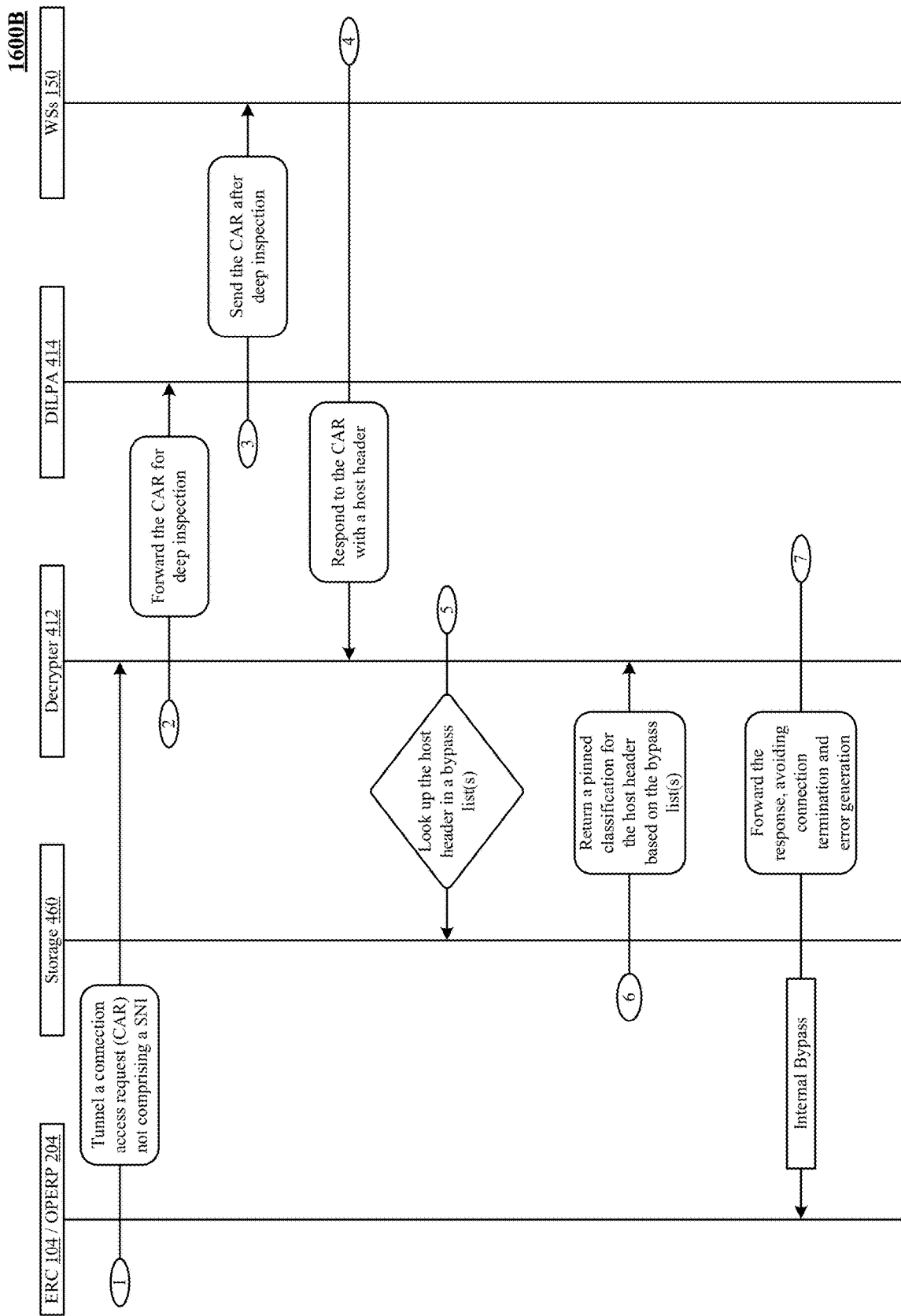
FIG. 16B depicts a message sequence chart of internally bypassing deep inspection of a web network response containing a server name (e.g., server name indication (SNI), HOST header) that identifies a certificate pinned application.

FIG. 16B depicts a message sequence chart 1600B of internally bypassing deep inspection of a web network response containing a server name (e.g., server name indication (SNI), HOST header) that identifies a certificate pinned application. At exchange 1, over a HTTPS channel such as port 443, ERC 104 tunnels a connection access request (CAR) to the DILPA 414 via the decrypter 412. ERC 104 runs on the same device (e.g., device 102 or device 302) from which the CAR originated. The CAR does not include a server name (e.g., Python script).

At exchange 2, the decrypter 412, after performing stream inspection on the CAR, forwards the CAR to DILPA 414 for deep inspection. After deep inspection, at exchange 3, DILPA 414 sends the CAR to a destination web server identified by the CAR at one of the web services 150.

At exchange 4, the decrypter 412 intercepts a response sent by the destination web server to the CAR. The response includes a HOST header, which identifies a server name (e.g., server name indication (SNI), HOST header) associated with the destination web server. At exchange 5, the decrypter 412 looks up a classification of the HOST header in a bypass list(s) stored in the storage 460. In the case where the HOST header matches a connection preserving server name (e.g., server name indication (SNI), HOST header) that identifies a certificate pinned application, storage 460 returns a connection preserving classification for the response at exchange 6. At exchange 7, the response is not subjected to deep inspection by the DILPA 414 and is directly sent by the decrypter 412 to the device running the ERC 104. This is also referred to as "internal bypassing". As a result, the connection is maintained and not terminated/closed and no error is generated.

In other implementations, instead of being bypassed, the response is blocked and logged.

Figure 17:
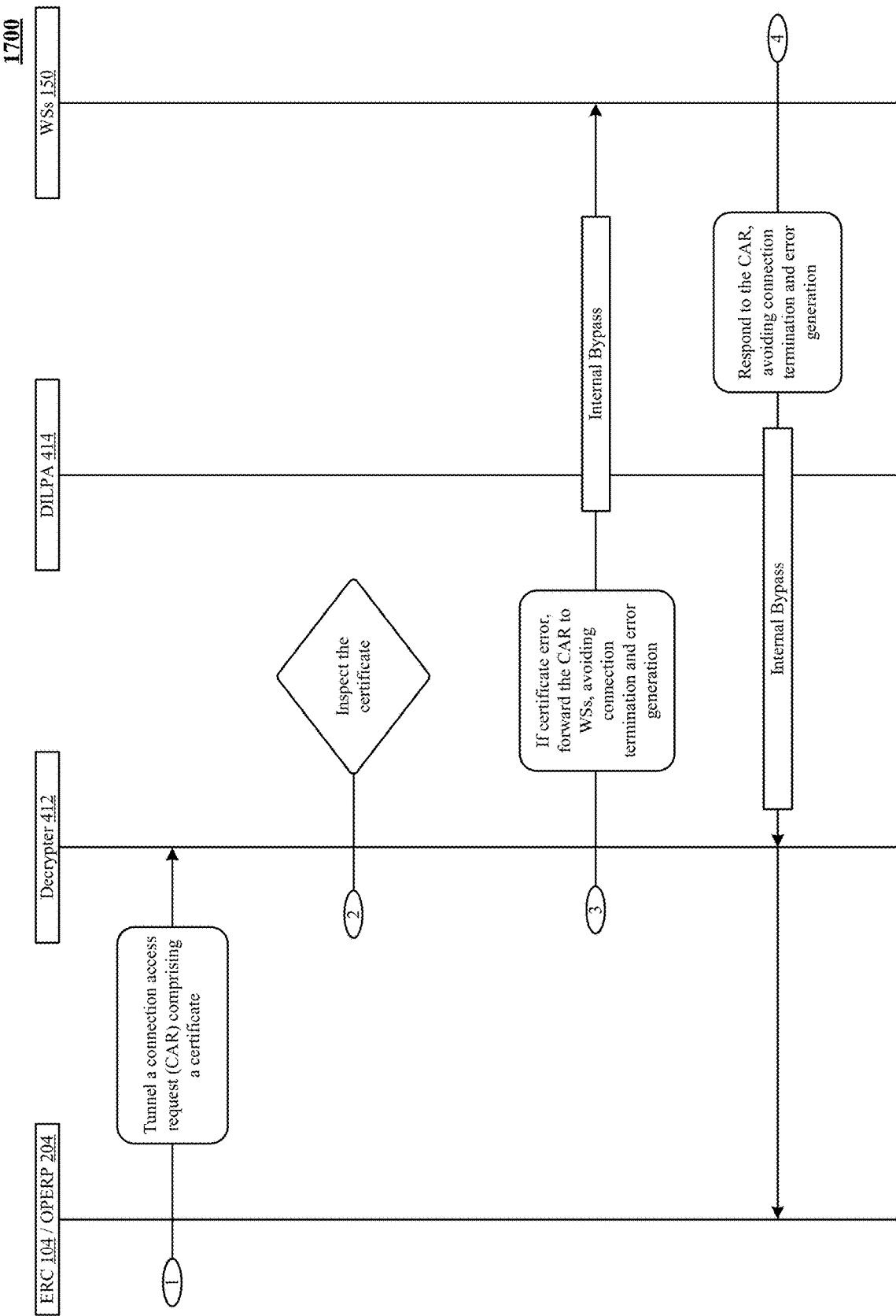
FIG. 17 illustrates a message sequence chart of internally bypassing deep inspection of a connection access request containing an erroneous certificate.

FIG. 17 illustrates a message sequence chart 1700 of internally bypassing deep inspection of a connection access request containing an erroneous certificate. At exchange 1, over a HTTPS channel such as port 443, ERC 104 tunnels a connection access request (CAR) to the DILPA 414 via the decrypter 412. ERC 104 runs on the same device (e.g., device 102 or device 302) from which the CAR originated. The CAR includes a certificate.

At exchange 2, the decrypter 412 inspects the certificate and detects a certificate error. The certificate error can be caused by an untrusted root certificate, an incomplete certificate chain, and/or an unsupported cipher.

At exchange 3, the CAR is not subjected to deep inspection by the DILPA 414. As a result, the connection is maintained and not terminated/closed and no error is generated. Instead, the CAR is directly sent by the decrypter 412 to a destination web server identified by the CAR at one of the web services 150. Furthermore, a response sent by the destination web server to the CAR at exchange 4 is not subjected to deep inspection by the DILPA 414 and is directly sent to the device running the ERC 104. This is also referred to as "internal bypassing".

In other implementations, instead of being bypassed, the CAR is blocked and logged or dropped in the case of unsupported cipher.

In another implementation, internal deep inspection bypass of a connection access request (CAR) can occur when the client fails to perform the handshake and thus errors out. In such an implementation, the domain name associated with the CAR can be stored in the storage 460 as part of the error bypass list for future bypassing.

Web Category-Based Bypass

Figure 18:
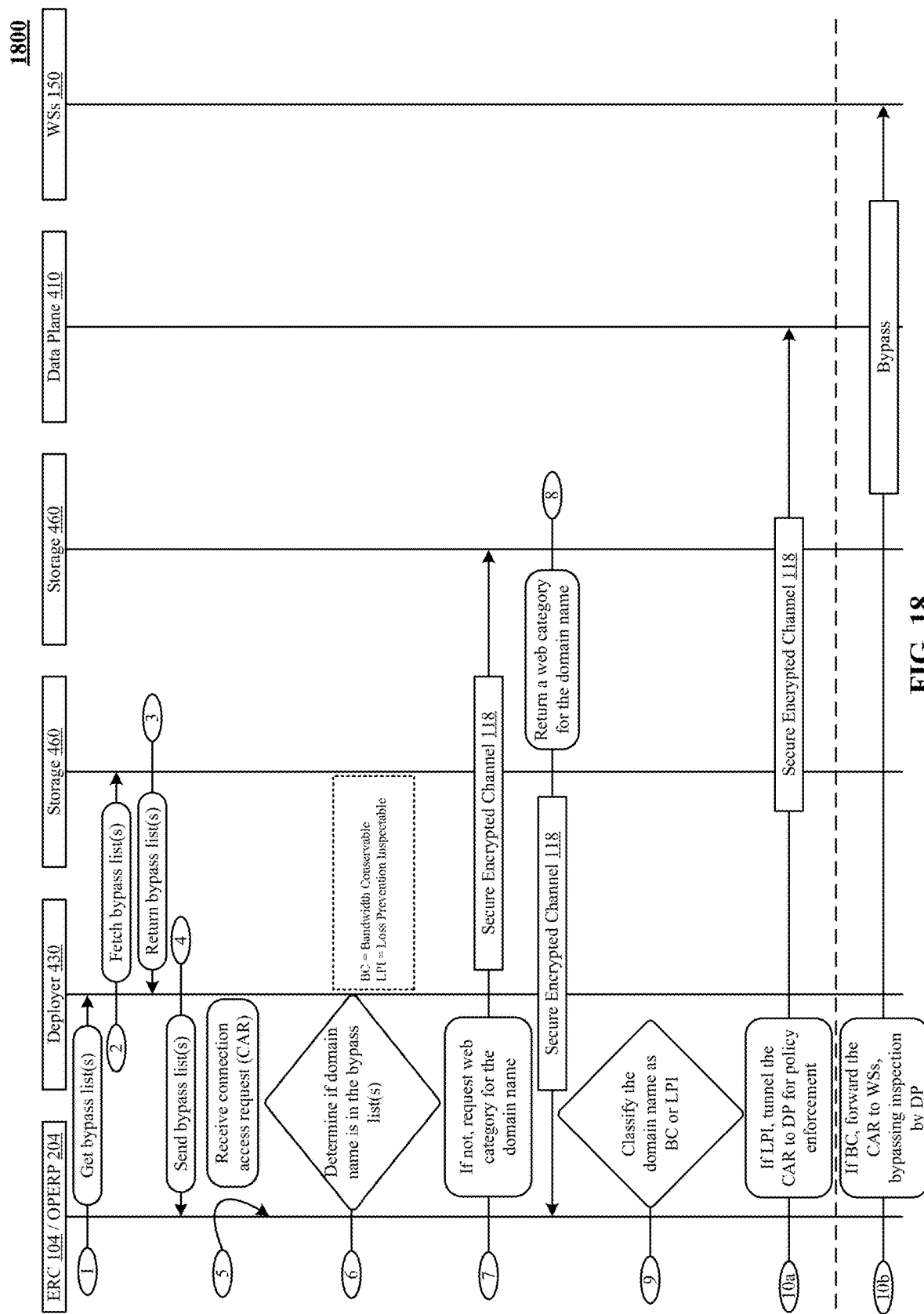
FIG. 18 shows a message sequence chart of reducing latency in security enforcement by a NSS using an ERC configured with a client-side bypass list of bandwidth conservable web categories and bandwidth conservable domain names.

FIG. 18 shows a message sequence chart 1800 of reducing latency in security enforcement by the NSS 120 using the ERC 104 configured with a client-side bypass list of bandwidth conservable web categories and bandwidth conservable domain names. FIG. 18 shows communication paths between ERC 104, deployer 430, storage 460, data plane 410, and web services (WSs) 150. In other implementations, in place of ERC 104, FIG. 18 can include OPERP 204 configured with a server-side bypass list. In yet other implementations, in place of or in addition to domain name(s), FIG. 18 can include IP address(es).

At exchange 1, ERC 104 requests the deployer 430 for bypass list(s). ERC 104 runs on the same device (e.g., device 102 or device 302) from which the CAR originated. At exchange 2, deployer 430 forwards that request to storage 460. At exchange 3, storage 460 returns the bypass list(s) to the deployer 430, which in turn forwards the bypass list(s) to ERC 104 at exchange 4. In some implementations, the bypass list(s) includes a web category bypass list of bandwidth conservable web categories that are not subject to routing through the data plane 410. In other implementations, the bypass list(s) includes a web category bypass list of bandwidth conservable web categories that are not subject to routing through the DILPA 414. The web category bypass list further includes a domain bypass list of bandwidth conservable domain names in each of the bandwidth conservable web categories in the web category bypass list.

In some implementations, the bypass list(s), including the web category bypass list and the domain bypass list, can be configured on a tenant-by-tenant basis and populated in a tenant database by an administrative user via a web management interface (WMI) of the management plane 420. In other implementations, a URL classification service can be used to classify the domain names into web categories. Some examples of web categories include streaming media, recreational videos, social media, Internet radio and TV, Internet telephony, peer-to-peer file sharing, educational videos, profanity, business and economy, banking, finance, advertisements, application and software download, instant messaging, message boards and forums, online brokerage and trading, pay-to-surf, personal network storage and backup, surveillance, and viral videos.

At exchange 5, ERC 104 receives a connection access request (CAR). The CAR comprises a domain name. At exchange 6, parser 542 and classifier 552 of the ERC 104 operate on the CAR and determine whether the domain name is present in the domain bypass list. At exchange 7, when the domain name is not present in the domain bypass list, ERC 104 queries the storage 460 over the secure encrypted channel 118 to return a web category for the domain name. The query can be asynchronously sent over an API. At exchange 8, storage 460 returns a web category for the domain name. In implementations, storage 460 can be a tenant-specific database.

The following code shows an example API call that can be made to a bypass category provisioner API to receive a web category bypass list of bandwidth conservable web categories:

```
GET https://<addon_host>/url/bypasscategory?hashkey=%s&orgkey=%s"
returns JSON:
{
  "bypasscategory":
  ["-100", "-23", "39"]
}
```

In the JSON code above, negative number categories can represent standard defined categories and positive number categories can represent custom defined categories.

At exchange 9, parser 542 and classifier 552 of the ERC 104 operate on the returned web category and determine whether the returned web category is "loss prevention inspectable (LPI)" or "bandwidth conservable (BC)". If the returned web category is loss prevention inspectable, ERC 104 classifies the domain name as loss prevention inspectable. If the returned web category is bandwidth conservable, ERC 104 classifies the domain name as bandwidth conservable. In some implementations, the classification is accompanied with a time to live (TTL) parameter. When the classification has expired based on the TTL parameter, storage 460 is queried to return a new web category for the domain name. Based on the new web category, the domain name is reclassified as loss prevention inspectable or bandwidth conservable.

For loss prevention inspectable domain names, at exchange 10a, ERC 104 tunnels the comprising CAR to data plane 410 for policy enforcement. For bandwidth conservable domain names, at exchange 10b, the comprising CAR is sent directly to a destination web server identified by the comprising CAR at one of the web services 150, bypassing inspection by the data plane 410. Furthermore, a response sent by the destination web server to the comprising CAR is not subjected to inspection by the data plane 410 and is directly sent to the device running the ERC 104.

Domain Whitelist-Based Mandatory Inspection

Figure 19:
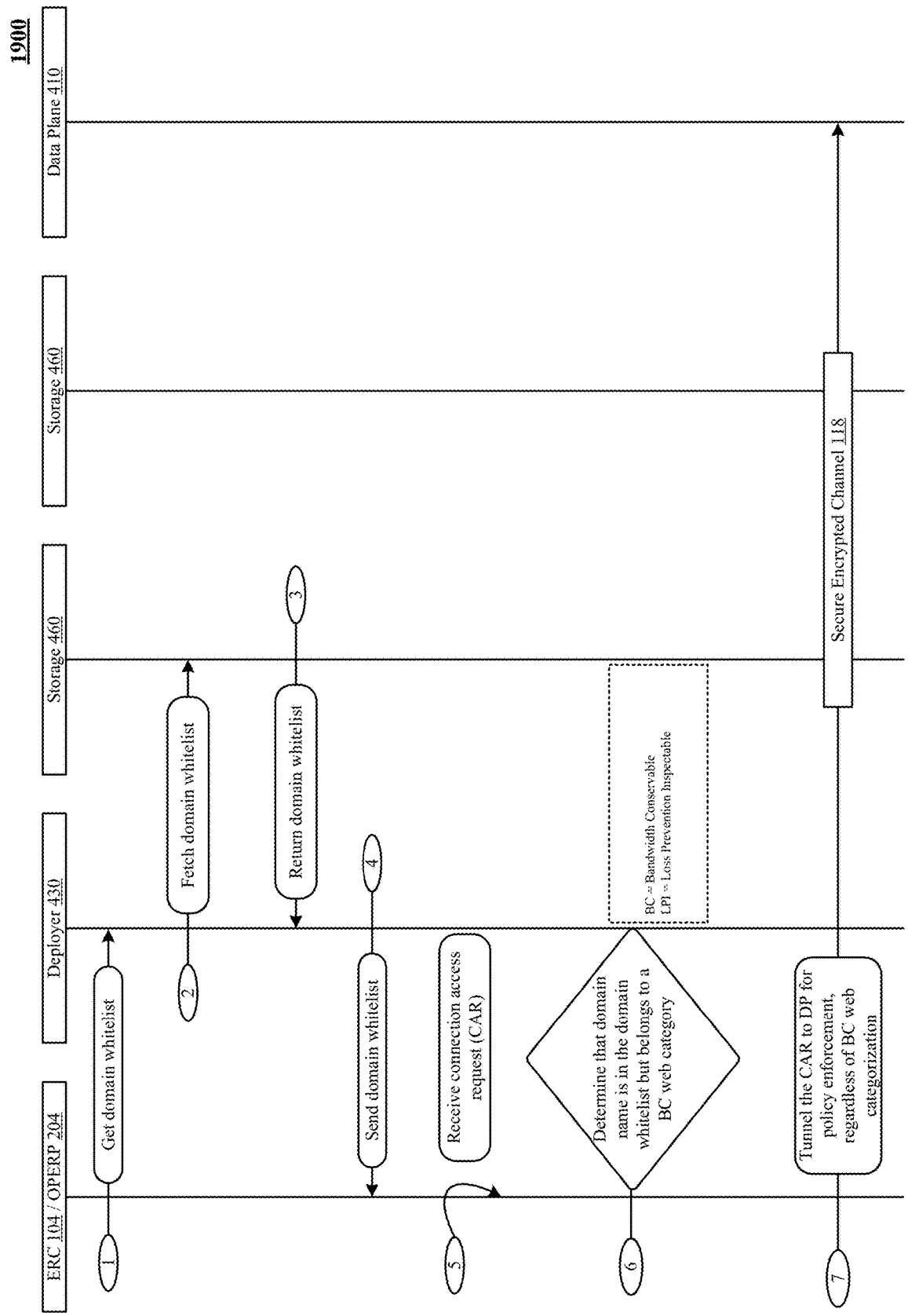
FIG. 19 illustrates a message sequence chart of mandatory inspection of a connection access request that overrides a bandwidth conservable categorization of a domain name in the connection access request.

FIG. 19 illustrates a message sequence chart 1900 of mandatory inspection of a connection access request that overrides a bandwidth conservable categorization of a domain name in the connection access request. The ERC 104 is configured with (1) bandwidth conservable web categories as part of the web category bypass list and (2) loss prevention inspectable domain names as part of a domain whitelist (e.g., domain whitelist(s) 562). FIG. 19 shows communication paths between ERC 104, deployer 430, storage 460, and data plane 410. In other implementations, in place of ERC 104, FIG. 19 can include OPERP 204 configured with a server-side domain whitelist. In yet other implementations, in place of or in addition to domain name(s), FIG. 19 can include IP address(es).

At exchange 1, ERC 104 requests the deployer 430 for the domain whitelist. ERC 104 runs on the same device (e.g., device 102 or device 302) from which the CAR originated. At exchange 2, deployer 430 forwards that request to storage 460. At exchange 3, storage 460 returns the domain whitelist (.g., domain whitelist(s) 762) to the deployer 430, which in turn forwards the domain whitelist to ERC 104 at exchange 4. The domain whitelist identifies one or more loss prevention inspectable domain names that are subject to inspection by the DILPA 414 irrespective of belonging to a bandwidth conservable web category.

At exchange 5, ERC 104 receives a connection access request (CAR). The CAR comprises a domain name. At exchange 6, parser 542 and classifier 552 of the ERC 104 operate on the CAR and determine that the domain name is present in the domain whitelist but also has a bandwidth conservable categorization based on the web category bypass list. At exchange 7, atypically, the ERC 104 tunnels the CAR to the DILPA 414 for policy enforcement, overriding the CAR's bandwidth conservable categorization.

Having described the different message sequence charts, the discussion now turns to examples of security actions triggered by the technology disclosed.

Security Enforcement

In some implementations, one or more security policies can be enforced by the network security system (NSS) 120 on the connection access requests (CARs). In response to detecting possible exfiltration of security data or an endpoint infection threat, one or more security actions can be executed, as defined by the security policies. Some examples of security actions are blocking a CAR, encryption of content being transmitted by the CAR, quarantining the content being transmitted by the CAR, putting the CAR on hold until further inspection (e.g., by an administrator), seeking user justification for why the user made the CAR, coaching user on the security policies, and prohibiting further activity on the endpoint (e.g., by freezing the endpoint file system and/or the I/O drivers).

Having described the example security actions, the discussion now turns to sample data structures used by the technology disclosed.

Sample Data Structures

The following sample data shows an example bypass list(s) stored in a MySQL™ database called tenant.bypass_settings database.

| id | type | data |
|---|---|---|
| int (11) | varchar (20) | text |
| 1 | src_netloc | {"ids":[1,2,3]} |
| 2 | dst_netloc | {"ids":[1,2,3]} |
| 3 | category | {"ids":[1,2,3]} |
| 4 | country | {"country_codes":['AD', 'AE', 'AF']} |
| 5 | domain | {"domains":["domain1.com", "domain2.com","domain3.com"]} |
| 6 | error | {"bypass-settings":{"no-sni":true, "ssl-pinned":true,"non-http":true, "non-ssl":true,"ssl-untrusted-root":false, "ssl-incomplete-chain"} |

The following sample data shows example web categories stored in a MySQL™ database called web_info.web_categories.

| web_category_id int (11) | web_category_name varchar (225) | display tinyint(1) |
|---|---|---|
| −4 | Advocacy Groups & Trade Associations | 1 |
| −3 | Adult | 1 |
| −2 | Ad Fraud | 1 |
| −1 | Accounting | 1 |
| 0 | Uncategorized | 1 |

The following sample data shows example country codes stored in a MySQL™ database called core_data.country_codes.

| country_code varchar (5) | country_name varchar (256) | three_letters_code varchar (128) |
|---|---|---|
| AD | Andorra | AND |
| AE | United Arab Emirates | ARE |
| AF | Afghanistan | AFG |
| AG | Antigua and Barbuda | ATG |
| AI | Anguilla | AIA |

Having described the sample data structures, the discussion now turns to the sample metadata structures logged and visualized by the technology disclosed on a CAR-by-CAR basis.

Sample Metadata Structures

The technology disclosed logs metadata information 2000 about connection access requests (CARs), regardless of whether they are loss prevention inspectable (LPI) or bandwidth conservable (BC). In some implementations, only those CARs are logged "in detail" that trigger a security action. However, most implementations including logging CARs that are bandwidth conservable and thus bypassed. Some examples of metadata logged for a CAR are shown in FIG. 20 and include user information 2002, application information 2004, source information 2006, destination information 2016, file information 2026, session information 2014, bytes uploaded or downloaded 2022, and DLP information 2012. In implementations, DLP information 2012 is not logged for bypassed CARs because they are not subjected to content inspection. In implementations, the metadata information 2000 for respective bypassed CARs is stored and presented across the management plane (MP) 420 for easy and granular inspection by an administrator. Metadata information 2000 can also be stored as metadata 752.

Having described the sample metadata structures, the discussion now turns to an example computer system on which the technology disclosed can be operated.

Computer System

Figure 21:
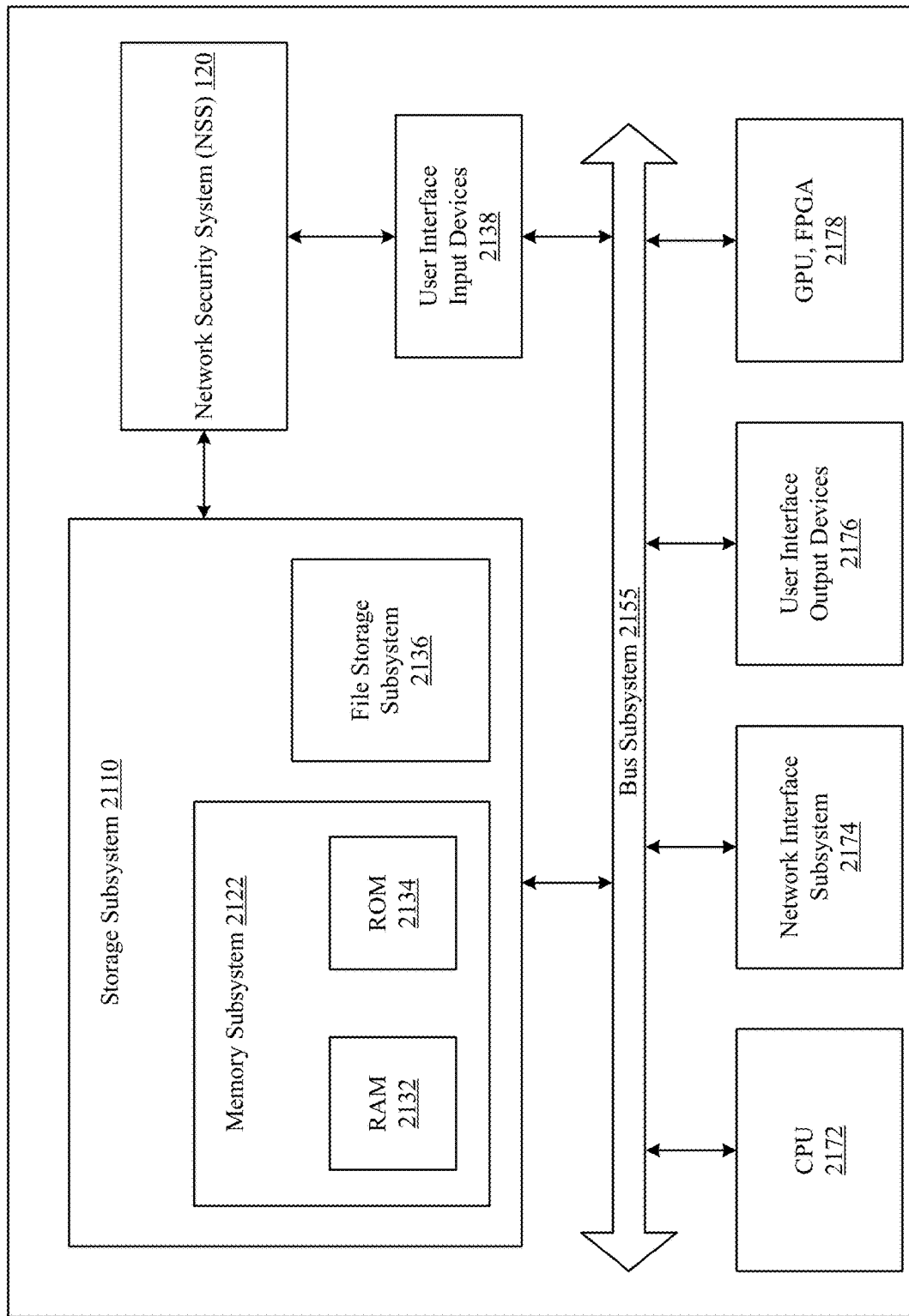
FIG. 21 is a simplified block diagram of a computer system that can be used to implement the technology disclosed.

FIG. 21 is a simplified block diagram of a computer system 2100 that can be used to implement the technology disclosed. Computer system 2100 includes at least one central processing unit (CPU) 2172 that communicates with a number of peripheral devices via bus subsystem 2155. These peripheral devices can include a storage subsystem 2110 including, for example, memory devices and a file storage subsystem 2136, user interface input devices 2138, user interface output devices 2176, and a network interface subsystem 2174. The input and output devices allow user interaction with computer system 2100. Network interface subsystem 2174 provides an interface to outside networks, including an interface to corresponding interface devices in other computer systems.

In one implementation, the network security system (NSS) 120 is communicably linked to the storage subsystem 2110 and the user interface input devices 2138.

User interface input devices 2138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2100.

User interface output devices 2176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2100 to the user or to another machine or computer system.

Storage subsystem 2110 stores programming and data constructs that provide the functionality of some or all of the modules and methods described herein. Subsystem 2178 can be graphics processing units (GPUs) or field-programmable gate arrays (FPGAs).

Memory subsystem 2122 used in the storage subsystem 2110 can include a number of memories including a main random access memory (RAM) 2132 for storage of instructions and data during program execution and a read only memory (ROM) 2134 in which fixed instructions are stored. A file storage subsystem 2136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2136 in the storage subsystem 2110, or in other machines accessible by the processor.

Bus subsystem 2155 provides a mechanism for letting the various components and subsystems of computer system 2100 communicate with each other as intended. Although bus subsystem 2155 is shown schematically as a single bus, alternative implementations of the bus subsystem can use multiple busses.

Computer system 2100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2100 depicted in FIG. 21 is intended only as a specific example for purposes of illustrating the preferred embodiments of the present invention. Many other configurations of computer system 2100 are possible having more or less components than the computer system depicted in FIG. 21.

Having described an example computer system on which the technology disclosed can be operated, the discussion now turns to some particular implementations.

Particular Implementations

The technology disclosed relates to reducing latency and error in security enforcement by a network security system (NSS) which comprises a data inspection and loss prevention appliance (DILPA). The technology disclosed also relates to conserving inspection bandwidth of the DILPA.

Performance-Based Bypass

Client-Side, Non-Intercepting Complete Bypass

A system implementation of the technology disclosed from the perspective of an endpoint routing client includes one or more processors coupled to the memory. The memory is loaded with computer instructions to conserve inspection bandwidth of a data inspection and loss prevention appliance (DILPA).

A plurality of connection access requests are received at an endpoint routing client running on a same device from which the requests originated. Such connection access requests include loss prevention inspectable requests and bandwidth conservable requests.

In advance of receiving the connection access requests, the endpoint routing client is configured with a performance bypass list of bandwidth conservable destination identifiers for which inspection bandwidth of the DILPA can be conserved by bypassing the DILPA. As a result, the bandwidth conservable destination identifiers are not subject to routing through the DILPA.

Upon receiving the connection access requests, the endpoint routing client compares at least a substring of an incoming connection access request to entries in the performance bypass list and classifies the incoming connection access request as loss prevention inspectable or bandwidth conservable.

Upon classifying the connection access request as loss prevention inspectable, the endpoint routing client tunnels the loss prevention inspectable connection access request through a secure encrypted channel to the DILPA, which is interposed between the device and a first server at a destination specified by the loss prevention inspectable connection access request.

Upon classifying the connection access request as bandwidth conservable, the endpoint routing client bypasses the DILPA by sending the bandwidth conservable connection request from the device to a second server at a destination specified by the bandwidth conservable connection access request.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The connection access requests can be unified resource locator (URL) requests and the incoming connection access request can be an incoming URL request. The bandwidth conservable destination identifiers can be identifiers that identify domain names. The bandwidth conservable destination identifiers can be identifiers that identify subdomain names. The bandwidth conservable destination identifiers can be identifiers that identify URLs. The bandwidth conservable destination identifiers can be identifiers that identify content types. The bandwidth conservable destination identifiers can be identifiers that identify web categories. In such an implementation, the performance bypass list can identify a set number of most frequently visited domains for each of the web categories.

The bandwidth conservable destination identifiers can be identifiers that identify system services. The bandwidth conservable destination identifiers can be identifiers that identify certificate pinned applications. The bandwidth conservable destination identifiers can be identifiers that identify server names (e.g., server name indications (SNIs), HOST headers). The bandwidth conservable destination identifiers can be identifiers that identify network location profiles. The bandwidth conservable destination identifiers can be identifiers that identify source countries.

The bandwidth conservable destination identifiers can be identifiers that identify source Internet Protocol (IP) address and/or ranges and/or subnets for the source IP address. The bandwidth conservable destination identifiers can be identifiers that identify destination IP address and/or ranges and/or subnets for the destination IP address.

The bandwidth conservable destination identifiers can be automatically configured using a URL classification service. The bandwidth conservable destination identifiers can also be automatically configured based on system services applicable to and/or running on the device.

Server-Side, Intercepting Internal Bypass

When the network security system (NSS) receives a given connection access request that is classified as loss prevention inspectable by the endpoint routing client, such request can be tunneled through the secure encrypted channel. The request can identify a given server name indication (SNI). When the NSS receives data packets from the given server, it can determine from a packet header of the data packets that the data packets belong to a bandwidth conservable content type. Based on such a determination, the NSS can internally bypass inspection of the data packets belonging to the bandwidth conservable content type by the DILPA.

The NSS can also generate a bandwidth conservable classification for the SNI based on the determination that the data packets belongs to a bandwidth conservable content type. The NSS can then store the bandwidth conservable classification in a supplemental bypass list.

Further, upon receiving further connection access requests that are accompanied by the given server name, the NSS can bypass inspection of such requests by the DILPA based on identifying the given server name in the supplemental bypass list.

In addition, the NSS can send the supplemental bypass list to the endpoint routing client.

Also, based on the determination, the NSS can generate a bandwidth conservable classification for the given connection access request and can store the bandwidth conservable classification in the supplemental bypass list.

When the network security system (NSS) receives the given connection access request, it can compare at least a substring of the given connection access request to entries in the supplemental bypass list. Based on the comparison, the NSS can determine that the given connection access request is bandwidth conservable. Based on such a determination, the NSS can internally bypass inspection of the given connection access request by the DILPA, which in turn includes sending the given connection access request to the given server.

Based on the supplemental bypass list received from the NSS, the endpoint routing client can determine whether further incoming connection access requests are loss prevention inspectable or bandwidth conservable.

DILPA can be a cloud-based data inspection and loss prevention appliance (CBDILPA). In other implementations, the DILPA can be an on-premise data inspection and loss prevention appliance (ONDILPA).

The device can be an off-organization-network device. The system further includes a web management interface (WMI) for configuring the bandwidth conservable destination identifiers.

The network security system (NSS) can generate separate performance bypass lists for different bandwidth conservable destination identifiers. The NSS can then send the separate performance bypass lists to the endpoint routing client. The NSS can also generate a unified performance bypass list for different bandwidth conservable destination identifiers. The NSS can then send the unified performance bypass list to the endpoint routing client. The NSS can also periodically update the performance bypass list(s) sent to the endpoint routing client. In some implementations, the performance bypass list(s) is stored at the endpoint routing client as a proxy auto-config (PAC) file.

Other implementations may include a non-transitory computer readable storage medium storing instructions executable by a processor to perform functions of the system described above.

Another system implementation of the technology disclosed from the perspective of an on-premise routing proxy (OPERP) includes one or more processors coupled to the memory. The memory is loaded with computer instructions to conserve inspection bandwidth of a data inspection and loss prevention appliance (DILPA).

A plurality of connection access requests are received at an on-premise routing proxy (OPERP) from endpoints running within an organization network. Such connection access requests include loss prevention inspectable requests and bandwidth conservable requests.

In advance of receiving the connection access requests, the OPERP is configured with a performance bypass list of bandwidth conservable destination identifiers for which inspection bandwidth of the DILPA can be conserved by bypassing the DILPA. As a result, the bandwidth conservable destination identifiers are not subject to routing through the DILPA.

Upon receiving the connection access requests, the OPERP compares at least a substring of an incoming connection access request to entries in the performance bypass list and classifies the incoming connection access request as loss prevention inspectable or bandwidth conservable.

Upon classifying the connection access request as loss prevention inspectable, the OPERP tunnels the loss prevention inspectable connection access request through a secure encrypted channel to the DILPA, which is interposed between the OPERP and a first server at a destination specified by the loss prevention inspectable connection access request.

Upon classifying the connection access request as bandwidth conservable, the OPERP bypasses the DILPA by sending the bandwidth conservable connection request from an endpoint to a second server at a destination specified by the bandwidth conservable connection access request.

Each of the features discussed in this particular implementation section for other implementations apply equally to this system implementation. As indicated above, all the system features are not repeated here and should be considered repeated by reference. Other implementations may include a non-transitory computer readable storage medium storing instructions executable by a processor to perform functions of the system described above.

Yet another system implementation of the technology disclosed from the perspective of a network security system (NSS) which comprises a data inspection and loss prevention appliance (DILPA) includes one or more processors coupled to the memory. The memory is loaded with computer instructions to conserve inspection bandwidth of the DILPA.

The NSS comprises a deployer. The deployer periodically updates performance bypass lists deployed to endpoint routing clients running on devices.

The performance bypass lists identify bandwidth conservable destination identifiers for which inspection bandwidth of the DILPA can be conserved by bypassing the DILPA. As a result, the bandwidth conservable destination identifiers are not subject to routing through the DILPA.

The performance bypass lists are used by the endpoint routing clients to classify incoming connection access requests as loss prevention inspectable or bandwidth conservable.

The DILPA inspects loss prevention inspectable connection access requests, which are identified as such based on the performance bypass list-based classification by the endpoint routing clients. In some implementations, the DILPA also applies a data loss prevention policy on the loss prevention inspectable connection access requests.

The DILPA remains agnostic to bandwidth conservable connection access requests, which are identified as such based on the performance bypass list-based classification by the endpoint routing clients.

Each of the features discussed in this particular implementation section for other implementations apply equally to this system implementation. As indicated above, all the system features are not repeated here and should be considered repeated by reference. Other implementations may include a non-transitory computer readable storage medium storing instructions executable by a processor to perform functions of the system described above.

A method implementation of the technology disclosed from the perspective of an endpoint routing client includes conserving inspection bandwidth of a data inspection and loss prevention appliance (DILPA).

The method includes receiving a plurality of connection access requests at an endpoint routing client running on a same device from which the requests originated. Such connection access requests include loss prevention inspectable requests and bandwidth conservable requests.

The method includes, in advance of receiving the connection access requests, configuring the endpoint routing client with a performance bypass list of bandwidth conservable destination identifiers for which inspection bandwidth of the DILPA can be conserved by bypassing the DILPA. As a result, the bandwidth conservable destination identifiers are not subject to routing through the DILPA.

The method includes the endpoint routing client comparing at least a substring of an incoming connection access request to entries in the performance bypass list and classifying the incoming connection access request as loss prevention inspectable or bandwidth conservable.

The method includes, in response to classifying the connection access request as loss prevention inspectable, the endpoint routing client tunneling the loss prevention inspectable connection access request through a secure encrypted channel to the DILPA, which is interposed between the device and a first server at a destination specified by the loss prevention inspectable connection access request.

The method includes, in response to classifying the connection access request as bandwidth conservable, the endpoint routing client bypassing the DILPA by sending the bandwidth conservable connection access request from the device to a second server at a destination specified by the bandwidth conservable connection access request.

Each of the features discussed in this particular implementation section for other implementations apply equally to this method implementation. As indicated above, all the system features are not repeated here and should be considered repeated by reference. Other implementations may include a non-transitory computer readable storage medium storing instructions executable by a processor to perform the method described above. Yet another implementation may include a system including memory and one or more processors operable to execute instructions, stored in the memory, to perform the method described above.

Another method implementation of the technology disclosed from the perspective of an on-premise routing proxy (OPERP) includes conserving inspection bandwidth of a data inspection and loss prevention appliance (DILPA).

The method includes receiving a plurality of connection access requests at an on-premise routing proxy (OPERP) from endpoints running within an organization network. Such connection access requests include loss prevention inspectable requests and bandwidth conservable requests.

The method includes, in advance of receiving the connection access requests, configuring the OPERP with a performance bypass list of bandwidth conservable destination identifiers for which inspection bandwidth of the DILPA can be conserved by bypassing the DILPA. As a result, the bandwidth conservable destination identifiers are not subject to routing through the DILPA.

The method includes the OPERP comparing at least a substring of an incoming connection access request to entries in the performance bypass list and classifying the incoming connection access request as loss prevention inspectable or bandwidth conservable.

The method includes, in response to classifying the connection access request as loss prevention inspectable, the OPERP tunneling the loss prevention inspectable connection access request through a secure encrypted channel to the DILPA, which is interposed between the OPERP and a first server at a destination specified by the loss prevention inspectable connection access request.

The method includes, in response to classifying the connection access request as bandwidth conservable, the OPERP bypassing the DILPA by sending the bandwidth conservable connection access request from an endpoint to a second server at a destination specified by the bandwidth conservable connection access request.

Each of the features discussed in this particular implementation section for other implementations apply equally to this method implementation. As indicated above, all the system features are not repeated here and should be considered repeated by reference. Other implementations may include a non-transitory computer readable storage medium storing instructions executable by a processor to perform the method described above. Yet another implementation may include a system including memory and one or more processors operable to execute instructions, stored in the memory, to perform the method described above.

Web Category-Based Bypass

Yet another system implementation of the technology disclosed from the perspective of an endpoint routing client includes one or more processors coupled to the memory. The memory is loaded with computer instructions to conserve inspection bandwidth of a data inspection and loss prevention appliance (DILPA).

An incoming connection access request is received at an endpoint routing client running on a same device from which the request originated. The request comprises a domain name.

In advance of receiving the request, the endpoint routing client is configured with a web category bypass list of bandwidth conservable web categories for which inspection bandwidth of the DILPA can be conserved by bypassing the DILPA. As a result, the bandwidth conservable web categories are not subject to routing through the DILPA. The endpoint routing client is also configured with a domain bypass list of bandwidth conservable domain names in each of the bandwidth conservable web categories in the web category bypass list.

When the domain name is not in the domain bypass list, the endpoint routing client queries and receives a web category for the domain name. In one implementation, the endpoint routing client queries a storage module of the network security system (NSS) and receives the web category from the storage module. In another implementation, the endpoint routing client queries a local module of the endpoint routing client and receives the web category from the local module.

The endpoint routing client compares the received web category to entries in the web category bypass list and classifies the domain name as loss prevention inspectable or bandwidth conservable.

Upon classifying the domain name as loss prevention inspectable, the endpoint routing client tunnels the incoming connection access request and further incoming connection access requests that comprise the domain name through a secure encrypted channel to the DILPA, which is interposed between the device and respective destination servers specified by the incoming and further incoming connection access requests.

Upon classifying the domain name as bandwidth conservable, the endpoint routing client bypasses the DILPA by sending the incoming connection access request and further incoming connection access requests that comprise the domain name from the device to the respective destination servers.

Each of the features discussed in this particular implementation section for other implementations apply equally to this system implementation. As indicated above, all the system features are not repeated here and should be considered repeated by reference.

The endpoint routing client updates the domain bypass list based on a bandwidth conservable classification of the domain name. The bandwidth conservable classification can be accompanied with a time to live (TTL) parameter. When the bandwidth conservable classification expires based on the TTL parameter, the endpoint routing client can query and receive a web category for the domain name (from the storage module or the local module) and reclassify the domain name as loss prevention inspectable or bandwidth conservable based on the received web category.

The network security system (NSS) can periodically update the web category bypass list and the domain bypass list sent to the endpoint routing client.

The endpoint routing client can receive a domain whitelist (from the storage module or the local module) that identifies one or more loss prevention inspectable domain names that are subject to inspection by the DILPA irrespective of belonging to a bandwidth conservable web category. The endpoint routing client can then tunnel connection access requests that comprise the loss prevention inspectable domain names through the secure encrypted channel to the DILPA.

Other implementations may include a non-transitory computer readable storage medium storing instructions executable by a processor to perform functions of the system described above.

Yet another method implementation of the technology disclosed from the perspective of an endpoint routing client includes conserving inspection bandwidth of a data inspection and loss prevention appliance (DILPA).

The method includes receiving an incoming connection access request at an endpoint routing client running on a same device from which the request originated. The request comprises a domain name.

The method includes, in advance of receiving the request, configuring the endpoint routing client with a web category bypass list of bandwidth conservable web categories for which inspection bandwidth of the DILPA can be conserved by bypassing the DILPA. As a result, the bandwidth conservable web categories are not subject to routing through the DILPA.

The method also includes configuring the endpoint routing client with a domain bypass list of bandwidth conservable domain names in each of the bandwidth conservable web categories in the web category bypass list.

When the domain name is not in the domain bypass list, the method includes the endpoint routing client querying and receiving a web category for the domain name. In one implementation, the endpoint routing client queries a storage module of the network security system (NSS) and receives the web category from the storage module. In another implementation, the endpoint routing client queries a local module of the endpoint routing client and receives the web category from the local module.

The method includes the endpoint routing client comparing the received web category to entries in the web category bypass list and classifying the domain name as loss prevention inspectable or bandwidth conservable.

The method includes, in response to classifying the domain name as loss prevention inspectable, the endpoint routing client tunneling the incoming connection access request and further incoming connection access requests that comprise the domain name through a secure encrypted channel to the DILPA, which is interposed between the device and respective destination servers specified by the incoming and further incoming connection access requests.

The method includes, in response to classifying the domain name as bandwidth conservable, the endpoint routing client bypassing the DILPA by sending the incoming connection access request and further incoming connection access requests that comprise the domain name from the device to the respective destination servers.

Each of the features discussed in this particular implementation section for other implementations apply equally to this method implementation. As indicated above, all the system features are not repeated here and should be considered repeated by reference. Other implementations may include a non-transitory computer readable storage medium storing instructions executable by a processor to perform the method described above. Yet another implementation may include a system including memory and one or more processors operable to execute instructions, stored in the memory, to perform the method described above.

Error-Based Bypass

Another system implementation of the technology disclosed from the perspective of the network security system (NSS) includes one or more processors coupled to the memory. The memory is loaded with computer instructions to reduce error in security enforcement by the NSS.

The NSS receives over a monitored channel a plurality of connection access requests from an endpoint routing client running on a device. Such connection access requests include loss prevention inspectable requests and connection preserving requests.

The NSS decrypts an incoming connection access request and determines conformance or non-conformance of the connection access request with semantic and content requirements of a protocol established for the monitored channel.

In one implementation, the monitored channel is Port 80 and the established protocol is Hypertext Transfer Protocol (abbreviated HTTP). In another implementation, the monitored channel is Port 443 and the established protocol is Hypertext Transfer Protocol Secure (abbreviated HTTPS).

The semantic and content requirements apply to request methods, request header fields, request payload metadata, and request payload body content of the protocol established for the monitored channel. The semantic and content requirements can be loaded onto an error bypass list and made available to the NSS. Additional information about the semantic and content requirements can be found in Wikipedia contributors, 'List of HTTP header fields', *Wikipedia, The Free Encyclopedia*, 17 Apr. 2018, 09:04 UTC, <https://en.wikipedia.org/w/index.php?title=List_of_HTTP_header_fields&oldid=836864202> [accessed 19 Apr. 2018]; Wikipedia contributors, 'HTTPS', *Wikipedia, The Free Encyclopedia*, 17 Apr. 2018, 03:27 UTC, <https://en.wikipedia.org/w/index.php?title=HTTPS&oldid=836835625> [accessed 19 Apr. 2018]; Internet Engineering Task Force, 'Hypertext Transfer Protocol (HTTP/1.1): Semantics and Content'. R. Fielding, Ed., J. Reschke, Ed. June 2014, <https://tools.ietf.org/pdf/rfc7231.pdf> [accessed 19 Apr. 2018]; and Internet Engineering Task Force, 'Hypertext Transfer Protocol (HTTP/1.1): Message Syntax and Routing'. R. Fielding, Ed., J. Reschke, Ed. June 2014, <https://tools.ietf.org/pdf/rfc7230.pdf> [accessed 19 Apr. 2018], which are incorporated by reference herein in their entirety.

In some implementations, semantic and content based comparison involves keyword matching, pattern matching, string or substring matching, exact matching, and regular expression matching.

Based on the determination, the NSS classifies the connection access request as loss prevention inspectable or connection preserving.

In response to classifying the connection access request as loss prevention inspectable, the NSS forwards the loss prevention inspectable connection access request to a data inspection and loss prevention appliance (abbreviated DILPA) for deep inspection. The DILPA is interposed between the device and a first server at a destination specified by the loss prevention inspectable connection access request.

In response to classifying the connection access request as connection preserving, the NSS sends the connection preserving connection access request to a second server at a destination specified by the connection preserving connection access request, preventing request termination and error generation by the NSS.

Each of the features discussed in this particular implementation section for other implementations apply equally to this system implementation. As indicated above, all the system features are not repeated here and should be considered repeated by reference.

In another implementation, the NSS receives over the monitored channel a plurality of connection access responses from destination servers. Such connection access responses include loss prevention inspectable responses and connection preserving responses.

The NSS decrypts an incoming connection access response and determines conformance or non-conformance of the connection access response with semantic and content requirements of the protocol established for the monitored channel.

In one implementation, the monitored channel is Port 80 and the established protocol is Hypertext Transfer Protocol (abbreviated HTTP). In another implementation, the monitored channel is Port 443 and the established protocol is Hypertext Transfer Protocol Secure (abbreviated HTTPS).

The semantic and content requirements apply to response methods, response header fields, response payload metadata, and response payload body content of the protocol established for the monitored channel. The semantic and content requirements can be loaded onto an error bypass list and made available to the NSS. Additional information about the semantic and content requirements can be found in Wikipedia contributors, 'List of HTTP header fields', *Wikipedia, The Free Encyclopedia*, 17 Apr. 2018, 09:04 UTC, <https://en.wikipedia.org/w/index.php?title=List_of_HTTP_header_fields&oldid=836864202> [accessed 19 Apr. 2018]; Wikipedia contributors, 'HTTPS', *Wikipedia, The Free Encyclopedia*, 17 Apr. 2018, 03:27 UTC, <https://en.wikipedia.org/w/index.php?title=HTTPS&oldid=836835625> [accessed 19 Apr. 2018]; Internet Engineering Task Force, 'Hypertext Transfer Protocol (HTTP/1.1): Semantics and Content'. R. Fielding, Ed., J. Reschke, Ed. June 2014, <https://tools.ietf.org/pdf/rfc7231.pdf> [accessed 19 Apr. 2018]; and Internet Engineering Task Force, 'Hypertext Transfer Protocol (HTTP/1.1): Message Syntax and Routing'. R. Fielding, Ed., J. Reschke, Ed. June 2014, <https://tools.ietf.org/pdf/rfc7230.pdf>[accessed 19 Apr. 2018], which are incorporated by reference herein in their entirety.

In some implementations, semantic and content based comparison involves keyword matching, pattern matching, string or substring matching, exact matching, and regular expression matching. That is, the header and payload of a request or response can be compared that of a standard HTTP or HTTPS header and payload of a request or response on a semantic and content basis to determine conformance or non-conformance with HTTP or HTTPS protocol.

Based on the determination, the NSS classifies the connection access response as loss prevention inspectable or connection preserving;

In response to classifying the connection access response as loss prevention inspectable, the NSS forwards the loss prevention inspectable connection access response to the DILPA for deep inspection.

In response to classifying the connection access response as connection preserving, the NSS directly sends the connection preserving connection access response to a requesting client device, preventing response termination and error generation by the NSS.

When the certificate error is caused by an unsupported cipher, the NSS can block the loss prevention inspectable connection access request.

In another implementation, internal deep inspection bypass of a connection access request (CAR) can occur when the client fails to perform the handshake and thus errors out. In such an implementation, the domain name associated with the CAR can be stored in the storage 460 as part of the error bypass list for future bypassing.

When the NSS receives a given connection access request that invokes a requested non-HTTP protocol on a requested HTTP channel, it determines that the requested non-HTTP protocol is a connection preserving protocol based on non-conformance with the semantic and content requirements of the HTTP. Based on the determination, the NSS internally bypasses deep inspection by the DILPA of the given connection access request. This includes sending the given connection access request to a given destination server specified by the given connection access request and relaying responses from the given destination server directly to the device.

When the NSS receives a given connection access request that invokes a requested non-HTTPS protocol on a requested HTTPS channel, it determines that the requested non-HTTPS protocol is a connection preserving protocol based on non-conformance with the semantic and content requirements of the HTTPS. Based on the determination, the NSS internally bypasses deep inspection by the DILPA of the given connection access request. This includes sending the given connection access request to a given destination server specified by the given connection access request and relaying responses from the given destination server directly to the device.

When the NSS receives a given connection access request that invokes a requested non-HTTP protocol on a requested HTTPS channel, it determines that the requested non-HTTP protocol is a connection preserving protocol based on non-conformance with the semantic and content requirements of the HTTPS. Based on the determination, the NSS internally bypasses deep inspection by the DILPA of the given connection access request. This includes sending the given connection access request to a given destination server specified by the given connection access request and relaying responses from the given destination server directly to the device.

In one implementation involving HTTPS traffic, the NSS receives an incoming connection access request from the endpoint routing client. The connection access request is issued by an application client running on the device and comprises a server name identification (abbreviated SNI) that identifies the application. The NSS then looks up the SNI in an error bypass list and determines that the application client is pinned to an application-specific certificate and does not trust a NSS certificate. Based on the determination, the NSS internally bypasses deep inspection by the DILPA of the connection access request. This includes sending the connection access request to a destination server specified by the connection access request and relaying responses from the destination server directly to the device.

In another implementation involving HTTP traffic, the NSS receives an incoming connection access request from the endpoint routing client. The connection access request is issued by an application client running on the device and comprises a host header that identifies the application. The NSS then looks up the host header in an error bypass list and determines that the application client is pinned to an application-specific certificate and does not trust a NSS certificate. Based on the determination, the NSS internally bypasses deep inspection by the DILPA of the connection access request. This includes sending the connection access request to a destination server specified by the connection access request and relaying responses from the destination server directly to the device.

In one implementation involving HTTPS traffic, the NSS receives an incoming connection access request from the endpoint routing client. The connection access request is issued by an application client running on the device and does not comprise a server name identification (abbreviated SNI) that identifies the application. The NSS then receives a response to the connection access request from a destination server specified by the connection access request. The response comprises a certificate with the SNI which identifies the application. Advancing ahead, the NSS looks up the SNI in an error bypass list and determines that the application client is pinned to an application-specific certificate and does not trust a NSS certificate. Based on the determination, the NSS internally bypasses deep inspection by the DILPA of the response.

In one implementation involving HTTP traffic, the NSS receives an incoming connection access request from the endpoint routing client. The connection access request is issued by an application client running on the device and does not comprise a host header that identifies the application. The NSS then receives a response to the connection access request from a destination server specified by the connection access request. The response comprises a certificate with the host header which identifies the application. Advancing ahead, the NSS looks up the SNI in an error bypass list and determines that the application client is pinned to an application-specific certificate and does not trust a NSS certificate. Based on the determination, the NSS internally bypasses deep inspection by the DILPA of the response.

The NSS receives, from a destination server, a connection access response that comprises a certificate. The NSS inspects the certificate for validation and detects a certificate error. Based on the detection, the NSS internally bypasses deep inspection by the DILPA of the connection access response. The certificate error can be caused by at least one of an untrusted root certificate and an incomplete certificate chain. When the certificate error is caused by an unsupported cipher, the NSS blocks the connection access response.

When the NSS detects a protocol error while processing a connection access request from a requesting client device, it responds by preserving the connection access request. Connection preservation includes terminating further processing of the connection access request (e.g., by the DIPLA) and directly forwarding the connection access request to a specified destination server.

When the NSS detects a protocol error while processing a connection access response from a destination server, it responds by preserving the connection access response. Connection preservation includes terminating further processing of the connection access response (e.g., by the DIPLA) and directly forwarding the connection access response to a requesting client device.

Other implementations may include a non-transitory computer readable storage medium storing instructions executable by a processor to perform functions of the system described above.

Another computer-implemented method implementation of the technology disclosed from the perspective of the network security system (NSS) includes reducing error in security enforcement by the NSS.

The method includes the NSS receiving over a monitored channel a plurality of connection access requests from an endpoint routing client running on a device, the requests including loss prevention inspectable requests and connection preserving requests.

The method includes the NSS decrypting an incoming connection access request and determining conformance or non-conformance of the connection access request with semantic and content requirements of a protocol established for the monitored channel.

In one implementation, the monitored channel is Port 80 and the established protocol is Hypertext Transfer Protocol (abbreviated HTTP). In another implementation, the monitored channel is Port 443 and the established protocol is Hypertext Transfer Protocol Secure (abbreviated HTTPS).

The semantic and content requirements apply to request methods, request header fields, request payload metadata, and request payload body content of the protocol established for the monitored channel. The semantic and content requirements can be loaded onto an error bypass list and made available to the NSS. Additional information about the semantic and content requirements can be found in Wikipedia contributors, 'List of HTTP header fields', *Wikipedia, The Free Encyclopedia,* 17 Apr. 2018, 09:04 UTC, <https://en.wikipedia.org/w/index.php?title=List_of_HTTP_header_fields&oldid=836864202> [accessed 19 Apr. 2018]; Wikipedia contributors, 'HTTPS', *Wikipedia, The Free Encyclopedia,* 17 Apr. 2018, 03:27 UTC, <https://en.wikipedia.org/w/index.php?title=HTTPS&oldid=836835625> [accessed 19 Apr. 2018]; Internet Engineering Task Force, 'Hypertext Transfer Protocol (HTTP/1.1): Semantics and Content'. R. Fielding, Ed., J. Reschke, Ed. June 2014, <https://tools.ietf.org/pdf/rfc7231.pdf> [accessed 19 Apr. 2018]; and Internet Engineering Task Force, 'Hypertext Transfer Protocol (HTTP/1.1): Message Syntax and Routing'. R. Fielding, Ed., J. Reschke, Ed. June 2014, <https://tools.ietf.org/pdf/rfc7230.pdf> [accessed 19 Apr. 2018], which are incorporated by reference herein in their entirety.

The method includes, based on the determination, the NSS classifying the connection access request as loss prevention inspectable or connection preserving.

The method includes, in response to classifying the connection access request as loss prevention inspectable, the NSS forwarding the loss prevention inspectable connection access request to the DILPA for deep inspection. The DILPA is interposed between the device and a first server at a destination specified by the loss prevention inspectable connection access request.

The method includes, in response to classifying the connection access request as connection preserving, the NSS sending the connection preserving connection access request to a second server at a destination specified by the connection preserving connection access request, preventing request termination and error generation by the NSS.

Each of the features discussed in this particular implementation section for other implementations apply equally to this method implementation. As indicated above, all the system features are not repeated here and should be considered repeated by reference. Other implementations may include a non-transitory computer readable storage medium storing instructions executable by a processor to perform the method described above. Yet another implementation may include a system including memory and one or more processors operable to execute instructions, stored in the memory, to perform the method described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

The technology disclosed can be practiced as a system, method, and an article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

What is claimed is:

1. A network security system that reduces latency in security enforcement, the network security system comprising:
   a server including a hardware processor that periodically updates performance bypass lists deployed to endpoint routing clients running on devices;

wherein the performance bypass lists identify exempt connection identifiers;

wherein the exempt connection identifiers are not subject to routing through a data inspection and loss prevention appliance;

wherein the exempt connection identifiers are used by the endpoint routing clients to classify incoming connection access requests as non-exempt or exempt, and wherein an incoming connection access request originates from one of the devices;

wherein the data inspection and loss prevention appliance, in dependence upon the performance bypass list-based classification by the endpoint routing clients, inspects non-exempt incoming connection access requests and applies a policy; and wherein the data inspection and loss prevention appliance, in dependence upon the performance bypass list-based classification by the endpoint routing clients, remains agnostic to exempt incoming connection access requests.

2. The system of claim 1, wherein the connection access requests are unified resource locator (abbreviated URL) requests and the incoming connection access request is an incoming URL request.

3. The system of claim 1, wherein the exempt connection identifiers are identifiers that identify domain names.

4. The system of claim 1, wherein the exempt connection identifiers are identifiers that identify subdomain names.

5. The system of claim 1, wherein the exempt connection identifiers are identifiers that identify URLs.

6. The system of claim 1, wherein the exempt connection identifiers are identifiers that identify content types.

7. The system of claim 1, wherein the exempt connection identifiers are identifiers that identify web categories.

8. The system of claim 7, wherein the performance bypass list identifies a set number of most frequently visited domains for each of the web categories.

9. The system of claim 1, wherein the exempt connection identifiers are identifiers that identify system services.

10. The system of claim 1, wherein the exempt connection identifiers are identifiers that identify certificate pinned applications.

11. The system of claim 1, wherein the exempt connection identifiers are identifiers that identify server name indications (abbreviated SNIs).

12. The system of claim 1, wherein the exempt connection identifiers are identifiers that identify network location profiles.

13. The system of claim 1, wherein the exempt connection identifiers are identifiers that identify source countries.

14. The system of claim 1, wherein the exempt connection identifiers are identifiers that identify source Internet Protocol (abbreviated IP) address and/or ranges and/or subnets for the source IP address.

15. The system of claim 1, wherein the exempt connection identifiers are identifiers that identify destination Internet Protocol (abbreviated IP) address and/or ranges and/or subnets for the destination IP address.

16. The system of claim 1, wherein the data inspection and loss prevention appliance is a cloud-based traffic inspection proxy.

17. The system of claim 1, wherein the data inspection and loss prevention appliance is an on-premise traffic inspection proxy.

18. The system of claim 1, wherein the device is an off-organization-network device.

19. The system of claim 1, wherein the exempt connection identifiers are configured using a web management interface (abbreviated WMI).

20. The system of claim 1, wherein the exempt connection identifiers are automatically configured using a URL classification service.

21. The system of claim 1, wherein the exempt connection identifiers are automatically configured based on system services applicable to and/or running on the device.

22. The system of claim 1, further including the network security system:
generating separate performance bypass lists for different exempt connection identifiers; and
sending the separate performance bypass lists to the endpoint routing client.

23. The system of claim 1, further including the network security system:
generating a unified performance bypass list for different exempt connection identifiers; and
sending the unified performance bypass list to the endpoint routing client.

24. The system of claim 1, further including the network security system:
periodically updating the performance bypass list sent to the endpoint routing client.

25. The system of claim 1, where the performance bypass list is stored at the endpoint routing client as a proxy auto-config (abbreviated PAC) file.

* * * * *